(12) United States Patent
Choyi et al.

(10) Patent No.: US 12,192,203 B2
(45) Date of Patent: *Jan. 7, 2025

(54) SECURITY LIFECYCLE MANAGEMENT OF DEVICES IN A COMMUNICATIONS NETWORK

(71) Applicant: Convida Wireless, LLC, Wilmington, DE (US)

(72) Inventors: Vinod Kumar Choyi, Conshohocken, PA (US); Chonggang Wang, Princeton, NJ (US); Dale N. Seed, Allentown, PA (US)

(73) Assignee: Convida Wireless, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/494,287

(22) Filed: Oct. 25, 2023

(65) Prior Publication Data

US 2024/0064144 A1 Feb. 22, 2024

Related U.S. Application Data

(63) Continuation of application No. 17/311,047, filed as application No. PCT/US2019/064404 on Dec. 4, 2019, now Pat. No. 11,824,643.

(Continued)

(51) Int. Cl.
*H04L 9/40* (2022.01)
*H04W 12/30* (2021.01)
*H04W 48/18* (2009.01)

(52) U.S. Cl.
CPC ...... *H04L 63/0892* (2013.01); *H04L 63/0435* (2013.01); *H04W 12/30* (2021.01); *H04W 48/18* (2013.01)

(58) Field of Classification Search
CPC .......................... H04L 63/0838; H04W 12/30
See application file for complete search history.

(56) References Cited

U.S. PATENT DOCUMENTS

| | | | | |
|---|---|---|---|---|
| 10,057,269 | B1* | 8/2018 | Ellingson | H04L 63/101 |
| 2011/0010543 | A1* | 1/2011 | Schmidt | H04W 12/06 |
| | | | | 713/168 |

(Continued)

FOREIGN PATENT DOCUMENTS

WO 2016/149355 A1 9/2016

OTHER PUBLICATIONS

Zhou et al., "Security Solutions for oneM2M", TS-0003-Security_Solutions V3-10_ 0.ZIP, ONEM2M, vol. Work Programme, Work Progr, No. version = V3.10.0, Nov. 2, 2018, 1-267.

*Primary Examiner* — William S Powers
(74) *Attorney, Agent, or Firm* — BakerHostetler

(57) ABSTRACT

Described herein are complete lifecycle management processes for IoT/M2M devices. In an example, devices are commissioned and de-commissioned in a given system without requiring a user/human administrator. A delegated life-cycle management process is described, wherein devices rely upon a delegatee, which may have more computing and battery resources than the devices, to perform complete or partial lifecycle management operations on behalf of the devices. The delegatee may be a trusted entity that may belong to the same domain as the devices. Further, a Trust Enabling Infrastructure (TEI) is described herein, which may belong to a different trusted domain than the given device and its delegatee.

19 Claims, 25 Drawing Sheets

Related U.S. Application Data

(60) Provisional application No. 62/776,004, filed on Dec. 6, 2018.

(56) References Cited

U.S. PATENT DOCUMENTS

| | | | |
|---|---|---|---|
| 2016/0085960 A1* | 3/2016 | Priev | G06F 21/31 |
| | | | 726/7 |
| 2016/0232116 A1* | 8/2016 | Bone | H04L 63/062 |
| 2016/0364553 A1* | 12/2016 | Smith | H04L 63/0435 |
| 2017/0054564 A1 | 2/2017 | Bone et al. | |
| 2017/0063815 A1* | 3/2017 | Smith | H04L 63/10 |
| 2017/0104580 A1* | 4/2017 | Wooten | H04L 9/002 |
| 2017/0180340 A1* | 6/2017 | Smith | H04L 9/0847 |
| 2017/0214694 A1* | 7/2017 | Yan | G06F 9/45558 |

* cited by examiner

```
Device-Id: Dev_A
Security Profile {
        Security Properties {
        - HSF / PUF {
                - PUF_I
                - PUF_n
        }
        - HSF / SE {
                - UICC
        }
        - SSF {
                - (D)TLS
        }

- Authentication Mechanism {
                - PUF-based Symmetric Key:
                        - Trigger-based Challenge-Response
        }
    }

Security Requirements {
        - Data: {High Confidentiality, High Integrity }
        - Messaging: {Medium Confidentiality, High Integrity,
        Message Authentication, Replay Protection}
    }
}
```

FIG. 14

SECURITY LIFECYCLE MANAGEMENT OF DEVICES IN A COMMUNICATIONS NETWORK

CROSS-REFERENCE TO RELATED APPLICATIONS

This application is a continuation of U.S. patent application Ser. No. 17/311,047 filed Jun. 4, 2021 which is the National Stage of International Patent Application No. PCT/US2019/064404, filed Dec. 4, 2019 which claims the benefit of U.S. Provisional Application No. 62/776,004, filed Dec. 6, 2018, the content of which is hereby incorporated by reference in its entirety.

BACKGROUND

There are several Extensible Authentication Protocol (EAP) methods that can be used to provide full authentication or optional fast-EAP authentication, and generate session keys to secure communications between the UE and the network. Examples of such EAP methods that also include the option of fast EAP authentication include EAP transport layer security (EAP-TLS), EAP tunneled TLS (EAP-TTLS), EAP subscriber identity module (EAP-SIM) and EAP authentication and key agreement (EAP-AKA), and improved EAP-AKA (EAP-AKA'). The EAP-AKA protocol is now described, by way of example.

EAP-AKA is one of the EAP methods that provides mutual authentication and generates session keys. EAP-AKA authentication uses a universal mobile telecommunications system (UMTS) Authentication and Key Agreement (AKA) mechanism. EAP-AKA allows a mobile operator a common authentication infrastructure for both UMTS and wireless local area network (WLAN) access. An example call flow for EAP-AKA is shown in FIG. 1.

Various hardware-based security functions (HSFs) can be used for performing device authentication, deriving cryptographic credentials, and/or for performing various cryptographic operations. Hardware security functions can be realized by means of Hardware Security Modules (HSM), such as a Secure Environment (SE) (e.g., Universal Integrated Circuit Card—UICC), Trusted Execution Environment (TEE), or Trusted Platform Module (TPM). In addition, devices may use the inherent nature of hardware to provide device identification/authentication and secure storage of credentials. A Physically Unclonable Function (PUF) is an example of such a function that uses hardware-based cryptographic procedures and leverages variations of delays in wires and gates in electronic components. Properties exhibited by an ideal PUF include, for example, robustness to challenge/responses, physically unclonable, unpredictability, and tamper-evident. Not all entities that have been classified as PUFs exhibit the necessary properties in all conditions, and therefore care must be taken when selecting the appropriate PUF(s) for a given environment. In some environments, Ring Oscillators and SRAM PUFs exhibit the desired properties associated with PUFs (e.g., temperature variation, voltage variation, etc.).

A given device may be embedded with one or more PUFs, each of which may have been pre-configured locally on the device. A desired operation that is to be performed by the PUFs may also be pre-configured. In order to mitigate the misuse of PUFs, the determination of the role and usage of PUFs may be controlled by functions residing deep within a BIOS/TEE/SE/TPM. Manipulating the functionality and role of the PUF can be difficult and in some cases, policies relating to the role of PUFs cannot be re-programmed. For example, a re-programming of a given PUF may cause the usage of the PUF to be bricked.

Referring to FIG. 2, the oneM2M standard defines a Service Layer called a "Common Service Entity (CSE)". The purpose of the Service Layer is to provide horizontal services that can be utilized by different vertical M2M systems and applications. The CSE supports four reference points as shown in FIG. 2. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services, and device triggering. A CSE contains multiple logical functions called "Common Service Functions (CSFs)", such as "Discovery" and "Data Management & Repository". The oneM2M architecture enables various nodes, such as those shown in FIG. 2.

Referring to FIG. 2, an Application Service Node (ASN) may contain one CSE and at least one Application Entity (AE). An ASN may reside in an M2M Device. An Application Dedicated Node (ADN) may contain at least one AE, and does not contain a CSE. There may be zero or more ADNs in the Field Domain of the oneM2M System. An ADN may reside in a constrained M2M device. A Middle Node (MN): A node may contain one CSE and zero or more AEs. There may be zero or more MNs in the Field Domain of the oneM2M System. An MN may reside in an M2M Gateway. An Infrastructure Node (IN) may contain one CSE and zero or more AEs. In some cases, there is exactly one IN in the Infrastructure Domain per oneM2M Service Provider. A CSE in an IN may contain CSE functions not applicable to other node types. An IN may reside in an M2M Service Infrastructure. A Non-oneM2M Node (NoDN) may refer to a node that does not contain oneM2M Entities (e.g., neither AEs nor CSEs). Such Nodes may represent devices attached to the oneM2M system for interworking purposes, including management for example.

It is recognized herein that current approaches to security do not address technical problems associated with managing the security lifecycle of resource-constrained devices.

SUMMARY

Described herein are complete lifecycle management processes for IoT/M2M devices. In an example, devices are commissioned and de-commissioned in a given system without requiring a user/human administrator. A delegated life-cycle management process is described, wherein devices rely upon a delegatee, which may have more computing and battery resources than the devices, to perform complete or partial lifecycle management operations on behalf of the devices. The delegatee may be a trusted entity that may belong to the same domain as the devices. Further, a Trust Enabling Infrastructure (TEI) is described herein, which may belong to a different trusted domain than the given device and its delegatee.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIG. 14 illustrates an example security profile of an example device in accordance with an example embodiment.

DETAILED DESCRIPTION

As initial matter, unless otherwise specified, an access tokens refer to credentials used to access protected resource (technical realization of an authorization or result of an authorization check). A given token may be Digitally Signed, protected using a message authentication code (MAC) or have no ability to offer integrity/authentication of the Token. Authentication refers to the process of establishing confidence in the identity associated with a given entity. Authorization refers to the act of giving permission or authority to perform a given task or tasks. As used herein, unless otherwise specified, an authorization server refers to a trusted entity that is capable of issuing access tokens to a client. For example, the authorization server can vouch that an entity has the appropriate privileges. A client may refer to an application making a request for access to a protected resource. As used herein, unless otherwise specified, confidentiality refers to the process of ensuring that only an authorized entity is able to view data. An entity may refer to an application, a sub-set of applications, a service enabling function or functions, or a device (e.g., IoT device). Integrity can refer to the process of establishing confidence that a message or system has not been altered by an unauthorized entity. A nonce generally refers to a random value that may be associated with a session. The validity of a given nonce may be associated with a session or time component.

As used herein, unless otherwise specified, a resource can refer to data, information extracted from data, data with metadata, content, configuration parameters, computer program code, documents, or the like. A resource owner generally refers to an entity that is capable of granting access to a protected resource. A resource server may refer to a server that hosts the protected resource. As used herein, unless otherwise specified, a trusted third party refers to an entity that can facilitate transactions between two or more parties by leveraging the trust that each party has with that entity (the trusted third party).

Figure 3:
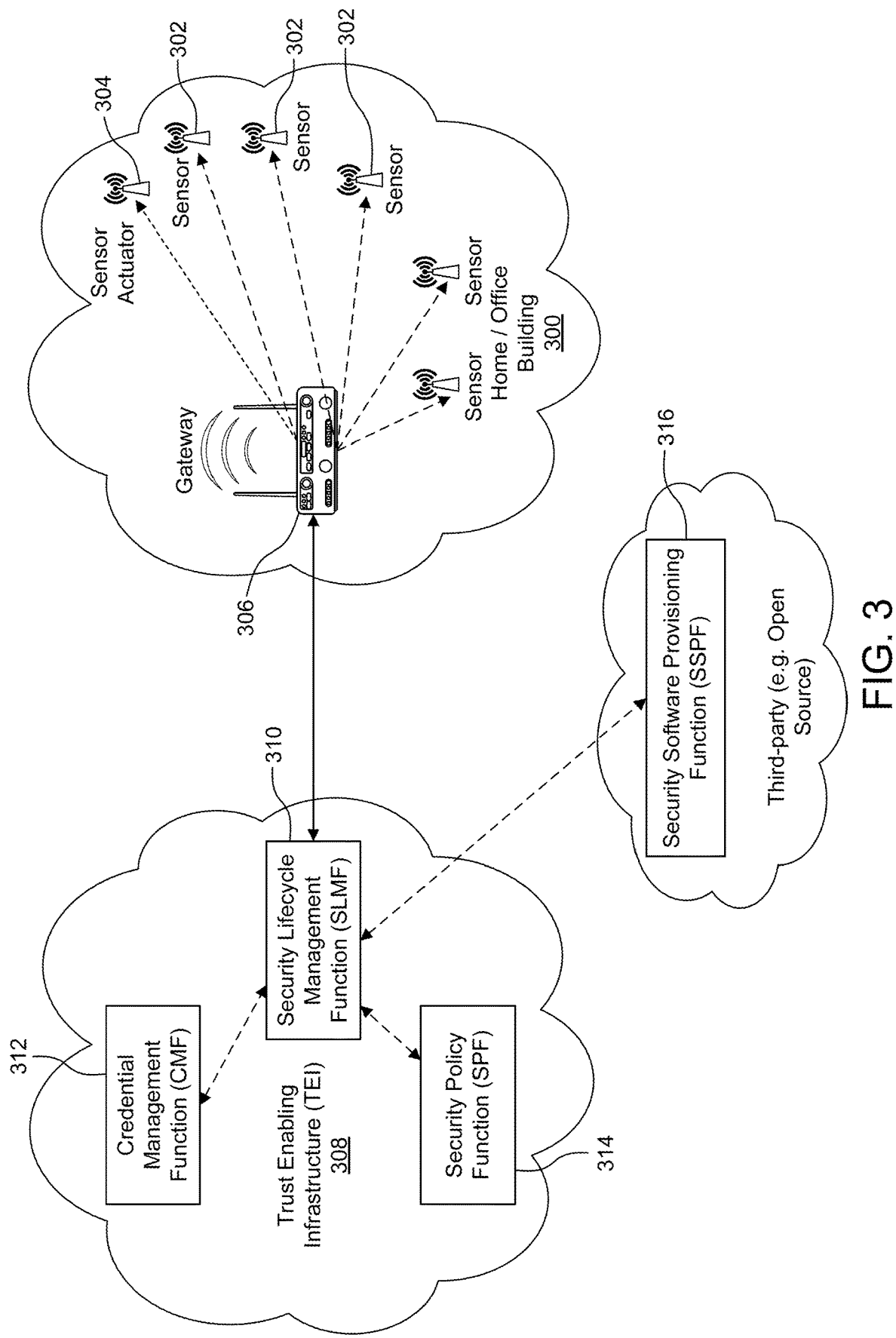
FIG. 3 is a block diagram showing an example use case in which embodiments described herein may be implemented.

Referring now to FIG. 3, an example use case is now presented. In FIG. 3, a home or office 300 has various IoT devices, such as sensors 302, actuators 304, and at least one gateway 306. In an example embodiment, a Trust Enabling Infrastructure 308 may include a Security Lifecycle Management Function 310. The TEI 308 may located within a service provider network, an operator network, or a trusted third party. The gateway 306 can operate a conduit between the devices in the home 300 and the SLMF 310.

Still referring to FIG. 3, the SLMF 310 may be responsible for handling the security lifecycle associated with sensors 302 in the home 300. By way of example, the SLMF 310 may be responsible for handling the lifecycle for multiple homes, or may be dedicated to a single home or group of homes (e.g., belonging to a family, group, apartment complex, neighborhood, organization, etc.). The SLMF 310 may use the services of a Credential Management Function (CMF) 312, a Security Policy Function (SPF) 314, and/or the services of a Security Software Provisioning Function (SSPF) 316. The SLMF 310, CMF 312, SPF 314 and the SSPF 316 may be part of the same TEI 308 or the functions may be distributed within multiple trusted third party domains. For simplicity, as used herein, the functions of the SLMF 310, CMF 312, SPF 314, and the SSPF 316 may be referred to generally as the TEI 308, without limitation. In an example, one or more, for instance all, of the SLMF 310, CMF 312, SPF 314, and the SSPF 316 are co-located on a single server within the TEI 308.

It is recognized herein that current mechanisms for managing the provisioning, registration, migration, and de-commissioning of security parameters are not scalable for numerous M2M/IoT devices and gateways. It is further recognized herein that the sheer number of devices (e.g., 50 billion or more) that are expected to be provisioned with the appropriate security credentials, configuration parameters, and security software, and that are expected to be patched and managed, may make the conventional mechanisms obsolete or impractical from a cost or efficiency perspective.

Technical problems described herein can be addressed by the various technical security lifecycle management solutions for IoT that are described herein. For example, the security lifecycle solutions described herein may enable a given device to register with a trust anchor. Devices may be provisioned with the correct set of credentials. The security lifecycle management solutions described herein may enable a device to be provisioned with the appropriate security software and configuration parameters. In some cases, a bootstrapped or a direct approach can be used for attaching with one or more security functions. Embodiments described herein may also enable migration from one service function and to another service function. Further, embodiments are described herein for de-commissioning a given device from a service temporarily or permanently.

Figure 4:
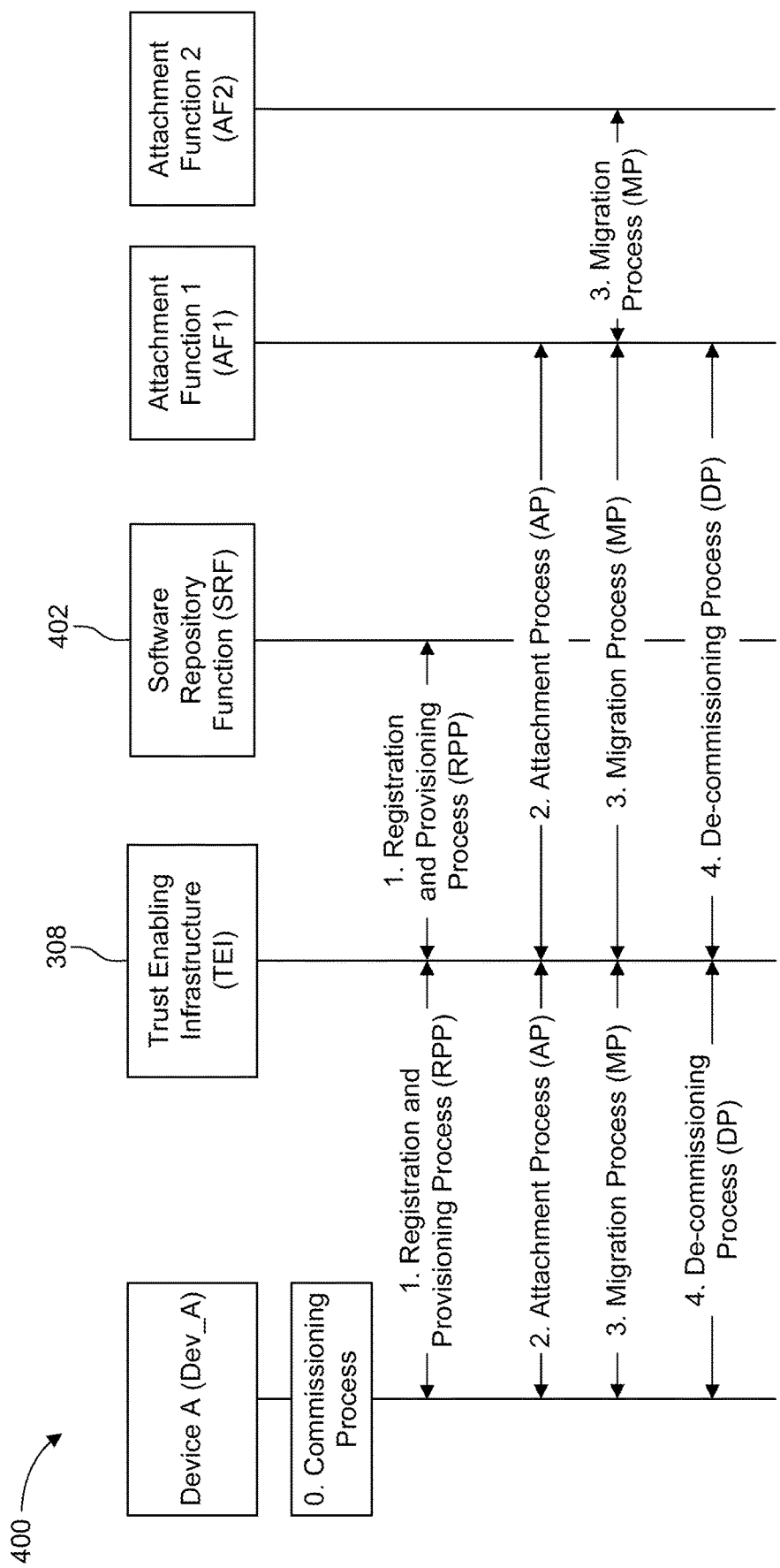
FIG. 4 is a call flow for security management in accordance with an example embodiment.

Referring now to FIG. 4, an example system 400 includes an example device (Dev_A), the TEI 308, a Software Repository Function 402, a first attachment function (AF1) and a second attachment function (AF2). It will be appreciated that the example system 400 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 4, and all such embodiments are contemplated as within the scope of the present disclosure. Processes 0-4 in FIG. 4 are shown separately, though in accordance with some embodiments, these processes may be performed in an automated manner at the same time as each other. Each step/process in FIG. 4 may configure or update certain triggers/policies at Dev_A, which may instruct Dev_A how the other steps should be performed automatically in the future when trigger/policy conditions are satisfied. Dev_A may include a Lifecycle Management Function (LCMF) to manage those steps/processes and automate those steps/processes together. For example, during a Commissioning process (step 0 in FIG. 4), Dev_A may be configured with triggers/policies that specify whether/when/how other processes (e.g., Registration and Provisioning Process at 1, Attachment Process at 2, Migration Process at 3, and Decommissioning Process at 4) might be performed in the future. Such triggers/policies may also be updated in a later Registration and Provisioning Process, Attachment Process, Migration Process, and/or Decommissioning Process.

A used herein, unless otherwise specified, a device may refer to various IoT devices, such as sensors, actuators, gateways or other network equipment. Referring to FIG. 4, when Dev_A is being prepared to be deployed (e.g., powered-on) it may go through a series of steps during the life-cycle of device. In some cases, some of the steps are optional and may depend upon the profile associated with Dev_A. Dev_A may be identifiable by means of a bar code, QR code, RFID tag id, Object Identifier (ISO/IEC 9834), IMEI, etc. In the case of RFID tags, which may include an Electronic Product Code (EPC) identifier, an extended tag ID may be used. In other cases, Dev_A might not have an identity associated with itself. In such cases, for example, Dev_A may derive an identity on its own, which then may be used for registration purposes, for example.

The TEI 308 can provide and vouch for the trust-worthiness of Dev_A to other third-party entities. In an example, the TEI 308 may be a function that resides at the manufacturer premises of Dev_A, and therefore may be owned and operated by the device manufacturer). In some cases, Dev_A has a trust relationship with the TEI, or with entities within the realm of the TEI 308. In other case, Dev_A has no prior identity within the domain of the TEI 308. The TEI 308 may also be located outside the domain of the manufacturer of Dev_A. For example, in some cases, the TEI 308 has no prior knowledge of Dev_A and its identity/security characteristics. The TEI 308 may provide Trust-as-a-Service (TaaS) to entities/functions/devices so that entities/functions/devices may be able to delegate/create transitive trust between them. The TEI 308 may incorporate wide ranging sub-functions that perform various types of identifications and/or verifications and/or authentication and/or recordings. In one example, the TEI 308 only records or stores a value provided by an entity (e.g., Dev_A). The TEI 308 may be responsible for enabling and/or brokering of intra-domain (within the same service provider network) or inter-domain (between service provider network) migrations of a given device. The TEI 308 may also be either directly or indirectly involved in the provisioning of secure software to Dev_A. The TEI may also be responsible for the de-commissioning of a given device in a temporary or permanent manner. In addition, in some cases, the TEI 308 may service multiple device or equipment manufacturers.

In some examples, the SRF 402 manages the storage, distribution, scheduling, and version control of software components, in particular security software components for example. Security software components may include, for example and without limitation, EAP, OpenSSL software, crypto suites, AKA, TLS 1.3, PANA, GBA, IPSec, etc. The SRF 402 may be invoked based upon a policy in order to provide updates of the latest software components, patches etc. to a device. Up-to-date software components may be stored on the SRF 402. The SRF 402 may be a completely automated process, in some cases, wherein the software updates are configured, scheduled, and distributed in a seamless manner with or without an administrator.

An Attachment Function (AF), for instance AF1 or AF2, refers to the attachment point of a device within a service/application provider. The device may use the services offered by the AF or may aid the AF in providing services to other devices that may be connected to the device using a delegated architecture. The AF may have a trust relationship with the TEI. The AF and the Dev_A may perform a security association by means of an authentication process (either directly or indirectly) by leveraging the trust relationships with the TEI. An associated security context may be created that is shared between the Dev_A and the AF. A security context may contain information on the security features of the security association between the endpoints (e.g., identity of session credentials used for authentication, secure connection, expiration time associated with the credentials, session credentials, etc.). In an example, the Security Context describes the security features associated between the Dev_A and the AF. The AFs may, in certain cases, enable the migration and de-commissioning of devices within the service provider network.

With reference to FIG. 4, at 0 a Commissioning Process (CP) is performed. During this process, the Dev_A may be activated when the system 400 is switched-on for the first time. The CP may be triggered locally based upon locally stored policies. In some cases, these policies are securely stored and checked for integrity during boot and run-time. For example, these policies and associated software/firmware functions may be protected using hardware-based security functions (HSFs). The CP may involve one or more HSFs, such as SEs, TEE, TPM, and PUFs. The trigger for enabling PUFs may originate from a software/firmware function that is executed during a secure boot process or from a function that is executed within the TEE. In some cases, there are two PUFS. For example, one PUF (which can be referred to as PUF local) can be for the purpose of commissioning/de-commissioning, and thus can be mainly used and managed locally within Dev_A. Another PUF, which can be referred to as PUF network, can be for operational purposes and can interact with a given TEI. In some examples, only a securely executable process or function can interact and trigger responses from a PUF local. The PUF local may be triggered optionally by an authenticated system administrator. The system administrator may be required to be authenticated using multi-factor means and using a protected/secure user interface.

Still referring to FIG. 4, at 1, a Registration and Provisioning Process (RPP) is performed. Dev_A, which may be powered up for the first time, may be pre-configured to be automatically connected to a specific TEI 308 that may reside on, or may be associated with, the manufacturer of the device. The URL of the TEI 308, IP address, or EAP endpoint address may be pre-provisioned within the device. Alternatively, the Dev_A may send a registration message that is then encapsulated within a protocol (e.g., Radius/Diameter) and sent to the TEI 308. The TEI address may have been pre-configured or derived based on the Id of Dev_A, or sent to a default address of the TEI 308, or to a multicast address shared by multiple TEIs. As part of the registration process, hardware-based mechanisms (e.g., PUFs) may be used in order to generate a credential that is then associated with the TEI 308. The credential, which may be a symmetric key shared between Dev_A and TEI 308, is then used as a master secret for bootstrapping (e.g., using Generic Bootstrapping Architecture) purposes. As used herein, unless otherwise specified, bootstrapping refers to a process in which a security association that is created as a result of an authentication process in one layer (e.g., MAC/LLC layer) is used to generate a security association/security context for another layer (e.g., application layer). Bootstrapping may also encompass the process of using an established security association between two entities, wherein one entity is a trusted third entity (the TEI 308) to generate another security association between the Dev_A and a third entity leveraging the mutual trust with the TEI 308. Thus, a set of generated credentials shared can be shared between two entities and can be used in order to generate another set of credentials that is shared with a third entity, without performing a full authentication with the third entity. Other examples of bootstrapping processes may involve, for example, a reverse bootstrapping, wherein an application layer security association may be used to generate a network layer security association and associate credentials.

As part of the RPP, in accordance with the illustrated example, a list of lifecycle parameters and policies are also provisioned to the Dev_A by the TEI 308. Optionally and additionally as part of this process, there may be a user binding sub-process that is carried out, as described further herein. Alternatively, instead of binding a user with a device, an organization may be bound with the device. The reverse of a RPP process is a De-Registration Process (DRP), which is further described below. In some cases, the outcome of RPP automatically impacts other processes (e.g., Attachment Process, Migration Process, and Decommissioning Process). For example, the TEI 308 may configure Dev_A with new policies for performing other processes, which may enable automated security lifecycle management for Dev_A.

The RPP may include a Software Provisioning Process (SPP). During the SPP, one or more security software components that have been authenticated and verified are provisioned onto the device so that Dev_A may be able to use the credentials appropriately and so that the management of the security lifecycle of the Dev_A is carried out properly. The software components that are provisioned may depend upon the lifecycle parameters and policies that have been provisioned onto the Dev_A. As an example, cryptographic software components (e.g., encryption software that performs AES) may have to be provisioned in order that privacy and confidentiality protection of the data on the Dev_A can be performed, so that data is inaccessible or is only accessible after a certain period of time.

Still referring to FIG. 4, at 2, an Attachment Process (AP) is performed. As part of the AP, the Dev_A is being deployed within a service provider/application provider or home network. During this process, the Dev_A creates a secure association for a finite period with an Attachment Function (AF) (e.g., AF1) that is part of the service provider network, using the trust relationship between the Dev_A and the TEI 308. The AF1 and the TEI 308 may also possess a trust relationship with one another. During the AP, in some cases, the Dev_A and AF1 may have to be provided with customized security software that is required in order to fulfil the policies and security association established between the Dev_A and the AF1. The AF1 may be an entry point (e.g., access point, router, gateway, server) that connects the Dev_A to domains that provide a plurality of services and applications that may be used by Dev_A. The AF1 may perform the role of a policy enforcement point. In some cases, the AF may play the role of a policy decision point. During the Attachment Process, the TEI 308 and/or AF1 may configure Dev_A with new policies for performing Migration Process and Decommissioning Processes, which enable automated security lifecycle management for Dev_A.

At 3, a Migration Process (MP) is performed. The MP may be classified into a Client Migration Process (CMP) and an Attachment Migration Process (AMP). In the CMP, a client, for instance Client 1 that owned Dev_A, may sell it to a different client (e.g., Client 2). During the AMP, the Dev_A that is attached to a domain, (e.g., Domain 1 (D1)) through an Attachment Point 1 (AF1), may be configured and, in some cases, physically transported in order that it is attached to a different service/application provider domain, (D2) using AF2. In an example, a hybrid approach is performed in which the Dev_A is not only sold to a different Client 2, but also attaches to a different domain (e.g., D2) using AF2. During an AMP, the client of the device may remain the same, but the device may perform an attachment with a different service provider via a different AF2. The data on the device may remain the same but data associated with the client that is stored on the prior network may be moved to the new service provider network. Alternatively, the security data on the old service provider may be made inaccessible or sanitized. In some cases, during the AMP, the TEI 308 and/or the new AF (AF2) may configure Dev_A with new policies for performing a future Migration Process and Decommissioning Process, which may enable automated security lifecycle management for Dev_A.

At 4, in accordance with the illustrated example, a De-commissioning Process (DP) is performed. During the DP, the data and the actions of a client that exists on Dev_A may be made unavailable. Mechanisms such as those described for CMP as well as the AMP process may be used. The recovery of confidential and private data on Dev_A may be made inaccessible. In addition, the device may be made completely unworkable. An example of such a mechanism is a Kill-Password (KP). A KP command may be issued from the network or may be issued locally on the device. The services of the Software-based Security Functions (SSF) may be used in conjunction with certain cryptographic procedures. There may be local, organizational, or network policies that govern the DP. These policies and procedures associated with the DP may be executed in a secure environment (e.g. Trusted Execution Environment 308) and may be authenticated and verified for boot/run-time integrity. During the DP, the TEI and/or the AF may configure Dev_A with new policies for performing future Attachment Process and/or Registration and Provisioning Process.

Figure 5:
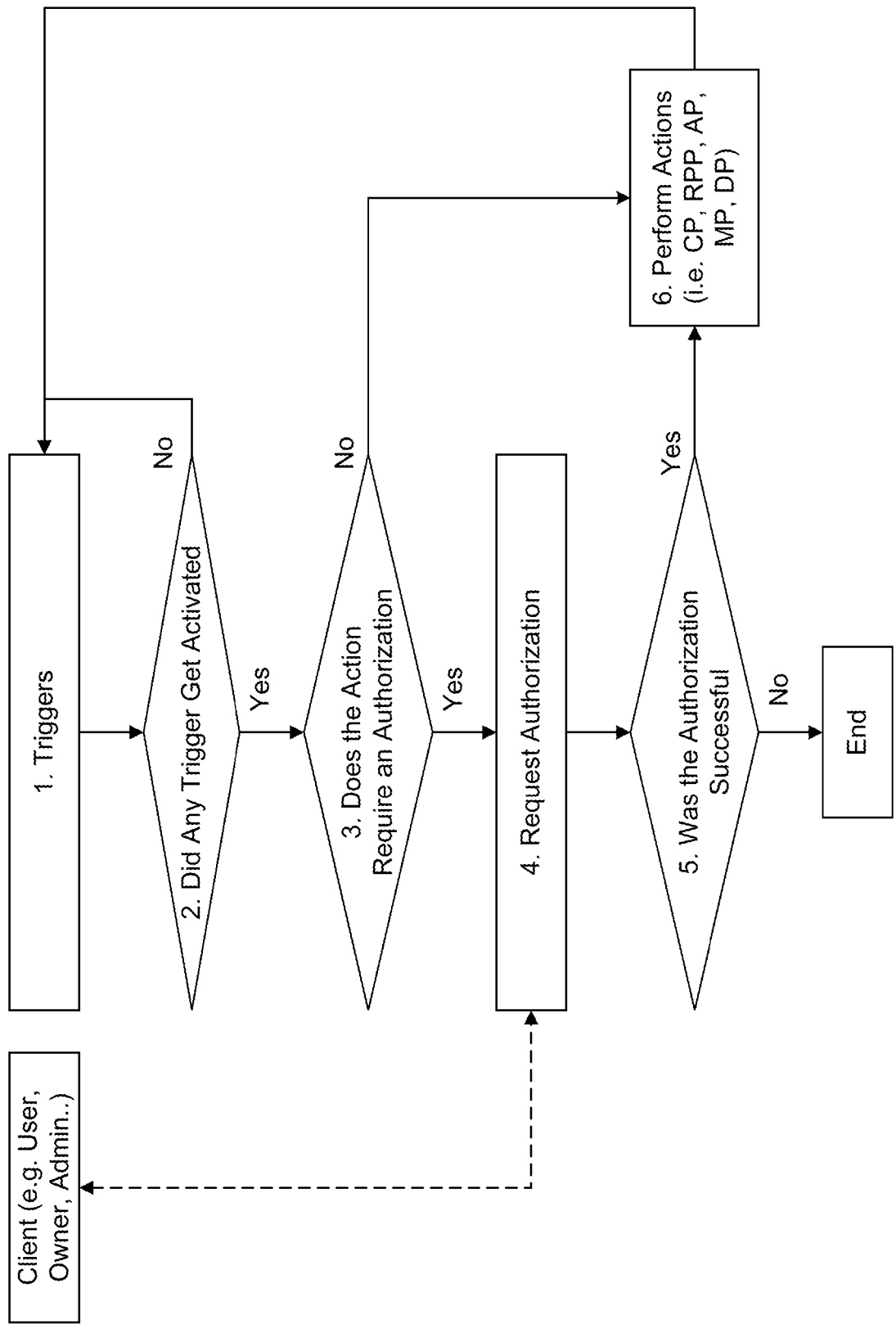
FIG. 5 is a flow diagram for triggering various processes in accordance with an example embodiment.

Various Processes (e.g., Registration, Attachment, Migration, De-commissioning) that are described above may be initiated based upon various triggers. FIG. 5 illustrates a flow chart that depicts an example flow of control at the Life-Cycle Management Function (LCMF) within Dev_A or TEI 308, which is used for performing RPP, AP, MP and DP. In some cases, a Credential Registration Process (CRP) may also be initiated based on the example flow.

Referring to FIG. 5, at 1, a list of trigger conditions is constantly monitored by the SLMF. The trigger conditions may have been pre-provisioned or provisioned as part of the CRP. At 2, the LCMF determines whether a trigger condition has been activated. If a trigger condition may have been activated, the LCMF determines the types of processes to be initiated. At 3, the LCMF determines whether an authorization (e.g., human involvement) is required for performing any of the processes. If the LCMF determines that an authorization is required, then the process may proceed to 4, where the LCMF may initiate an authorization procedure with a user/admin or any other entity that has been deemed to be authorized. The authorization process may involve authentication of the user/admin or any other entity. The types of authentication and strength of authentication may depend upon the types of processes that may have been triggered. If the process requested is a temporary suspension of attachment, in some cases, an authorization may be skipped. Otherwise, if the process requested is a de-commissioning process, an authorization may be required, which may have been preceded by a strong form of multi-factor authentication. The process may proceed to 5, where the LCMF determines whether the authorization was successful. If the Authorization was successful, or if no authorization was required, the process may proceed to 6, where the appropriate security lifecycle management process (e.g., CP, RPP, AP, MP, and/or DP) is performed. After a certain process is performed, the process may return to 1 where the LCMF waits for the next trigger to be activated.

The security lifecycle management processes described herein may be performed automatically based on triggered and corresponding policies. Also, in some examples, a given process may update triggers and policies for performing future processes provided that the messages are integrity protected and the operations are running in a secure manner.

Initiation of the LCMFs may be triggered locally or by a network function (e.g., by means of TEI). The mechanisms by which the triggering occurs may be based upon policies associated with lifecycle management. In the case of local-triggering, the policy may have been pushed down onto the Dev_A by a Network Function (e.g., TEI) a-priori. The local policy may be tailored for each device and their capabilities accordingly.

Triggers may be Locally-driven, Network-driven, or a combination thereof. Example triggers are now presented, without limitation:

Change in location can trigger the LCMF. Change may be determined using secure gps coordinates or using 5G network tracking area update information.

Time-dependent triggering for the LCMF (e.g., triggered by date/time or by duration/expiration of a security context)

Change in the utility of the Dev_A or the application on the Dev_A may trigger the LCMF. An example of such change may be when the functionality of the Dev_A or the application on the Dev_A changes, such as a sensor's utility from one to another. For example, a sensor that is used only as a temperature sensor may change to be both a temperature and a smoke/carbon monoxide sensor).

Malicious or non-malicious physical tampering: This may be triggered, for example, when someone tries to open a sensor or a panel connected to sensor(s), or disassembles certain critical components of the Dev_A.

Change in connectivity: Examples of such may be when the Dev_A changes a service provider or serving network. Connecting the Dev_A to different access points or access technology may trigger the LCMF.

Enablement of new firmware/software/hardware features (or installation of new software, change in configuration, etc.) can trigger the LCMF.

The LCMF can also be triggered by personnel. For example, an initiation of change by an authorized human may trigger the LCMF, or an initiation of change by a machine (e.g., Device Management software) that is configured by a human (without the need for direct human being interaction) may trigger the LCMF.

The LCMF can also be initiated by software applications. An example of such software may be a malware detection (e.g. host intrusion prevention system) software that may trigger LCMF, based upon a detection of a malicious virus/worm or other types of malware that are trying to infect or have infected the Dev_A.

Change of user can trigger LCMF. An example may be when a new, unknown, or unauthorized user attempts to use a device or a particular application on a device.

Factory reset of a device can trigger LCMF.

The LCMF may consist of software, firmware, configuration files, and other data that are used for proper functioning of the life-cycle process. Some entities of the LCMF may be run within a TEE/SE and other functions and parameters may be stored within the rich-execution environment of the Dev_A. The LCMF may be characterized into Life-Cycle Parameters (LCP). Example Life-Cycle Parameters (policy), without limitation, include software (code) that manages local policy and policy execution. In some cases, the LCMF software may have to be executed in a secure environment or in a TEE. Updates of the LCMF functionality may be controlled and patching may be performed periodically and, in some cases, from only known and trusted sources. Life-cycle parameters may also include Credential Management Parameters, such as a credential regeneration period and a credential update parameter (CUP). A credential re-generation period may define how often a new credential that may be used for the life-cycle management process may have to be generated. The period may also define the expiration of the old credentials. The credential re-generation period may have to be synchronized with sleepy node/wake-up cycles.

The CUP may specify the protocol that may be used for the credential update process. In certain cases, a complete authentication process may have to be carried out. Alternatively, a partial process may be carried out using the CUP. The CUP may be based on TLS/DTLS, GBA, EAP-RP or any other protocols that support credential generation. In some cases, the complete protocol might not be required, and thus it may be sufficient to only run ½ Round-trip communication of credential generation parameters between the Dev_A and the TEI.

Example Life-Cycle Parameters (policy), without limitation, may also include cryptographic parameters, for example, which indicate a cryptographic algorithm, a credential Id, or other parameters related to LCM functions. The cryptographic algorithm parameter may identify the algorithm that may be used for credential generation (e.g., Pseudo Random Function) of the credentials used for the LCM process. The Credential Id parameter may identify the credential or set of credentials used for LCM, which may be updated or deleted. In addition to the lifecycle management functionality, software, firmware and parameters that are related to LCM functions, the policies (commissioning, attachment, migration and de-commissioning) and associated parameters may be pre-provisioned to the Dev_A by the TEI 308 or via locally by an entity (e.g., a human administrator or machines connected to the Dev_A using wired or by wireless means).

Figure 6:
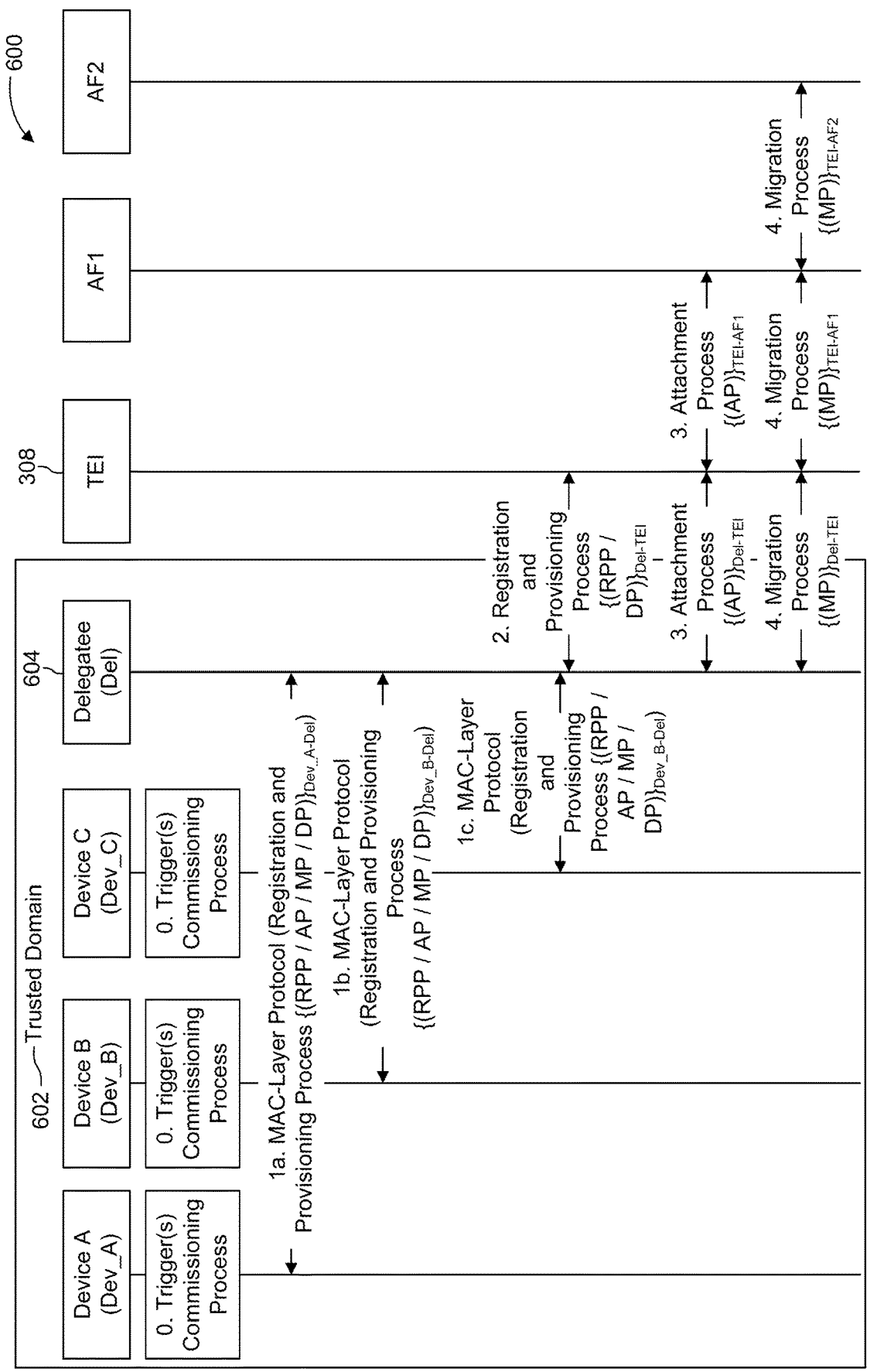
FIG. 6 is a call flow for a delegated architecture in accordance with an example embodiment.

Referring now to FIG. 6, an example delegated architecture or system 600 is shown, wherein a plurality of example devices (e.g., Dev_A, Dev_B, Dev_C.) rely upon a trusted Delegatee (Del) 604 that resides within the same trust domain 602 as the Devices. It is recognized herein that a delegated architecture may be particularly useful in scenarios where the Devices may be constrained and might not have the complete protocol stack built on the devices, thereby limiting their available protocols for external communications over an IP network. A delegated architecture, such as the example system 600, may also be useful when the number of Devices are numerous, thereby limiting the amount of security contexts that have to be maintained at the TEI 308, as well as limiting the messaging that may have to traverse all the way to the TEI 308. In the example delegated architecture 600, the security contexts of the Devices with the Del 604 are generated and maintained within the Trusted Domain 602. The Delegatee 604 has its own trust relationship with the TEI 308. The Delegatee 604 may aid the Devices in performing the RPP, AP, MP and the DP with a given TEI 308. It will be appreciated that the example system 600 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 6, and all such embodiments are contemplated as within the scope of the present disclosure.

Referring to FIG. 6, it will be understood that the illustrated operations may be carried out in any order, and the sequence is not limited to the illustrated sequence, unless otherwise specified. At 0, in accordance with the illustrated example, Dev_A, Dev_B and Dev_C (collectively the Devices) may at some point trigger the Commissioning Process. At 1, the Devices may use a lower-layer protocol (e.g., MAC-layer) for performing RPP, AP, MP and DP with their respective Del 604. The messages may be protected for integrity/authenticity and optionally for confidentiality, for example, using credentials generated as part of the trust relationship that exists between each of the Devices and the Del 604. The credentials may be generated after an authentication and/or authorization process that may be carried out between each of the Devices and the Del 604. The messages may carry a MAC or DS that is generated using the generated credentials and the appropriate MAC generation function (e.g., HMAC-SHA-256). The credentials may be used both by the Devices as well as the Del 604 in order to mutually authenticate the messages sent between the Devices and the Del 604. In some cases, because the Del 604 and Devices are part of the same trust domain 602, the Devices can trust the Del 604, and therefore can offload processes, including the critical processes, that are to be performed by the Devices on to the Del 604.

At 2, in accordance with the illustrated example, the Del 604, upon verifying the authenticity of the messages received from the Devices, and upon determining the authorization associated with the Devices, proceeds to perform an RPP or DP on behalf of the Devices. In some cases, the DP is only performed if a prior RPP has been performed for that particular Device. The messages between the Del 604 and the TEI 308 are protected for integrity/authenticity and/or for confidentiality by using credentials generated based on the trust relationship between the Del 604 and the TEI 308. The messages may carry a MAC or DS, and may be used for mutual authentication between the Del 604 and TEI 308. The Del 604 may perform the RPP for each of the Devices using a session (e.g., TLS, HTTP, CoAP) that is dedicated to each of the Devices. Alternatively, the Del 604 may use a single session, wherein all the Devices are registered simultaneously by means of a list that has the identity of the Devices. The RPP messages may be protected for authenticity and integrity (e.g., using DS or MAC) and optionally for confidentiality using the session credentials (indicated by the Del-TEI credentials) that may have been generated after a successful authentication and an optional authorization process. The Del 604 may perform DP in a similar manner, wherein the messages for the DP may be tailored for each Device or may be performed as a group, so that the Devices may be decommissioned together. The local policies at the Del or explicit indications from the Devices may trigger the RPP or DP.

At 3, the Del 604 may perform the AP, based on triggers that are generated using local policies, or may have been triggered explicitly by the Devices. The Del 604 may explicitly indicate, to the TEI 308, the AF with which the attachment has to be carried out. Or the AF indication may be implicit. For example, the TEI 308 may choose an AF that is appropriate for a particular Devices. Based on the attachment request obtained from the Del 604 on behalf of the Devices, the TEI 308 may perform the AP with the appropriate AF (e.g., AF1) as indicated by the TEI 308, or may perform the AP with an AF that may have been configured locally at the TEI 308. The AP initiated by the Del 604 to the TEI 308, and the corresponding AP from the TEI 308 to the AF1 may be performed in a dedicated Device-specific manner or as a group. The messages between the TEI 308 and AF1 may be protected for integrity and authenticity, and optionally for confidentiality using session credentials generated after mutual authentication and authorization procedures are carried out between the Del 604 and the TEI 308. The AP may be performed as described herein.

At 4, the MP may be triggered locally within the Del 604 or explicitly by the Devices. The Del 604 may indicate to the TEI 308, the AF (e.g., AF2) to which the migration should occur. The AF (e.g., AF2) may alternatively be implicitly conveyed, and the TEI 308 may choose the AF (AF2) with which the MP is carried out. The MP initiated by the Del 604 to the TEI 308, and the corresponding MP from the TEI 308 to the old AF (AF1) and then to the new AF (AF2) may be performed in a dedicated Device-specific manner or as a group. The messages between the TEI 308 and the AFs may be protected for integrity and authenticity and optionally for confidentiality using session credentials generated after a mutual authentication and authorization procedures carried out between the TEI 308 and the AFs using mechanisms described herein.

Figure 7:
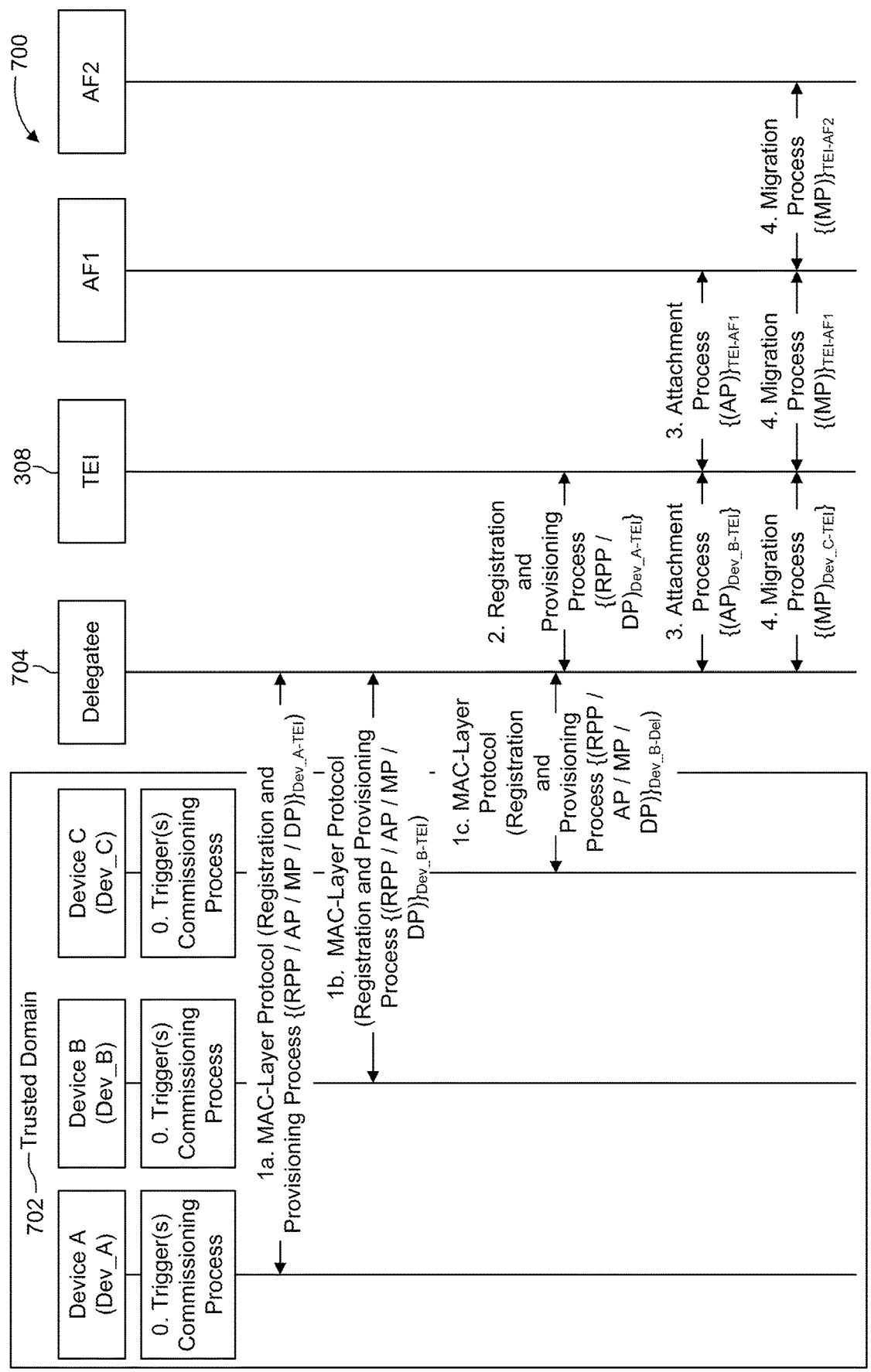
FIG. 7 is a call flow for another delegated architecture in accordance with another example embodiment.

Referring now to FIG. 7, another example delegated architecture or system 700 is shown, wherein a Del 704 does not belong to the same trusted domain 702 as the Devices (Dev_A, Dev_B, and Dev_C). In this example, the Devices have a trust relationship with the TEI 308 and the Del 704 is only used as a conduit that enables protocol translation, as well as a functionality that provides message optimization between the Devices and the TEI 308. Thus, the Del 704 is not directly or completely involved in the lifecycle management of the devices, as this example solution exploits the trust that exists between the Devices and the TEI 308. It will be appreciated that the example system 700 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 7, and all such embodiments are contemplated as within the scope of the present disclosure.

Referring to FIG. 7, it will be understood that the illustrated operations may be carried out in any order, and the sequence is not limited to the illustrated sequence, unless otherwise specified. At 0, Devices (Dev_A, Dev_B and Dev_C) may at some point trigger Commissioning Process. At 1, the Devices may use a lower-layer protocol (e.g., MAC-layer) for performing RPP, AP, MP and DP with the TEI 308 via the Del 704. The triggers for performing the various processes may be triggered locally within each of the Devices. The Del 704 may provide certain services (e.g., routing of messages and consolidation of messages) between the Devices and the TEI 308. The messages may be protected (indicated as a Dev_*-TEI security association) for integrity/authenticity and optionally for confidentiality by means of credentials generated as part of the trust relationship that exists between each of the Devices and the TEI 308. The credentials may be generated after an authentication and/or authorization process that may be carried out between each of the Devices and the TEI 308. The messages may carry a MAC or DS that is generated using the generated credentials and the appropriate MAC generation function (e.g., HMAC-SHA-256). The credentials may be used both by the Devices as well as the TEI 308 in order to mutually authenticate the messages sent between the Devices and the TEI 308. The communications between the Devices and the Del 704 may be optionally protected for integrity and confidentiality using secure protocols (e.g., TLS/DTLS), wherein authentication between the Devices and the Del 704 may be carried out using unique device-specific credentials or using a group credential (e.g., credential shared between the Devices and the Del).

At 2, the Del 704, upon verifying the authenticity of the messages received from the Devices, and upon determining the authorization associated with the Devices, proceeds to forward the protected (indicated as a Dev_A-TEI security association) RPP or DP messages on behalf of the Devices to the TEI 308. In some cases, the Del 704 may wait for a certain time period before forwarding the messages received from the Devices destined to the TEI 308, and before forwarding messages received from the TEI 308 destined to the Devices, for example, so that the messages received from a number of other Devices can be consolidated into a single message. The Del 704 may also optionally perform a protocol translation/encapsulation (e.g., EAP over Radius/Diameter) so that the messages are forwarded between itself and the TEI 308 or Devices in a secure manner (e.g., TLS/DTLS).

Similarly, at 2, the Del 704 may forward the protected (indicated by the Dev_B-TEI security association that exists between the Dev_B and TEI) messages for AP from/to the Devices to/from the TEI 308 in a secure manner. The AP may be performed using mechanisms described herein.

At 4, the MP may be locally initiated by the Devices, or in certain cases by the TEI 308. The MP messages between the Devices and the TEI 308 may be protected (indicated by the Dev_C-TEI security association that is created or existed between the Devices and the TEI) and forwarded by the Del 704 to/from Devices from/to the TEI 308. The messages between the TEI 308 and the AFs may be protected for integrity and authenticity and optionally for confidentiality using session credentials generated after a mutual authentication and authorization procedures are carried out between the TEI 308 and the AFs, as described herein.

It will be understood that the system 600 and the system 700 can define a hybrid architecture or system, wherein the Devices may have a trust relationship with the Del as well as with the TEI 308. The Devices may use the trust relationship with the Del (provided that the Del belongs to the Trusted Domain), in some examples, to perform select important and critical security processes, such as CP and DP for example, while the RPP, AP, MP may be performed with the aid of the TEI 308.

Turning now registering a given device with the TEI 308, the device may be provisioned with appropriate security software and parameters so that the device behaves and operates in a secure manner. The registration process may involve, for example and without limitation, the registration of the various credentials associated with long-term association, data protection (e.g., integrity, authenticity, and confidentiality), and credentials associated with life-cycle management (e.g., attachment, migration, and de-commissioning). Provisioning processes may involve the enablement of appropriate hardware components and the provisioning of appropriate security parameters. This process may involve multiple sub-processes such as, for example, a Credential Registration Process (CRP), Software Provisioning Process (SPP), and a Secure Domain Provisioning Process (SDPP).

Figure 8:
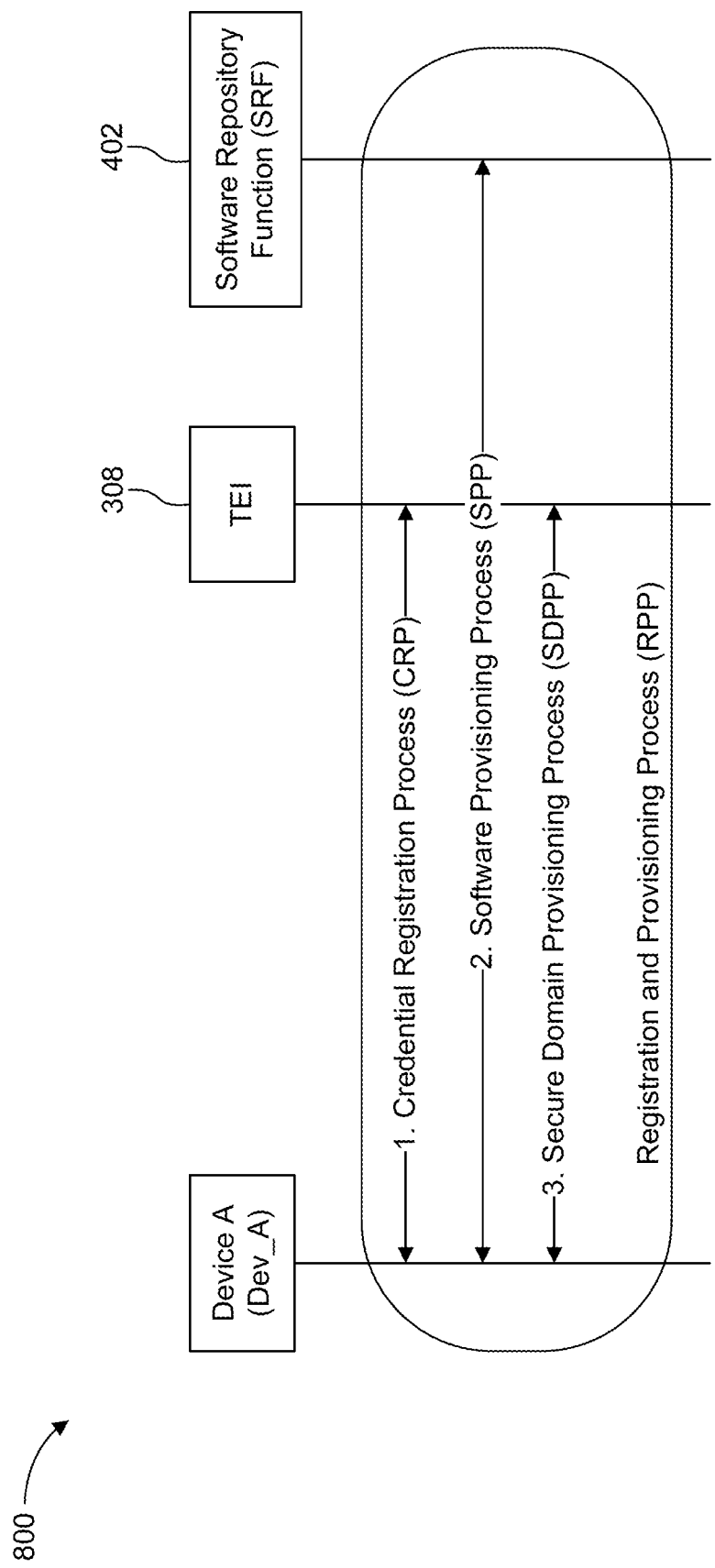
FIG. 8 is a call flow for a credential registration and provisioning method in accordance with an example embodiment.

Referring to FIG. 8, an example system 800 is shown to illustrate an example CRP, SPP, and the SDPP. It will be appreciated that the example system 800 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 8, and all such embodiments are contemplated as within the scope of the present disclosure. In accordance with the illustrated example, a list of credentials is generated that is used for the general protection of the following communications between the Dev_A and the TEI 308, and optionally for protection of data on Dev_A. In some cases, the local policies on the device takes precedence for the protection of data and operations performed locally on Dev_A. Thus, the local policies may override policies and procedures dictated by the TEI 308. In some cases, for the protection of data locally on Dev_A, Dev_A may be driven by the policies and procedures decided by the TEI 308. Thus, the policies from the TEI 308 may over-ride local policies. Example credentials that may be generated by the device on the device may include the following, though it will be understood that the credentials are not limited to the examples presented below:

Long-term Master Credential (Associated with TEI): This is the credential/credential identity that is shared between the device and the TEI 308. In an example, this credential is not changed unless there is a breach in security, or when the security association/context between the device and TEI 308 expires or is terminated. The security associations may be generated out of this Long-term master credential. The long-term master credential may be associated with a security association/context that is established after the CRP procedure.

Master Credential Identity: An identity that is used to identify the security context/association and the associated credential.

Master Key: The credential that may be a shared secret that provides long-term security. It will be understood that the length strength of this credential is sufficiently robust.

Session Credentials (Associated with TEI): These are temporary credentials and associated credential identities that are shared between the device and the TEI 308. The session credentials may be purged on the completion of a session. New session credentials may be generated for a newer session between the device and the TEI 308. Session credentials may be derived from the long-term Master Key.

Session Identity (temporary identity)/Session Credential Id: In an example, for each new session, a temporary session identity is used. In case of privacy requirements, the session identity may be unique, non-trackable, and non-traceable.

Authenticity and Integrity Key: This key may be used for computation of the MAC or as a digital signature of a message exchanged between the device and the TEI 308.

Confidentiality Key: This key may be used for encrypting the messages or components within a message exchanged between a device and the TEI 308.

Key Encryption Keys: These may be used to transport keys in a secure manner.

Local Credentials: These credentials may be generated based on an "on-demand-basis" from the Master Key. The generation of the credentials and key expansion may be determined based on local policies that ensure that there is enough entropy in generating the credentials. In some cases, certain critical local processes or applications may need to have their own Local Credentials that may be used for identifying the processes locally so as to provide authorization to perform certain tasks. The process may request these local credentials at boot time to a credential generation and registration application running within a SE/TEE on the device. These local credentials may be used to create a local secure channel between the processes/applications.

Local Credential Identity: It is used to uniquely identify the credentials involved. This identity may be used to uniquely identify the credential set associated with the process.

Local Data Integrity Key: This kay may be used for computation of a MAC/DS associated with a message generated by the local process when it wants to communicate with another local process/application.

Local Data Confidentiality Key: This key may be used by the local process to encrypt the messages exchanged between the local processes.

Binding Key: A binding key may be used to cryptographically bind a user or an organization to a device. In some cases, binding a user/organization to the device authorizes the user or an organization to be able to completely control and manage the device. Any messages that is used for control or management of the device may be authenticated using the binding key or a derivative of the binding key.

In some examples, the determination of the mechanisms for credential derivation, type of credentials, lifecycle management, storage, and dissemination of the credentials may be based upon pre-provisioned policies on the device, which may be negotiated between the device and the TEI 308 during the CRP or pushed to the device as part of the CRP 308 by the TEI.

Credential derivation may be based upon hardware or software based Security Functions (SFs). Hardware-based Security Functions (HSFs) may be hardware-based or hardware-anchored. In some examples, at least two Physically Unclonable Functions (PUFs) are included within a device. An example external PUF (PUF E) may be used for the generation of a Long-term Credential (Master Credential and associated Master Credential Id) with a TEL An example local PUF (PUF L) may be used locally for providing confidentiality and/or integrity to locally stored confidential data and actions performed by the device. In addition, the PUF L may be used for Commissioning or De-commissioning Processes. In some cases, if only a single PUF is available, it may be used only as a Local PUF. In some cases, where the security requirements might not be very stringent for example, having separate PUFs might not be warranted, and thus the functionalities of both the Local PUF and External PUF may be incorporated into a single PUF. In those examples, the input values (e.g. data) are distinct to generate the Local Credentials and to have high entropy.

In some examples, the PUFs are chained to one another. In such an example, the entropy produced by the chained PUFs may be greater than the entropy produced by a single PUF of the same type. For example, the entropy produced as a result of more than one PUFs that are chained may be greater than the entropy produced by just a single SRAM PUF. Various software-based security functions (SSFs) can be used in order to derive security credentials and perform cryptographic operations.

As part of a given CRP, a given device (Dev_A) may perform a device identification and registration followed by a verification and provisioning process with a given TEL In some cases, the Dev_A initiates the CRP with the TEL In other cases, a Network Attachment Function (NAF), such as WiFi Access Point, Proxy, Gateway, Router or an eNodeB, may initiate the CRP on behalf of the TEI with the Dev_A. The NAF may initiate CRP, if it determines that the Dev_A that is within the vicinity of its network has been powered-on for the first time, or upon determining that the Dev_A does not have an appropriate identity (e.g., identity that does not belong within its trust domain) and cannot be authenticated.

In an example CRP, Dev_A initiates a Device Credential Registration process with a given TEI, for instance the TEI 308. As mentioned previously, a solicitation message from a NAF (e.g., WiFi AP, Router, Gateway, etc.) may trigger the Dev_A to issue the Device Credential Registration process with the TEI 308 via the NAF. Dev_A and the TEI 308 may examples, Dev_A registers SFs (e.g., HSF) and the associated identifiers and credentials with the TEI 308. In other examples, negotiation (back-and-forth messaging) between Dev_A and the TEI 308 concerning appropriate SFs that can be used and the mechanisms used for generation and usage of credentials may be performed. Dev_A may also provide the TEI 308 with information associated with sleep cycles and computing/storage/battery limitations of the device. An example list of parameters that can be provided to the TEI 308 by Dev_A is shown in Table 1. It will be understood that this parameter list is a non-exhaustive list, and that for some examples, a sub-set of the list and their associated detailed parameters may be conveyed to the TEI 308, so as to address various security and privacy concerns.

TABLE 1

Example List of Security Parameters that can be Provided to the TEI by the Device during an RPP

| No. | Class of Function | Capability/ Type | Identifier | Purpose | Detailed Parameters |
|---|---|---|---|---|---|
| 1 | Security Function | SSF/ Protocols | Crypotsuite_ver | Authentication/Coms Security | e.g. (D)TLS, EAP and associated version |
| 2 | | HSF/PUF | PUF_Id1 | Authentication with TEI | Remotely activatable |
| 3 | | | PUF_Id2 | Integrity/ Confidentiality protection of data/ actions on Device | Locally controlled - May not be revealed for privacy |
| 4 | | HSF/SE | TEE_Id1 | Secure Operations | Version/type |
| 5 | | | UICC_Id1 | Secure Operations | Type |
| 6 | | HSF/TPM | TPM_Id1 | Trusted Boot | Version |
| 7 | Device Capability | Computing Power | N/A | N/A | 1.2 Ghz |
| 8 | | Battery | N/A | N/A | 20 mA |
| 9 | | Memory | N/A | N/A | 500 Gb |
| 10 | | Sleep Mode | N/A | N/A | Configurable |
| 11 | User/ Organization Binding | Password/ Biometric protected | Type of Biometric/ Resolution | Binding of the user/ organization to the device | Number of biometric factors usable | create an un-authenticated secure connection by means of TLS/DTLS using Diffie-Hellman (DH) key exchange (e.g., ECDH or ECDHE suites). Alternatively, the TEI may be authenticated by means of a TEI certificate that was pre-provisioned (pre-provisioned with certificate chain) or obtained as part of the TLS/DTLS handshake process, and a TLS/DTLS secure connection may be established using RSA mechanisms (e.g., TLS_TLS_RSA_WITH_AES_128_CBC_SHA256 with or without the use of DH). In some cases, Dev_A is not identified or authenticated during the secure connection establishment process. In some cases, Dev_A may be identified using an RFID-tag, barcode, QR Code, IMEI, some forms of Unique Device Identifier (e.g. UDID), or other device identifiers. In various examples, however, the TEI 308 does not authenticate the device. In some cases, a remote attestation (e.g., platform integrity check) of the device and its platform may be performed.

Continuing with the CRP example, registration may involve the registration of the types and identity of the credential generation function, associated credential(s), and the capabilities of the Dev_A from a security/cryptographic function perspective. During this process, the Dev_A may provide information about the presence of HSFs, SSFs, and the scope of these functions to the TEI 308. In some Based on the security information and device information provided to the TEI by the Dev_A, the TEI may determine appropriate security parameters, security software components, and security policies for the Dev_A. In some cases, the provisioning of the security parameters and software components might not only depend upon the determination made by the TEI, but might also depend upon the request made by Dev_A. A negotiation may be performed between the Dev_A and the TEI in determining the parameters, secure environment, and software components. The TEI, based on the analysis/request/negotiations, may provision the security parameters and policies onto the Dev_A. In addition, the TEI may initiate the provisioning of software components and the provisioning related to the secure environment. Example parameters/values provisioned to the device by the TEI may include, without limitation:

Cryptographic parameters (e.g., data value, software, middleware) and indications associated with, for example and without limitation:
Key Generation, which may be non-binding (e.g., indicates whether user/organization binding is required or present) or binding with user/organization (e.g., indication of whether user/organization binding is required and the type of binding, such as whether cryptographic).

Integrity Protection, such as which hash functions (e.g., SHA-256, SHA3) are used for derivation of an Authentication Tag (AT), which may include a Message Authentication Code (MAC) or digital signatures using RSA, DSA, keyed HMAC, etc.

Confidentiality Protection, such as parameters including the algorithms (e.g., AES) for performing encryption.

Authentication, which may include credentials that are provisioned such as a public key of the TEI, a certificate associated with a public key or a symmetric key, a certificate chain for trust building, etc.

Security policies, which may include policies associated with, for example and without limitation:

Credential Generation, such as the type of cryptographic algorithms that are required for the generation of credentials (e.g., Pseudo-random Functions)

Security protocols, such as which security protocols that are to be used (e.g., TLS, DTLS, EAP) for the various life-cycle management processes (e.g., AP, MP, DP etc.) described herein. In some cases, the list of protocols and associated algorithms may be strictly used in order to avoid bidding-down attacks. The protocols may be used for authentication and secure communications establishment between the Dev_A and the TEI, or between the Dev_A and other entities (e.g., with an AF).

Life-time of keys, which may provide information on when one or more credentials associated with the various processes/security contexts expire.

Re-authentication, which may indicate information concerning which parameters and protocols may be used for re-authentication. An example of such a parameter and protocol is an Extended Master Session Key (EMSK) in the case of an EAP Re-authentication Protocol.

Authentication Policies with TEI, which may include policies related to authentication with the TEI The Authentication Policies may determine how often (e.g., time-based, context-based) and by what means (e.g., protocols, algorithms, keying mechanisms such as symmetric/asymmetric, SSFs, etc.) authentications are performed.

Attachment Process Policies (AtP), which may include, for example and without limitation:

Key Generation Policies, which may relate to key generation for attachment, and which may be dictated by the service provider.

Authentication Policies, which may dictate whether symmetric/asymmetric keying mechanisms have to be used for performing attachment with an AF. Additionally, these policies may determine how often (e.g., time-based, context-based) or by which means (e.g., protocols, algorithms, keying mechanisms such symmetric/asymmetric, SSFs, Bootstrapping support, Bootstrapping mechanism—GBA, etc.) attachment is carried out.

Integrity and/or Confidentiality protection policies, which may describe what type or class of message or data may have to be protected. As an example, a policy may dictate that the "signaling" messages must be protected for integrity and authenticity, and may dictate or stipulate the class of algorithm to be used (e.g., HMAC-SHA-256).

Migration Process Policies, which may include, for example and without limitation:

Policies relating to the triggers that initiate migration, such as Network-triggers or local (device)-triggers.

Endpoint Identity of Migration Anchor, which may provide information of the network or the domain to which a given device (Dev_A) may migrate. In one example, a given Dev_A may only migrate to networks with a particular domain name (e.g., @att.com, @verizon.com, etc.).

Key Generation Policies, which may include migration-specific key generation policies that may be different from generic key generation policies.

Authentication Policies, which may indicate the type and strength of the authentication algorithms. These policies may also dictate that a given device has to authenticate the AF using the AF's certificate, or the AF has to authenticate the device using the device's certificate.

Integrity and/or Confidentiality protection policies, which may dictate whether the messages that carry migration information may be protected for integrity and/or confidentiality. These policies have also indicate the strength (algorithm/key length, etc.) of such protections.

Data Purging Policies: These policies may determine which data or class of data must be deleted/purged. In some cases, the policies might explicitly state that any information that has security and privacy implications should be purged. As an example, cryptographic keys/credentials, private data such as browsing information that may be cached at the AF, or content information cached at the AF may have to be purged.

De-commissioning Process Policies, which may include, for example and without limitation:

Triggers to initiate de-commissioning process (Network-trigger or local (device-based triggers)).

Endpoint identity of De-commission Anchor, which may include an IP address or higher-layer address of a server/gateway or a new TEI.

Local de-commissioning policies, which may dictate how the local decommissioning process is carried out, the local entities that are responsible for performing the local decommission, or whether a total de-commissioning occurs or whether a partial, local data purging operation is performed.

Algorithm type and Key Generation Policies for local de-commissioning, which may indicate, for example, if encryption of the local data is to be carried out, key generation parameters for that process. For example, key generation parameters may indicate entropy of the key, key length, type of credentials to be generated (e.g., symmetric), or type of algorithm to be used (e.g., AES).

Policies for authentication with Local entity or De-commissioning Anchor. For example, if there is a local proxy entity instead of the TEI, or an external anchor node (e.g., delegated node) that can aid in performing local De-commissioning, then these policies may be associated with the type of connectivity with that anchor that is provided. For example, operations associated with off-loading some of the decommissioning processes by the TEI to this anchor and ensuring the privacy and separation of domain associated with the Dev_A may be indicated within the policies.

Integrity and/or Confidentiality protection policies for local data and actions, which may cover any information exchange between a given Dev_A to the TEI via the anchor. These policies may indicate end-to-end authentication and confidentiality protection etc. Any internal communications between processes may be protected for integrity as well as confidentiality.

In addition, to the provisioning of the security credentials, the secure operations environment may be provisioned on the devices in various examples.

In an example, based upon the profile that was provided as part of the CRP by a device to the given TEI, the TEI may determine that certain security software may have to be provisioned to the device. In some cases, the software components that are provisioned to the device are not limited to security. For example, software components that aid in performing security functions may be provisioned, and those software components are limited to security software components. Examples of such software may include the latest security patches that may have to be applied to the kernel, device drivers, operating system (OS), and applications residing on the device. Additional software components may be added so that the device is able to perform the various operations/processes related to security lifecycle management. Examples of such software components include, without limitation, security software components such as security protocols (e.g., EAP, (D)TLS, IPSec, PANA, etc.), Cryptographic suites (e.g., AES-128/192/256/384, HMAC-SHA-256/512, etc.), and a Secure Environment (SE) (e.g., Trusted Execution Environment (TEE), etc.). Examples of security components also include non-security software components (e.g., diameter protocol, device management protocols) that enable security, such as trusted applications that enable the implementation of the policies, enforcement of the policies, and reporting of the enforcement to the policies.

The Secure Domain Provisioning Process (SDPP) may be based upon processes specified by the Global Platforms Group (GPG) for the creation or enablement of Trusted Execution Environments (TEEs). A given SDPP may be employed based on the list of capabilities provided by a given device (Dev_A) during the SPP. The SDPP may involve the provisioning of other trusted applications within each environment. Once a secure environment is created within the Dev_A or enabled within the Dev_A, the Dev_A may interact with another Trust Anchor (e.g., Trusted Service Manager (TSM)) that is responsible for that particular environment. The SDPP process may be carried out between the Dev_A, the TEI, or another TEI/TSM.

Figure 9:
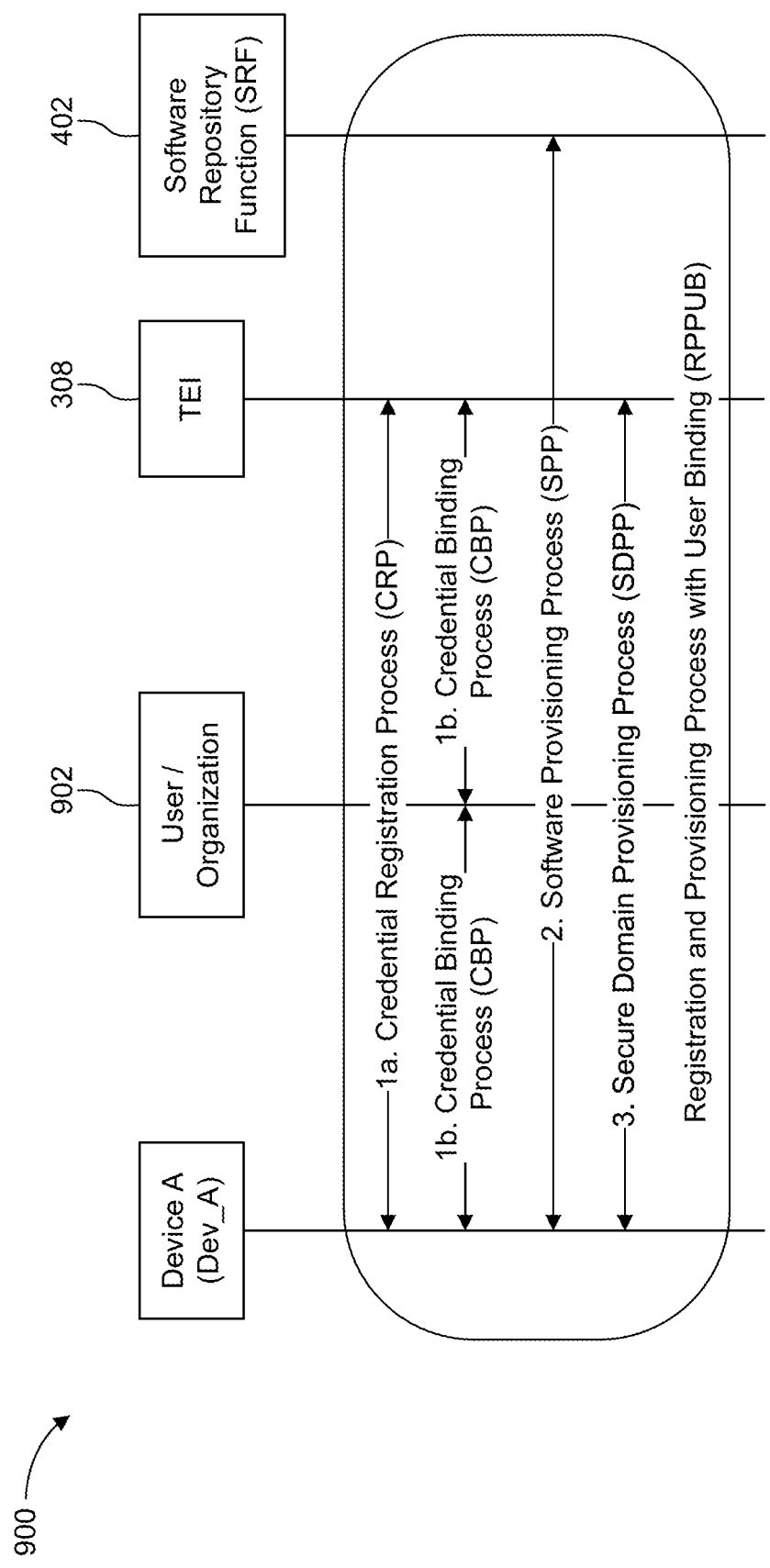
FIG. 9 is a call flow for a credential registration and provisioning method with user binding in accordance with another example embodiment.

Referring now to FIG. 9, an example system 900 is shown in which a device (Dev_A) is bound to a user or an organization 902. The binding of the user 902 to the device may be performed using policies, or a using combination of policies and cryptographic processes. In order to bind the device to the user 902, the user 902 may provide a password, which may then be used to generate a key (also called a "user credential"), using algorithms such as PKBDF2, scrypt, argon2, etc. The key can be used to bind with a device credential (e.g., PUF-generated device credential). Alternatively, a PUF may be used for the generation of the user credential, using a password as one of the inputs. In another example scenario, a certificate that vouches for the ownership of the Dev_A to the user/organization 902 may be issued by the TEI to the owner entity (e.g., user/organization 902) and stored on the Dev_A. The certificate may be stored in a secure environment within the Dev_A, and/or encrypted using security credentials that may be generated by the TEI and the Dev_A. It will be appreciated that the example system 900 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 9, and all such embodiments are contemplated as within the scope of the present disclosure.

Referring to FIG. 9, at 1b, in accordance with the illustrated example, the example Registration and Provisioning Process with User Binding (RPPUB) involves the TEI 308 initiating a process that involves the user/organization 902 and the Dev_A. The TEI 308 may optionally authenticate the user if the user is involved. If the owner entity is an organization, then the TEI might involve a trustworthy machine (which may be a trusted device management entity) within the organization during the RPPUB and may obtain the list of devices that may have to undergo a RPPUB beforehand from the trusted management entity of the organization. Alternatively, if a user is involved, he or she may be authenticated locally on the Dev_A using multifactor authentication, and then an assertion may be sent from the Dev_A to the TEI 308. The TEI 308, upon verifying the assertion, may record the successful authentication and proceed to step 2.

As part of the attachment process (AP), an activation sub-process may be performed before the operational sub-phase occurs. During the operational sub-phase, possible suspension and resumption of services may also be performed/requested. The TEI 308 may perform a prominent role, or alternatively might not be involved, during the AP. In some cases, the security policies that are provisioned by the TEI 308 during the RPP is used by the Dev_A in order to perform the AP. The opposite of the AP is a De-Attachment Process (DAP), which is described further herein.

As part of the AP, the Dev_A and the AF1 may establish a secure connection between them, based on mutual authentication performed by the Dev_A and AF1. The mutual authentication of Dev_A and AF1 may be based upon a credential bootstrapping process involving Dev_A, TEI 308, and AF1. For example, Dev_A may leverage a prior authentication that was performed between the Dev_A and AF1 using the credentials that were provisioned as part of the CRP. If the lifetime associated with the prior authentication has expired, then a new authentication between the Dev_A and the TEI 308 may be carried out.

As a result of a successful authentication, the AF1 may provision the Dev_A with one or more credentials that enable the Dev_A to be able to access services, applications, and other entities under the jurisdiction of AF1's domain. In an example, the AF1 performs the role of a domain controller. The credentials provisioned by AF1 may include longer-term symmetric credentials (e.g., PSK) or a certificate and, in some cases, an access token (e.g., OAUTH token) is derived or provisioned to the Dev_A. In the case in which the credential is derived, the credential may be generated based on the current security association established between the Dev_A and AF1. In other cases, when a fresh security association between the Dev_A and TEI is not present, then the Dev_A and TEI may perform a new authentication. If a bootstrapping process is not required to be used, then the policies might not require for a fresh (active and valid authentication determined by a time period) and an active security association between Dev_A and the TEI 308. If the policies at AF1 states that a bootstrapping process between the Dev_A and TEI 308 may be used for establishing a security association between Dev_A and TEI 308, then a valid and fresh security association between Dev_A and TEI 308 is initiated if not already present.

As mentioned previously, the establishment of a security association between the Dev_A and AF1 need not be based upon a bootstrapping process between the Dev_A and TEI. A security association between the Dev_A and AF1 may be created based on pre-provisioned credentials at the AF1 and Dev_A, and associated to one another.

The security association created between the Dev_A and AF1 may be used to bootstrap further security associations between Dev_A and other entities within the jurisdiction of AF1. In some cases, the procedures are automated based on a domain identity (ID) associated with AF1. As an example, if Dev_A wants to be connected with another network entity within the same domain, then based on the domain ID that is obtainable from the Network Access Identifier (NAI) of the network entity, the bootstrapping process may be carried out. In such cases, the security association between Dev_A and the TEI 308 might not be leveraged again, but the security association between Dev_A and AF1 may leveraged to create newer security associations between Dev_A and other entities within the domain of AF1. For security reasons, in some examples, the bootstrapping process between Dev_A and AF1 is only leveraged for entities under the jurisdiction of AF1, or to the domain to which AF1 belongs. In order to bootstrap security parameters for entities within other domains that are not under the jurisdiction of AF1, the Dev_A may leverage the security association between Dev_A and TEI 308, wherein the decision may be based on the domain identity associated with the TEI 308 and AF1. In some cases, the domain identities may be verified by examining the digital signatures from the corresponding entities (e.g., TEI, AF1, or any other entity within AF1) and their associated digital certificates. The bootstrapping process may be performed using some form of negotiation, wherein the security requirements and parameters may be exchanged between the bootstrapping entities. Some of the parameters exchanged may include the protocol used for bootstrapping, the cryptographic strength (e.g., algorithmic, key lengths), type of protection, etc.

As part of the AP, appropriate security parameters may be provisioned by the AF1 to Dev_A, or derived by Dev_A based on security policies provisioned to it by the TEI 308 and/or AF1. Security parameters may be provided to the AF1 by the TEI 308 during the bootstrapping process. Examples of security parameters are listed below, without limitation, and example security parameters are also listed in Table 1 herein.

Protocols for secure association, which may indicate the protocol usable for bootstrapping (e.g., GBA, EAP), and the protocol used for secure association once the bootstrapping is completed (e.g., TLS, DTLS), etc.

Type of security functions (SFs), which may indicate the presence of device-based protection (e.g., availability of TEE, SE) or hardware-based properties (e.g., type of PUF, number of PUFs, etc.).

Type of protection (data-at-rest, data-in-transit, replay protection), which indicates whether data is protected throughout its lifecycle, and also other security features (e.g., replay protection of messages/data).

Credential type/length, which indicates whether the credential is a public or symmetric key, and indicates lengths associated with the credential.

Entropy that is associated with generated random numbers (nonces) or associated with credential generation.

Recommended lifetime of the credentials, which may indicate the how often the credentials have to be renewed.

Device Capability, for example, whether devices supports a sleepy mode and whether duration of sleep in such a mode is configurable.

Policies, which may indicate, for example and without limitation, operational, suspension, resumption, migration, and decommissioning policies.

Figure 10:
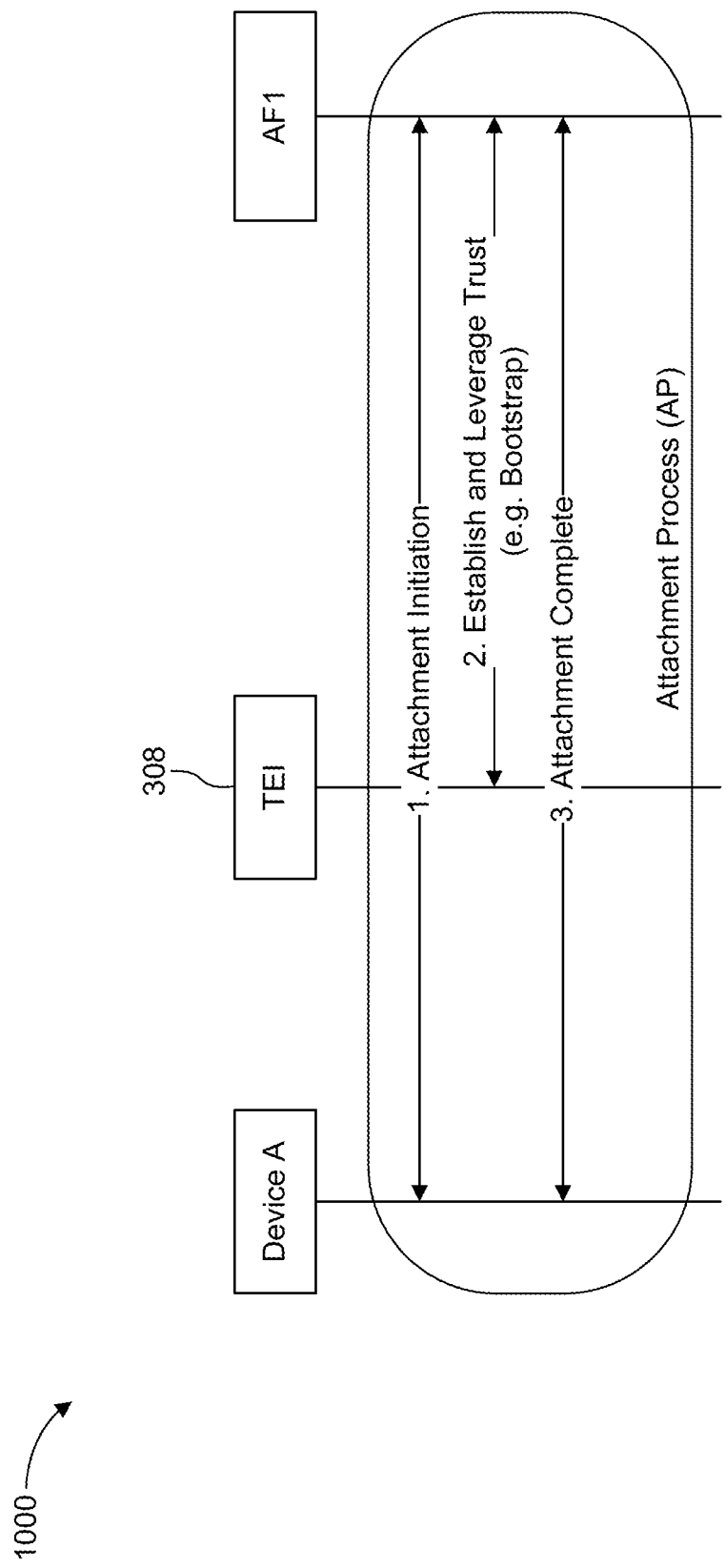
FIG. 10 is a call flow for an attachment method in accordance with an example embodiment.

Referring to FIG. 10, an example attachment process (AP) is shown that is performed in an example system 1000, which includes a device (Dev_A), the TEI 308, and an attachment function (AF1). It will be appreciated that the example system 1000 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 10, and all such embodiments are contemplated as within the scope of the present disclosure. At 1, attachment initiation is performed. During attachment initiation, a device (Dev_A) requests attachment with an AF (AF1). As part of this process, the Dev_A may provide its temporary identity (e.g., Session Credential ID) to the AF1. As part of this process, the Dev_A may provide relevant attachment process policies (AtP) to the AF1. The AtP may be used by the AF1 to select appropriate security protocols, algorithms, bootstrapping support, and protocols for credential lifecycle management, etc. In some cases, the AtP that are provided to the AF1 do not leak sensitive information, and private information and cannot be used to perform other attacks by AF1 to the TEI 308 or to the Dev_A. In another example, the Dev_A does not provide any policies to AF1. Alternatively, the Dev_A and the AF1 may perform a negotiation of security parameters and protocols, etc. with one another in order perform the attachment process and maintain the attachment.

At 2, in accordance with the illustrated example, trust is established and leveraged. Based upon the temporary identity that was provided to the AF1 by Dev_A, the AF1 identifies the appropriate TEI (e.g., TEI 308) and establishes dynamic trust (if such a relationship did not already exist) and sets up a secure connection between the AF1 and the TEI 308 using the policies that were provided to the AF1 by Dev_A. In an example in which policies are not provided by Dev_A to AF1, AF1 may use standards to establish trust, and then AF1 may request the TEI 308 to provision it with policies for attachment. The AF1 may present the Session Credential ID of the Dev_A to the TEI 308, and request for the generation of security parameters, so that a secure attachment can be established between the AF1 and Dev_A. The TEI 308 may perform a security bootstrapping procedures in order to generate attachment credentials. Once the attachment credentials or credential generation (e.g., key generation material) are provided to the AF1, along with policies for attachment, the session may be terminated.

At 3, the Dev_A and the AF1 performs credential generation using the credential generation material (e.g., keying material) that was provisioned, and sets up a secure connection between the Dev_A and AF1. Additional keying material may be generated between the AF1 and Dev_A so that future communications may be secured. In addition, the AF1 may provision the Dev_A with domain-specific policies that may be enforced on the Dev_A. Compliance to certain critical policies on the Dev_A may be performed by the software code residing on the TEE. The policies may dictate credential generation procedures and algorithms, expiration of credential and credential re-generation procedures. It will be understood that the procedures described with reference to FIG. 10 may be piggy-backed over an OpenId-like protocol or other bootstrapping protocols, such as GBA for example.

An opposite approach to the AP is the De-attachment Process, wherein the Dev_A would like to be de-registered with AF1 and AF1's domain. The de-attachment process may be triggered based on policies or other contextual triggers (e.g., location, change in lower-layer attachment, tampering, malware detection etc.), which are further described herein.

Migration of the Attachment from an AF to another AF may be carried out using trust established between the Dev_A and the TEI. As part of an example attachment migration process (AMP), Dev_A performs an attachment with AF2 and migrates the relevant data stored at AF1 to AF2. The TEI may be involved with the migration process or might not be involved. In some cases, the AF1 may be involved in the migration process or the migration process may be anchored at the TEI. The AMP may involve the movement of Dev_A's data from within the domain associated with AF1 to within AF2's domain. In addition, data stored within entities belonging to the same domain as AF1 may be purged based on a process initiated by the TEI or the Dev_A. Alternatively, policies at the AF1, which are executed in a trusted manner, may initiate a data migration and purging process with little or no input from the TEI or Dev_A. In some cases, data that is stored at AF1 that protected for confidentiality/privacy may have to be purged from within the domain of AF1 based on MP. This purging may ensure that any exposure of credentials or breakage of cryptography in the future does not result in leakage of confidential/private data associated with the Dev_A.

Policies associated with migration may be used in order to initiate an AMP. The migration policies may be interpreted and enforced by the Dev_A, TEI, and/or AF1. The migration policies may be provisioned by the TEI and may be determined based on negotiation performed during the RPP. An AMP may be triggered based on, for example and without limitation: a detachment process initiated with an AF1; an AP initiated with an AF2; context (e.g. time-based), wherein AMP is automatically initiated after a certain time period; location; and expiration of subscription (lack of subscription credit); a change in hardware or software; a change in user of the Dev_A; a factory reset of Dev_A; or a combination thereof.

In an example of TEI-initiated AMP, the TEI may contact the currently attached AF1 and initiate a migration with the new AF2. If the migration policies required protection of data stored on the network entities under the jurisdiction of AF2 as well as protection of data and transactions on the Dev_A, then, in some cases, it is assumed that the data is protected for confidentiality/privacy in order that no leakage of data in the present and future occurs. The TEI, in coordination with AF1 or entities under the jurisdiction of AF1, may initiate a data purging process (deletion of data) on the entities stored within entities on AF1. Deletion may involve permanent deletion as well a non-permanent deletion of data on the network entities (e.g., database servers) within the jurisdiction of AF1.

Figure 11:
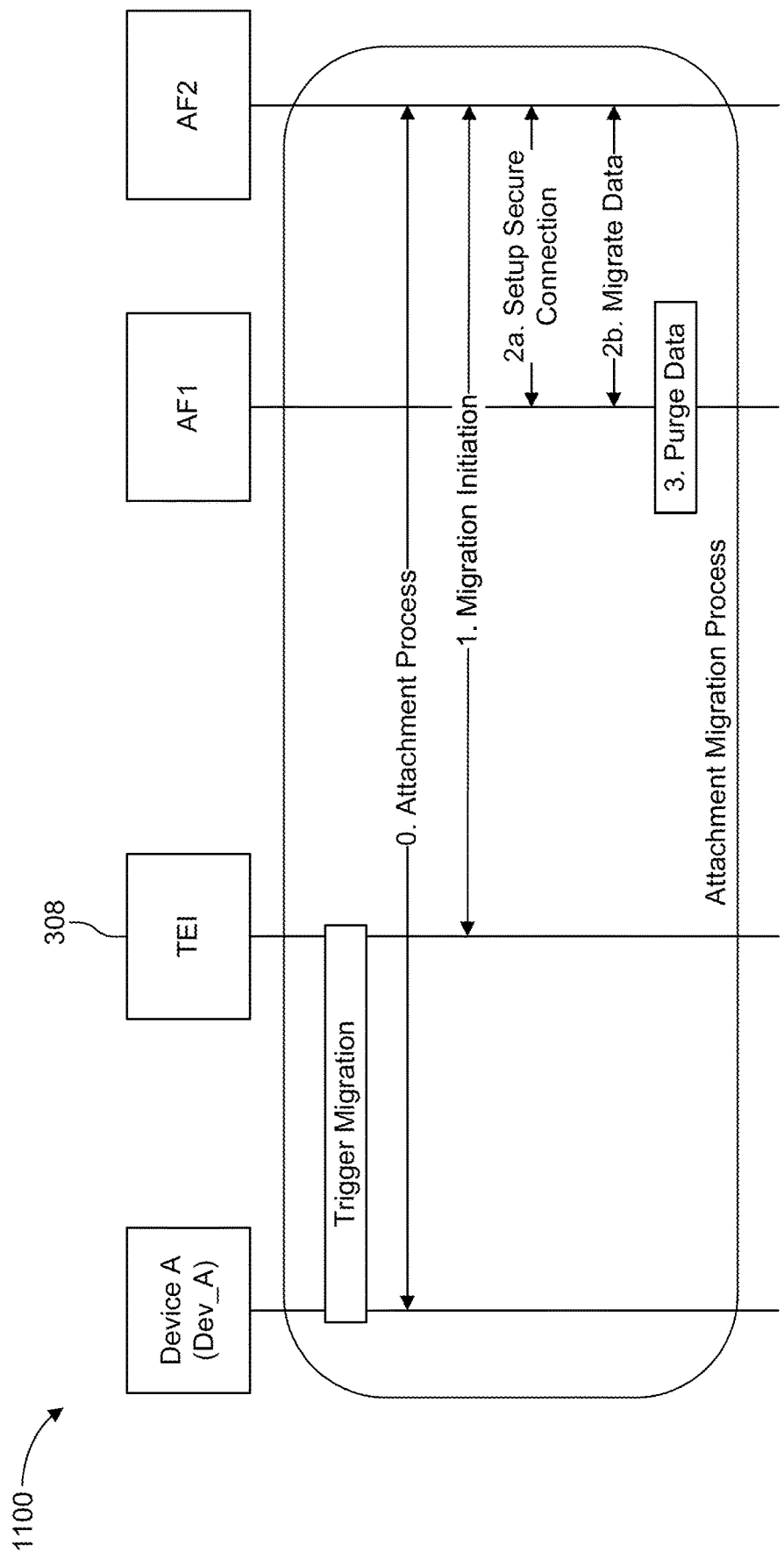
FIG. 11 is a call flow for an attachment migration in accordance with an example embodiment.

An example Dev_A-initiated AMP is a specialized case of TEI-initiated AMP. In an example, an AF-anchored AMP or AF-initiated AMP may be performed. FIG. 11 illustrates a TEI-initiated AMP that is performed within an example system 1100 that includes a device (Dev_A), the TEI 308, and first and second attachment functions (AF1 and AF2), wherein the TEI 308 and/or Dev_A initiate the AMP based on the migration policies. It will be appreciated that the example system 1100 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 11, and all such embodiments are contemplated as within the scope of the present disclosure.

At 1, in accordance with the illustrated example, the TEI 308 initiates an AMP based upon migration polices, wherein certain trigger conditions may trigger the AMP. An example of a trigger is when a Dev_A moves within the network coverage of another AF. The TEI 308 generates a token (e.g., Migration Token—MigT) or signed message indicating the authorization for migration. The authorization is provided to the new AF (AF2). In addition, the TEI 308 provides AF2 with the MP and one or more parameters, which may indicate Migration Endpoint Information (MEI) or a Migration Data Class (MDC). MEI may contain one or more end point addresses (e.g., network, transport, application layer addresses) of various parameters, such as IP address, URL/URI, port number of AF1, Cryptographic parameters, etc. The MDC may contain the class of data that are to be migrated. The MDC may indicate one or more of the following parameters, for example and without limitation: Context, History, Credentials, raw Data (e.g., Dev_A generated data, data used by Dev_A or obtained from other sources, etc.). The MDC may also describe sub-classes of data. Alternatively, explicit data that may have to be migrated may be identified without the need for identifying the class of data and may be useful when the amount of data that has to be migrated is limited. In other cases, in which a large amount of data is migrated, then the MDC may be used to identify the class/sub-class of data to be migrated. In some cases, the Dev_A initiates the migration process. In such cases, the Dev_A performs a similar role as the TEI 308.

At 2a, the AF2 and AF1 sets up secure connection with each other (e.g., TLS). AF2 presents the token (MigT) or a signed message to AF1 indicating migration. AF1 verifies the token or it verifies the authenticity of the message that AF2 presented for requesting migration. At 2b, the AF1 and AF2 initiate migration of data (e.g., context, history, credentials etc.) as indicated by MDC, or by identifying the data itself (e.g., granular ontology associated with data) at 1. The migration of data may be carried out using various protocols (e.g., service layer protocols, application layer protocols, transport protocols, etc.). In an example, AF2 securely stores the data and associated credentials received from AF1.

At 3, in accordance with the illustrated example, the AF1 purges data. For example, the AF1 may encrypt or delete or purge Dev_A's data that is stored within its domain, based on policies set by the TEI 308 during the RPP. All or some of Dev_A's data may be encrypted based on confidentiality requirements of the data and associated policies. Thus, credentials and policies associated with Dev_A may be purged on AF1.

Figure 12:
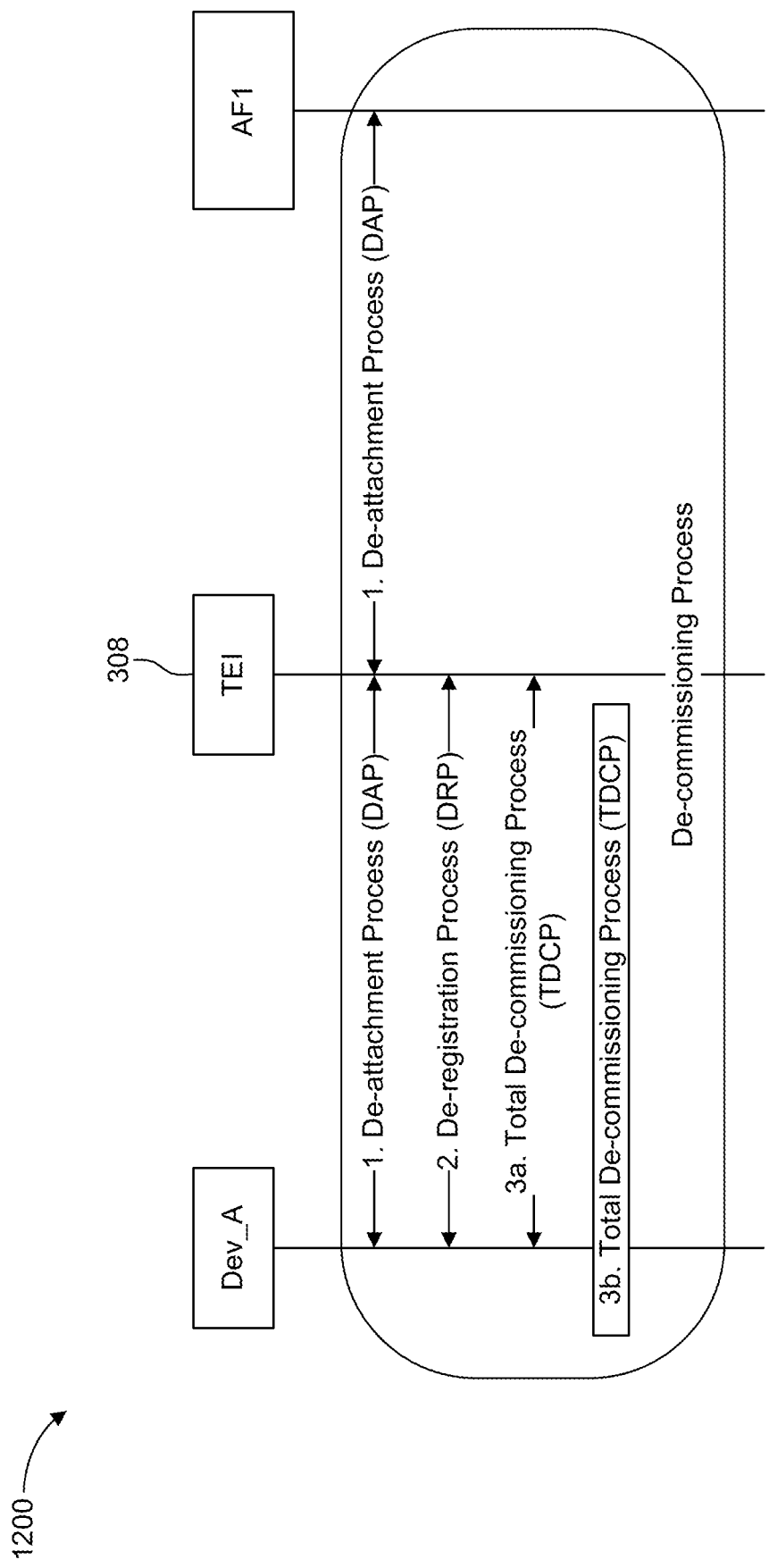
FIG. 12 is a call flow for a de-commissioning method in accordance with an example embodiment.

Turning now to an example de-commissioning process (DP), with reference to FIG. 12, a device may be de-commissioned based on a request from an owner of the device or a critical stakeholder associated with the device. A given DP may also be triggered by, for example and without limitation: the device being lost or stolen, which may be indicated by an change in geographical location of the device; alteration/modification of software/firmware; unauthorized access/physical tampering of hardware; anomalous behavior (which may be determined by comparing the behavior to a predetermined threshold), such as a change in usage patterns, un-correlatable interactions; and a change in Security Posture of the Dev_A and/or AF1 and/or TEI.

Referring to FIG. 12, an example system 1200 is illustrated that includes an example device (Dev_A), the TEI 308, and an example attachment function (AF1). We provide a high-level description of a Device A (Dev_A) performing a DP. At 1, a De-Attachment Process (DAP) is performed. The DAP may be considered a partial DP, for example, because it might only performs de-attachment with an AF. The trust relationship and the security association between the Dev_A and the TEI 308 may remain active. A DAP may be the counter process to an AP. The Dev_A and the AF may perform certain cryptographic and/or policy based operations to perform a de-attachment. In some cases, the DAP may be performed in an implicit or passive manner. For example, in some cases, credential renewal (e.g., re-keying) is not performed, thereby allowing the credentials/security context between the Dev_A and the AF1 to expire. In certain cases, a more explicit or active approach is used. For example, the Dev_A may initiate a DAP with the AP based upon policies (e.g., local and/or network/TEI driven policies). In certain cases, the Dev_A may leverage the services offered by the TEI 308 to initiate the DAP, or it may be carried out locally.

At 2, a De-Registration Process (DRP) is performed. In the DRP, the Dev_A and the TEI 308 may temporarily or permanently discontinue the security context established between the Dev_A and the TEI 308. In this scenario, the Dev_A and the TEI 308 may de-activate an active trust relationship and security association. This de-activation may be temporary or permanent. In the case of an example temporary DRP, the Dev_A and the TEI 308 may be able to re-establish the trust relationship more quickly as compared to re-establishing a trust relationship associated with a permanent DRP. For example, after a permanent DRP, the Dev_A and the TEI 308 may have to re-establish the trust relationship and security context, wherein the new trust relationship may be completely new based upon a completely new set of policies. The new security association established between the Dev_A and the TEI 308 might also not have any cryptographic association with the older security association. Therefore, in some cases, an attacker cannot crack the new security association, provided the attacker may have obtained some of the keying material associated with the older security association, thus ensuring forward and backward security. This process may be considered a temporary de-commissioning process.

At 3a and 3b, in accordance with the illustrated example, a Total De-Commissioning Process (TDCP) is performed. This process can also be called a kill process. As part of the TDCP, an internal process causes the system to erase system credentials that were generated as part of the RPP. The TDCP may also perform a de-activation of the PUF and in turn de-activation of the software/firmware as well as the hardware that is required for proper functioning of the device. Cryptographic credentials and policies and data may be erased. Policies used for de-commissioning of the Dev_A may dictate that either temporary de-activation or complete de-activation of the device occurs. In some cases, not only is the Dev_A de-activated with the TEI 308, but confidential data and the operation of the security functions (e.g., those that were pre-provisioned) as well as OS and device drivers may also be purged from the device. In an example, the PUFs and the BIOS are also made to be in-active. The TDCP may be a non-reversible process and, in some cases, may involve the intervention of a user/admin/organization to approve it. In some cases, the TDCP is performed based on local/network policies and is done autonomously, for example, provided the required triggers associated with TDCP have taken place.

Figure 13:
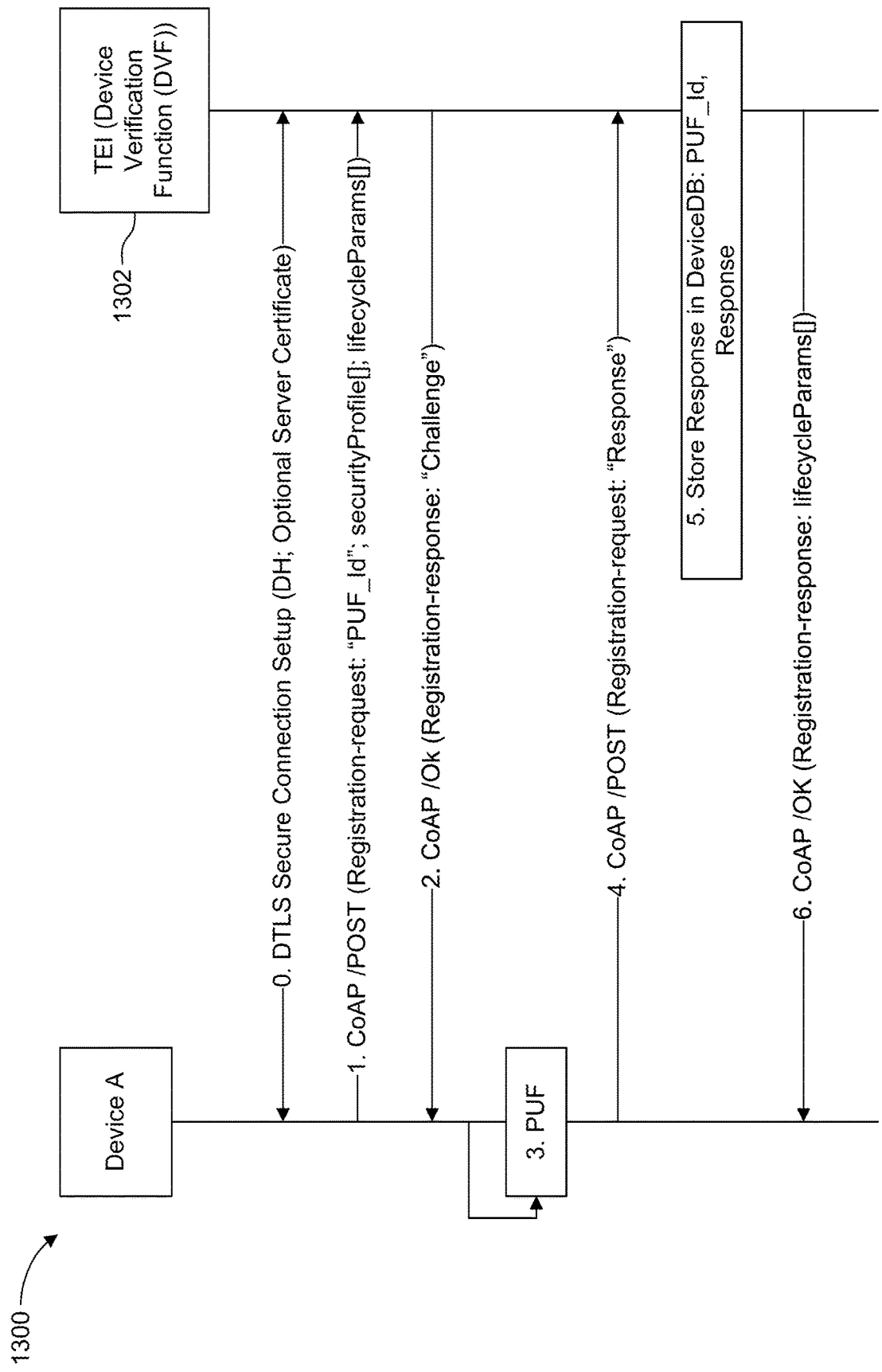
FIG. 13 is a call flow for a device provisioning and registration in accordance with an example embodiment.

Referring now to FIG. 13, an example embodiment of the CRP in an example system 1300 is shown, wherein a CoAP message is used by a device (Dev_A) to register with a TEI 1302 for credential lifecycle management. It will be appreciated that the example system 1300 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 13, and all such embodiments are contemplated as within the scope of the present disclosure. For example, it will be understood that the messaging may be performed using any management protocol (e.g., Lightweight M2M protocol (LWM2M) or oneM2M) or EAP mechanisms) as desired, and may alternatively be transported over CoAP or HTTP.

In accordance with the illustrated example, at 0, Device A (Dev_A) wants to register itself with the TEI 1302. In this example, the Dev_A does not have a prior security association with the TEI 1302. Dev_A may be optionally provisioned with the TEI's certificate. In some cases, particularly when the devices are constrained or a public key infrastructure is not present, Dev_A might not be provisioned with TEI's certificate, or is not able to use the services of a PM. In such scenarios, Dev_A may initiate the setup of a secure connection with the TEI 1302 without authenticating the TEI 1302. In the example described here, the Dev_A and the TEI 1302 perform a Diffie-Hellman Key negotiation process, which is initiated by the Dev_A so that a shared credential can be generated. The shared credential may be used to setup a secure connection (e.g., (D)TLS).

At 1, in accordance with the illustrated example, Dev_A initiates a CoAP connection with the TEI 1302 using the TEI's URL. The Dev_A sends a Registration-Request message that may containing a PUF_ID and securityProfile (secP). The security profile may be associated with the Dev_A. The Registration-Request message may further include a deviceProfile (devP) associated with the device, and an applicationProfile[ ] (appP[ ]), which may consist of one or more application profiles associated with different applications on the device. In addition, the Dev_A may provide or request optional parameters associated with lifecycle management of the security parameters. At 2, the TEI 1302 responds to the Dev_A by issuing a CoAP OK message that contains a "Challenge" object. The "Challenge" is issued by the TEI 1302, based upon the SecP, DevP, and/or the AppP[ ] values that were provided by Dev_A. In some cases, if the DevP indicated that the device hosts a PUF, then the Challenge may be appropriately tailored, and measures for computing the security credentials and processes are also tailored accordingly. The "Challenge" object may contain additional information that can be used by the Dev_A to carry out the PUF process. In an example, the Challenge may contain a "challenge string", one or more algorithms to be used for creating an authentication tag, a label, and a random value (nonce). The "Challenge" object may be stored in a secure manner within a database (e.g., protected by a secure element, salted etc.).

Still referring to FIG. 13, at 3, in accordance with the illustrated example, the message from the TEI 1302 is used to activate a PUF that is associated with the authentication process. In some cases, there may be multiple PUFs and any one of them may be activated and initiated based upon local or network policies, and by using the "Challenge" object as the basis. The appropriate PUF may generate a "Response" based on the Challenge. In this example, there is a single PUF that is involved and a single "Response" is obtained using the Challenge as the input. A unique Credential-Id is generated using the same PUF or a different PUF if present on the Dev_A, using a locally (Dev_A) generated random value as the input to the PUF. The output of the PUF is used as the Credential-Id. At 4, a CoAP/POST message is sent to the TEI 1302. The message may include a "Registration-Response" message that contains the "Response" generated by the PUF, the Credential-Id, and the "PUF_Id" for future reference. The CoAP/POST message is sent to the TEL At 5, the TEI 1302 registers the "Response" and the associated Credential-Id, and may also associate the PUF-Id with the one presented by the Dev_A. The TEI 1302 may use the "Response" as the symmetric key, or as seeding material to generate the symmetric key that is to be associated between the Dev_A and the TEI 1302. If the "Response" is used as the Symmetric Key (SK) then it may be stored securely at the TEI 1302. In an example, if the Response value is used as the Symmetric Key, then SK="Response". In another example, if the Response value is used as keying material, then the SK may be derived in any number of ways. Examples of deriving SK include channel binding using a pre-master secret SK=HMAC-SHA-256 (Response, "PUF-basedKeyGen"∥(D)TLS pre-master secret); or channel binding using a hash of (D)TLS exchange SK=HMAC-SHA-256 (Response, "PUFbasedKeyGenUsingHandshakeMessages"∥hash (DTLS handshake message)). In this example, a compromise on the SK does not provide the ability to masquerade as the PUF.

In an example case of using the "Response" as seeding material, the Dev_A may perform similar PSK derivation operations as the TEI 1302, so that the same shared keys are on Dev_A and the TEI 1302. If SK is derived using other seeding material (e.g., (D)TLS pre-master secret), then that seeding material may be stored securely locally, or provisioned at a later point in time by the TEI 1302. In some cases, at the Dev_A, the "Response" is discarded and not stored. At 6, the TEI 1302 sends a Registration Response message containing "Ok" along with a possible list of lifecycle parameters, called lifecycleParams[ ]. The lifecycleParams may contain attributes and values that describe the what, how, and when the lifecycle parameters will have to be updated. The lifecycleParams[ ] may contain list of, for example and without limitation, Policies for: Re-registration, Credential updates, Software updates, Attachment Processes, Migration Processes, De-commissioning Processes, Security (which may indicate Algorithm strength, Security protocols Credential Lengths, etc.), Privacy, and User-data-protection. The lifecycleParams[ ] may also include various information, such as for example and without limitation, seeding material for key generation, credential lifetimes, and endpoint information for software updates.

The lifecycleParams[ ] may be represented as management objects, such as LWM2M objects for example, and encoded using, for example, JSON or XML. In addition, the meta-data associated with the lifecycleParams[ ] may be included and encoded using, for example, JSON or XML. The TEI 1302 may provide guidelines on the parameters that are deemed to be mandatory or optional. This information may be provided as part of the metadata. The following credentials may be generated on an as-needed basis, presented by way of example and without limitation:

Authentication Key (AuthK)=PRF (SK∥"MasterAuthenticationKey"∥DTLS pre-master secret)

Confidentiality Key (CK)=PRF (SK∥"MasterConfidentialityKey"∥DTKS pre-master secret)

FIG. 14 shows an example security profile associated with Dev_A.

Figure 15:
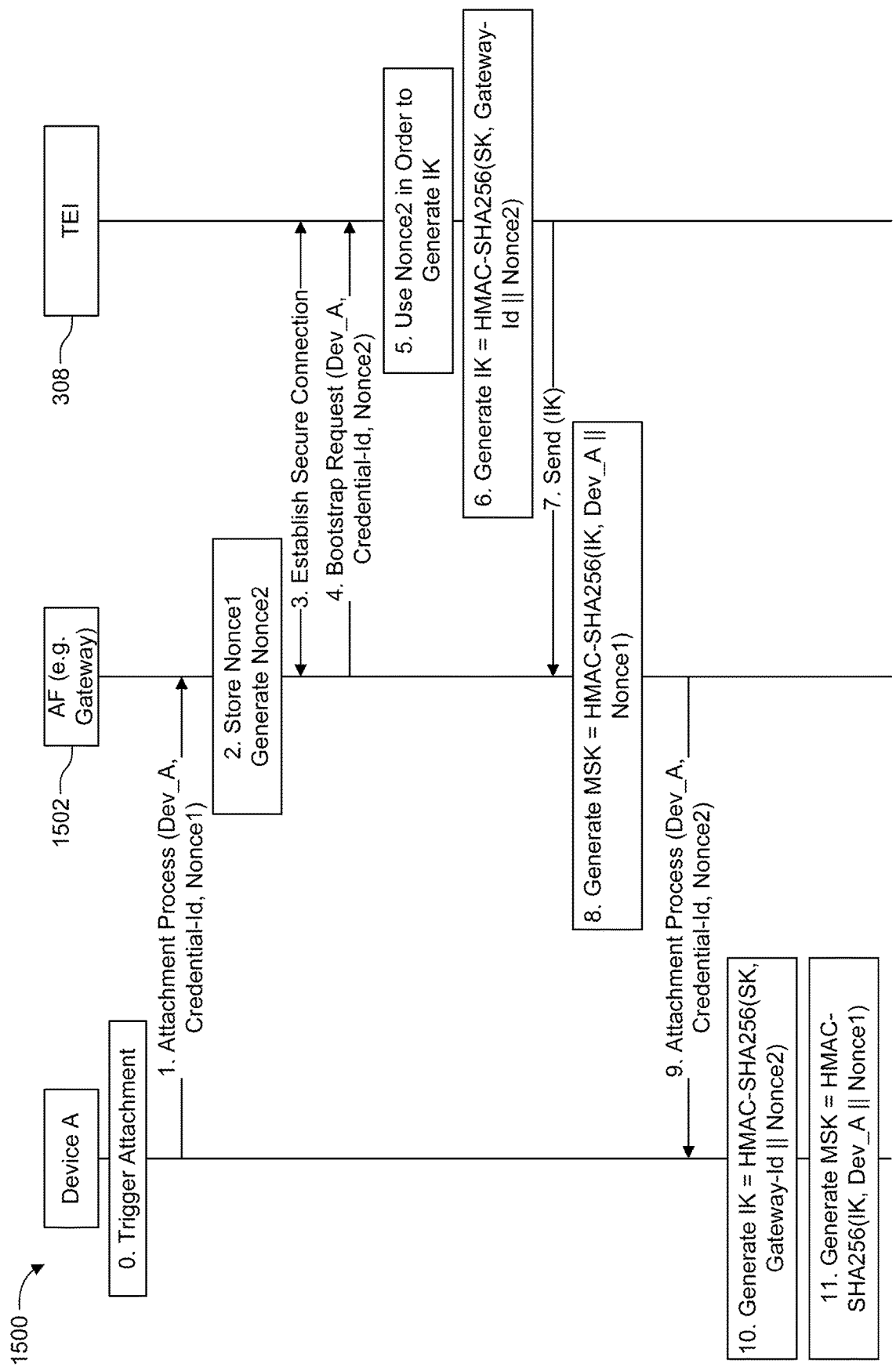
FIG. 15 is a call flow for an attachment method in accordance with another example embodiment.

Referring now to FIG. 15, an example of an AP shown in an example system 1500, which includes a device (Dev_A), an AF or gateway 1502, and the TEI 308. It will be appreciated that the example system 1500 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 15, and all such embodiments are contemplated as within the scope of the present disclosure. The AF 1502 may be hosted on a WiFi Access Point or 4G Base station, a Web Server, or a Network Gateway. In the example, the AF performs the role of a policy enforcement point (e.g., access control) for any attachment performed on the domain on which the AF is located. The AF may perform the role of a domain controller. The AF may perform one or more example functions such as authentication, authorization, establishing secure communications channels, enabling single-sign-ons, policy enforcement, etc. Protocol used in FIG. 15 may include, for example and without limitation, HTTP, CoAP, EAP, or oneM2M.

At 0, in accordance with the illustrated embodiment, based on the AtP provisioned on Dev_A, an AP process is triggered by the Dev_A. At 1, the Dev_A sends an Attachment-Req message containing various parameters such as, for example and without limitation: the Dev_A-Id, Credential-Id, and a nonce (Nonce1). The Dev_A may send a PUF-Id instead of the Credential-Id, or may include both in the Attachment-Req message. In addition and optionally, the Dev_A may send the provisioned Attachment Policies (AtP) to the Gateway 1502. The determination of which parameters (e.g., Dev_A-Id, Credential-Id, Nonce1) to send, and the generation of the type, source, and size of Nonce1 may be dependent upon AtP. The AtP may contain policies/instructions concerning security levels (e.g., algorithms, types of keys, key sizes, etc.) to be used for securing communications/data between the Dev_A and Gateway 1502. In addition, information about Dev_A's functional requirements (e.g., wake-up/sleep modes, optional application types such as real-time or restful, etc.) may also be provided to the Gateway 1502 by the TEI 308 using the AtP. At 2, in accordance with the illustrated example, the Gateway 1502 stores Nonce1 and generates a random value (Nonce2). The determination of the generation of the type, source, and size of Nonce2 by the Gateway 1502 may be based upon the AtP that was provided to the Gateway 1502 or based on Attachment Policies on the gateway 1502 (AtPg) or on both the AtP and AtPg. At 3, the Gateway 1502 and the TEI 308 establishes a secure connection, for example based on a (D)TLS connection. At 4, the Gateway 1502 sends a Bootstrap-Request message containing the Credential-Id associated with the Dev_A and the Nonce2 to the TEI 308, using the secure connection. The Gateway 1502 may send the AtPg and the AtP.

Based on the Credential-Id that was provided by the Gateway 1502 on behalf of the Dev_A, the TEI 308 fetches the appropriate AtP. Based on the AtP, or based on the AtP and the AtPg, the TEI 308 may fetch the SK from a secure storage. The TEI 308 may use the Nonce2, along with the SK that was registered between Dev_A and TEI 308, and the identity of the Gateway 1502 (Gateway-Id), to generate the Bootstrap Key (BK). The BK may be generated in any number of ways and may be generally based upon the AtP and/or AtPg. Examples of deriving the BK include, without limitation:

BK=HMAC-SHA-256 (SK, Gateway-Id||Nonce2);
BK=HMAC-SHA-256 (SK, Gateway-Id||Dev_A-Id-||Nonce2); or
BK=HMAC-SHA-256 (SK, Gateway-Id||pre-master-secret), which uses the (D)TLS pre-master secret instead of generating a new random value each time.

Still referring to FIG. 15, in accordance with the illustrated example, at 6, the TEI 308 sends the BK to the Gateway 1502 using a pre-established secure connection. In addition, the TEI may provide an AtP to the Gateway, for example, if it was not sent to the Gateway 1502 by the Dev_A. Alternatively, in some cases, part of the AtP is provisioned by Dev_A to the Gateway 1502 as part of the Attachment Request message sent in Step 1. Another part of the AtP may be provided by the TEI 308, in an example. The AtP can be viewed as general guidelines for providing Quality of Security (service) that is expected of the Gateway 1502. In some cases, the guidelines may be more precise and explicitly state that only certain protocols/algorithms may be used, such as EAP-TLS or IPSec, etc. At 7, the Gateway 1502 computes a Master Session Key (MSK) using the BK and the Nonce1 sent by the TEI 308. Determination of the mechanisms for the derivation of MSK may be based upon the AtP that was provided by the TEI 308, or based on the AtP provided by the Dev_A. In addition, the Gateway may use its own local policies (AtPg) in combination with the AtP in determining the credential/algorithm/protocol selection process. An example MSK derivation process is: MSK=HMAC-SHA-256 (BK, Dev_A-Id||Nonce1).

At 8, in accordance with the illustrated example, the Gateway 1502 sends an Attachment Response message to the Dev_A that contains the Credential-Id and the Nonce2. The Gateway 1502 may send an AtP and/or AtPg if one was obtained from the TEI 308, and, for example, if the TEI 308 had instructed that the AtP and/or AtPg be delivered to the Dev_A. At 9, the Dev_A generates the BK in a similar manner as the TEI 308, using Nonce2 and SK as inputs. The derivation of BK and MSK, and the selection of key generation and expansion, may be based upon the AtP and the AtPg. After the generation of BK, Dev_A may generate the MSK using Nonce1 and the generated BK as inputs. The generated MSK is used as the Master Session Key or the "Attachment Master Key" between the Dev_A and the Gateway 1502. The MSK may then be used along with a key expansion process so that unique confidentiality, integrity, and key encryption keys are generated. An example key expansion mechanism based on mechanisms described in RFC 5869 is shown below, though it will be understood that embodiments described herein are not limited to this example:

Pseudo-Random Key (PRK)=HMAC-SHA-256 (salt, MSK)
T(0)=empty string (zero length)
MAC-key=T(1)=HMAC-SHA-256 (PRK, T(0)||"MAC-key generation"||0x01)
Conf-key=T(2)=HMAC-SHA-256 (PRK, T(1)||"Conf-key generation"||0x02)
KEK=T(3)=HMAC-SHA-256 (PRK, T(2)||"KEK generation||0x03)

Figure 16:
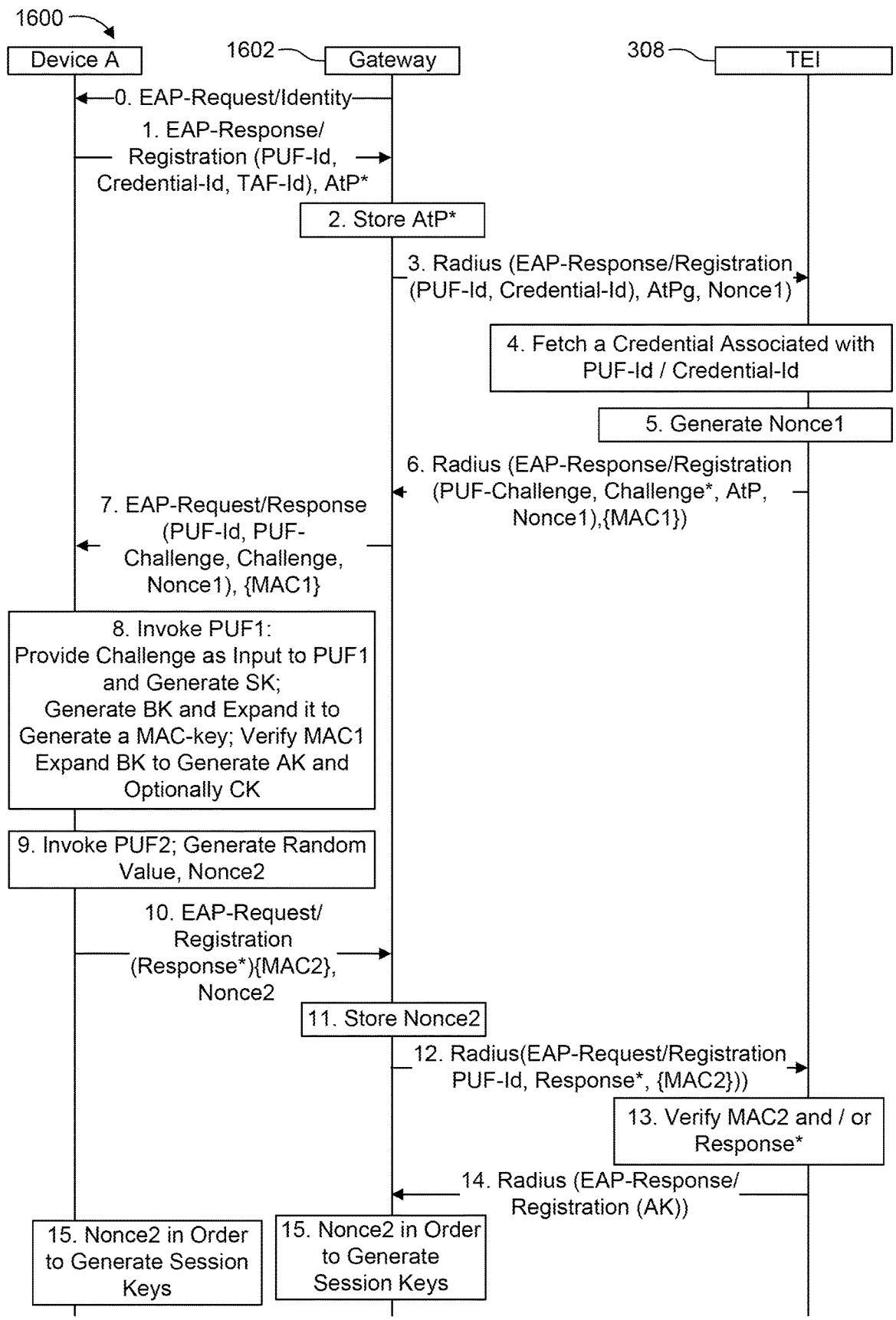
FIG. 16 is a call flow for another attachment method using the extensible authentication protocol (EAP) in accordance with an example embodiment.

Referring now to FIG. 16, another example AP is shown in accordance with another example embodiment. The AP is performed in an example system 1600 that includes a device (Device A), a Gateway 1602, and the TEI 308. The illustrated AP leverages the Extensible Authentication Protocol (EAP). It will be appreciated that the example system 1600 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 16, and all such embodiments are contemplated as within the scope of the present disclosure.

The Gateway 1602, which performs an AF, may be a WiFi Access Point, Bluetooth Gateway, wireless equipment (e.g., mobile phone) that may operate in a base station mode, an LTE or 5G base station, an IP Router/Gateway/Switch that is capable of transporting EAP messages, or the like. The transportation of EAP messages may be performed over Radius/Diameter, HTTP, CoAP or over 4G/5G MAC-layer transport. The Dev_A may be a constrained device with limited computing, memory, and battery resources. Consequently, the software (e.g., applications, OS, device drivers, kernel, IP stack etc.) that is implemented on the devices may be optimized for the type of device. Thus, mechanisms for performing the AP may be carried out using MAC-layer, IP, or application layer protocols that are based on the type and restrictions associated with devices (e.g., Dev_A).

At 0, in accordance with the illustrated example, the Gateway 1602, upon determining that a device (Dev_A) has been associated (e.g., PHY or MAC layer association) or is in the process of associating with the Gateway 1602, initiates an identification process with Dev_A by sending a EAP-Request message to the Dev_A, which requests the identity of Dev_A. At 1, Dev_A responds with a EAP-Response messaging requesting Registration (attachment) with the Gateway 1602 or the Gateway's domain. In some cases, the Gateway 1602 may act as the domain controller (gatekeeper) to the domain to which the Gateway 1602 belongs. As part of the message, Dev_A provides an identity of the PUF with which the Dev_A has previously registered with its TEI 308. In addition, the Dev_A may provide a Credential-Id that identifies a credential (e.g., symmetric key, SK), and a long-term key that may be generated by the PUF and registered with the TEI 308. In some cases, the SK has been generated by the PUF1 that is residing on Dev_A, and is identified by the PUF1-Id and has been previously registered with the TEI 308. The TEI 308 may store the SK in a secure manner. The Credential-Id may be used to identify the FQDN of the TEI 308 or determine the reachability of the TEI 308. For example, the Credential-Id may be a decorated identity and may have the form: credential1-Id@TEI.com. In an example, the Dev_A may provide an identity of the TEI 308 (TEI-Id), for example, when the Credential-Id is not a decorated identity or if the Gateway 1602 has limitations in performing discovery of the TEI 308. The Dev_A may also provide Attachment Policy Information (AtPI). The AtPI provides the policies for attachment or negotiation of the AP.

At 2, in accordance with the illustrated example, the Gateway 1602 discovers the TEI 308, for example, based upon the decorated Credential-Id or by using the TEI-Id that was provided by the Dev_A. In some examples, the Gateway 1602 stores the AtPI if one is provided, and determines the mechanisms to be used for AP based upon the AtPI. At 3, the Gateway 1602 encapsulates and transports the EAP-Response message that contains a request for Registration, for example, using the Radius or Diameter protocol, to the TEI 308. The EAP-Response message may be transported over HTTP, CoAP, IPSec, or other 5G messaging. In an example, the messaging between the Gateway 1602 and the TEI 308 occurs over a secure channel (e.g., Radius over TLS, Diameter over (D)TLS, IPSec, etc.). In certain cases, for example where the Gateway 1602 and the TEI 308 are located on trustworthy networks, the requirement for a secure channel may be omitted. The Gateway 1602 may transport the policies relating to attachment at the Gateway 1602 (AtPIg) within the Radius message. It is emphasized that the messaging between the Gateway 1602 and the TEI 308 may be encapsulated using any number of protocols (e.g., HTTP, CoAP, Diameter etc.), and the use of Radius is one example. At 4, the TEI 308, upon receiving the Radius message from the Gateway 1602, stores the AtPIg. The TEI 308 may process the EAP-Response message sent by the Dev_A. For example, the TEI 308 may fetch the SK based upon the PUF-Id/Credential-Id provided by Dev_A.

Still referring to FIG. 16, in accordance with the illustrated example, at 5, the TEI 308 determines the right set of cryptographic processes to be employed based upon the AtPg that was provided by the Gateway 1602, and the AtP at the TEI/Dev_A. Based upon the AtP and AtPg, the TEI 308 may generate a random value (Nonce1). In addition, the TEI 308 may perform a key extraction. An example key extraction process includes, without limitation: Bootstrap Key (BK)=HMAC-SHA-256 (Nonce1, SK), wherein BK is used as the master key in order to perform a key expansion so as to generate: MAC-Key, CK, Attachment Key (AK), etc. At 6, the TEI sends an EAP-Response/PUF-Challenge message containing a "PUF-Challenge". The PUF-Challenge is the same challenge that was issued by the TEI 308, when Dev_A had initially registered with the TEI 308 during the CRP. In some cases, the exact same challenge is issued by the TEI so as to ensure that the "PUF-Challenge" is stored securely in a separate storage than the PUF-Id/Credential-Id. The TEI 308 computes a Message Authentication Code (MAC1) over the EAP-Response using Nonce1 for freshness and the MAC-Key. The MAC1 is appended to the EAP-Request message. The TEI 308 may include the AtP within the Radius message targeted to the Gateway 1602. The inclusion of AtP may be optional so as to provide the AtP (e.g., expected processes by the Dev_A/TEI). The AtP may be encoded using JSON, XML, CBOR, YANG, or the like. An example list of attributes that are defined for enabling EAP-PUF method type are provided in Tables 2 and 3 below, though it will be understood that alternative or additional attributes may be provided as desired:

TABLE 2

Example EAP Attribute

| EAP Attributes | Description |
| --- | --- |
| EAP-Type | Indicates EAP method type = "PUF" |

TABLE 3

Example EAP-PUF Attributes

| Attributes | Description |
| --- | --- |
| AT_PUF_ID* | Identity of the PUF. It may be optional if a Credential-Id is present |
| AT_CREDENTIAL_ID | A credential identity that is used to fetch the SK that was registered and related policies. |
| AT_PUF_CHALLENGE | The challenge which is used as input into a PUF function |

TABLE 3-continued

Example EAP-PUF Attributes

| Attributes | Description |
| --- | --- |
| AT_CHALLENGE* | An optional challenge that may be used as seeding material or as input into other authentication function(s) that is not a PUF |
| AT_MAC | MAC that was generated on the EAP message by TEI |
| AT_NONCE | Random value generated by TEI |
| AT_AtP* | Attachment Policies from |
| AT_PURPOSE (1 Byte) | TEI/Dev perspective; e.g. JSON/XML encoding. This may be optional and can be provisioned using other channels 0 - Commission Request 1 - Registration Request 2 - Attachment Request - Will be set for this embodiment 3 - Attachment Migration Request 4 - De-Attachment Request 5 - De-Registration Request 6 - Total De-Commission Request (Generally not used) |

The AtP may be provisioned to the Gateway 1602 using secondary channels, such as pre-provisioning mechanisms (e.g., using management interfaces apriori). In some cases, the AtPg may be provisioned to the TEI 308 in a similar manner.

At 7, in accordance with the illustrated example, the Gateway 1602 processes the Radius message and may store and process the AtP. The Gateway 1602 forwards the EAP-Request message to the Dev_A. At 8, Dev_A processes the EAP-Request. In particular, Dev_A may invoke the PUF function if there is an indication that the TEI is requesting a PUF-based authentication, or based on the initial request sent by the Dev_A that included the PUF-Id. In some cases, an indication of EAP-PUF method type may automatically trigger the EAP function on Dev_A to invoke the PUF identified by the PUF-Id. If a PUF-Id is not present and if a Credential-Id was present, in some cases, the Credential-Id may be used to look-up the identity of the PUF. In an example, the appropriate PUF function identified by the PUF-Id is triggered and the PUF-Challenge parameter that was sent by the TEI 308 is used as the input into the PUF. The PUF generates the SK. The SK may be used by Dev_A, along with the Nonce1, to perform key extraction to derive a Bootstrap Key (BK). Further expansion of the key may be performed to generate a MAC-key, CK-key, Attachment Key (AK), etc. The MAC-Key may be used, along with the EAP-Request message, to generate a MAC. The MAC may be compared with the MAC1 that was included as part of the EAP-Request message. For example, if the MAC matches the MAC1, then Dev_A authenticates the message originator, which is the TEI 308 in the example.

At 9, the Dev_A may invoke another PUF (PUF2) to generate a random value (Nonce2). Alternatively, Dev_A may use a random number generator function with sufficient entropy based on the guidelines provided by AtP and/or AtPg, in order to generate Nonce2. At 10, Dev_A sends the EAP-Response message containing an optional "Response*", if a Challenge* was included in the EAP-Request message sent by the TEI 308. Otherwise, in some cases, only the Nonce2 is included within the EAP-Response message. A MAC (MAC2) may be computed over the EAP-Response message and appended to the EAP-Response message, which is then sent to the TEI 308.

Attributes included in the message may include, for example and without limitation, the attributes in Table 4 below.

TABLE 4

Example EAP-PUF Attributes

| Attributes | Description |
| --- | --- |
| AT_PUF_ID* | Identity of the PUF. It may be optional if a Credential-Id is present |
| AT_CREDENTIAL_ID* | A credential identity that is used to fetch the SK that was registered and related policies. |
| AT_PUF_RESPONSE* | The response based upon a challenge that was issued by TEI. This is optional and only sent out if and only if an AT_PUF_CHALLENGE was sent by the TEI |
| AT_MAC | MAC that was generated on the EAP message by Dev_A |
| AT_NONCE | Random value generated by Dev_A |

At 11, the Gateway 1602 encapsulates the EAP-Response message received from the Dev_A, within a Radius message, and forwards it to the TEI 308. At 12, the TEI 308 processes the Radius and then extracts the MAC2 and compares it to the generated MAC. If the computed MAC is the same as MAC2, in an example, then the TEI 308 authenticates Dev_A. The TEI 308 may also optionally verify the Response* if a Challenge* had been sent by the TEI 308 to the Dev_A. Once the MAC2 is verified, in some examples, then the TEI 308 generates the AK using similar mechanisms as the Dev_A. At 13, the TEI 308 sends the AK to the Gateway 1602. At 14, in accordance with the illustrated example, the Gateway 1602 forwards the Success message to Dev_A. At 15, the gateway 1602 sends an EAP-Request message containing "Success" to Dev_A. The Gateway 1602 and the AF may generate session keys using the AK as the master key, for example using similar mechanisms such as described in 802.11, ZigBee, Bluetooth, TLS standards, or the like.

Figure 17:
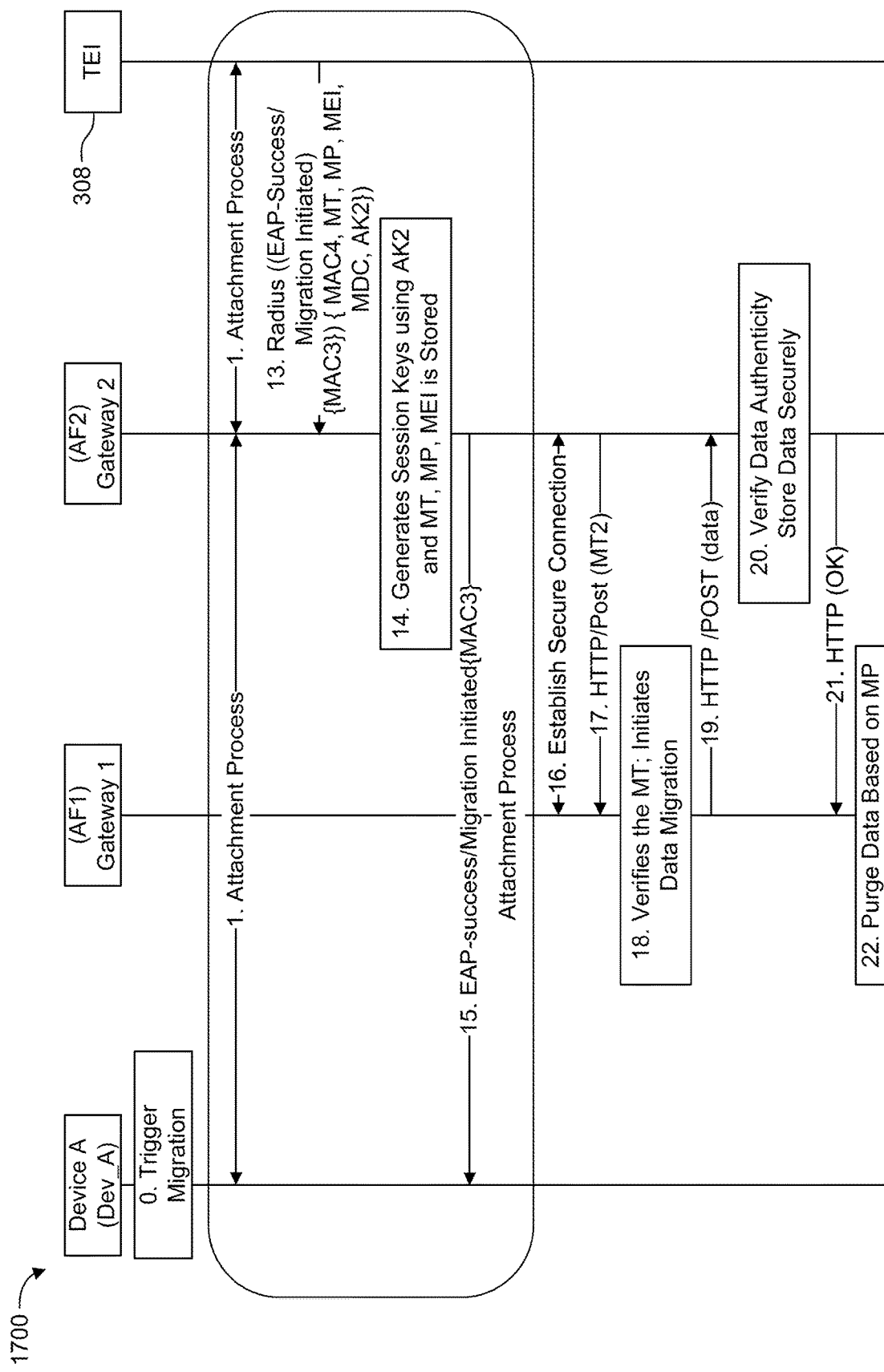
FIG. 17 is a call flow for an example attachment migration in accordance with an example embodiment.

Referring now to FIG. 17, an example attachment migration process (AMP) is shown that is performed in an example system 1700, which includes an example device (Dev_A), a first gateway (Gateway 1) that includes a first AF (AF1), a second gateway (Gateway 2) that includes a second AF (AF2), and the TEI 308. It will be appreciated that the example system 1700 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 17, and all such embodiments are contemplated as within the scope of the present disclosure.

Referring to FIG. 17, in accordance with the illustrated example, steps 1-12 may be performed as described with reference to FIG. 16, with some changes. In some examples, the EAP messages sent between the UE (Dev_A) and the TEI are integrity protected using the AuthK. The TEI 308 and the Dev_A may authenticate EAP messages by verifying the Authentication Tag generated using the AuthK. The Dev_A may include an indication requesting for an Attachment Migration Process (AMP) within the EAP message. Alternatively, the TEI 308 may detect a change in AF based upon the message being routed via AF2, and may initiate an AMP process.

At 13, in accordance with the illustrated example, the TEI 308 sends a EAP-request/Notification message within a Radius or Diameter message that contains a migration token (MT2), migration policies (MP) (the MP may be tailored to AF2), migration end-point information (MEI), migration data class (MDC), and a newly generated attachment key (AK2). The AK2 may be generated using bootstrapping mechanisms (e.g., using PRF from a previously established MK that was generated between the Dev_A and the TEI 308). The Radius/Diameter message may be protected for integrity/Authentication using an authentication tag (MAC4) that is generated using a derivative of the AK2. As part of the Radius message, the TEI 308 may also include a EAP-Success/Migration Initiated message that is protected using MAC3, which is generated using AuthK. The TEI 308 may generate a MAC3 on the EAP message that is being sent to the Dev_A.

At 14, the AF2 generates session keys using the AK2. The AF2 may use a derivative key (MAC key) of AK2 to verify MAC4. The AF2 may store the MT, MP and MEI. At 15, the AF2 sends an EAP success message indicating a successful migration request, along with the MAC3 authentication tag to Dev_A, which is verified by the Dev_A. At 16, in accordance with the illustrated example, the AF1 establishes a secure connection between itself and the AF2. The secure connection tunnel may be based upon TLS/DTLS or alternatively, using IPSec (e.g., IKE for setting it up along with ESP) or using a tunneled EAP protocol (e.g. TEAP). In the illustrated example, the TLS protocol is used to secure the connection between the AF1 and AF2. At 17, the AF2 submits a Migration Token (MT) to the AF1 using the secure connection. The MT was issued to the AF2 by the TEI in step 13. The MT may be transported over HTTP, CoAP, or other messaging protocols. The mechanisms for migration may be also carried over other service layer protocols (e.g., oneM2M). At 18, the AF1 verifies the MT and initiates migration process, which also includes migration of data and other parameters (e.g. security, credential parameters). At 19, the AF1 sends data in a secure manner to AF2. The protocol for transfer of data may be carried over service layer protocols (e.g. oneM2M) or using raw HTTP, CoAP, etc. At 20, the AF2 may optionally verify the integrity of the data that was sent to it by AF1. The AF2 may securely store the data pertaining to Dev_A. In some cases, data transfer and storage may be carried over a service layer protocol (e.g., oneM2M). At 21, the AF2 issues an HTTP Ok message upon successfully verifying the authenticity of data or upon completion of transfer of data from AF1 to AF2. The AF2 may also indicate to AF1 to initiate purging of data at AF1 that is related to Dev_A. In an example, at 22, the AF1 purges data according to policies associated with AMP.

TABLE 5

Example EAP Attributes of Interest for AMP

| Attributes | Description |
| --- | --- |
| AT_PURPOSE (1 Byte) | 3 - Attachment Migration Request - Will be set |

In an alternative example, the message at 15 is only sent to the UE (Dev_A) after the completion of the entire process is performed. The AF2 may indicate to AF1, upon completion of Data migration process and verification of data authenticity, at 20.

Turning now to de-commissioning, a device may be de-commissioned based on request from an owner of the device or a critical stakeholder of the device, or by machines (e.g., based upon policies and context based triggers). The DP may involve a number of sub processes and some of the processes may be partial (DAP), temporary (DRP) or total de-commissioning (TDP). In the case of a TDP request, a DAP as well as a DRP may be performed, in some cases, provided there are valid and active attachments and registrations, respectively. Otherwise, in some cases, only those relevant and active contexts may be cancelled. Similarly, if Dev_A has requested for a DRP, then a DAP may be also carried out provided there is an active "attachment" context. In the case of a DAP request, in an example, only a DAP is performed. As described herein, even though the illustrated DAP example shows a Dev_A originated de-commissioning process, the trigger for de-commissioning may be initiated by the TEI alternatively, or additionally. EAP attributes that are related to the DP may include, for example and without limitation, the attributes shown in Table 6.

TABLE 6

Example EAP Attributes for DP

| Attributes | Description |
| --- | --- |
| AT_PURPOSE (1 Byte) | 4 - De-Attachment Request<br>5 - De-Registration Request<br>6 - Total De-Commission Request (Generally not used) |

Figure 18:
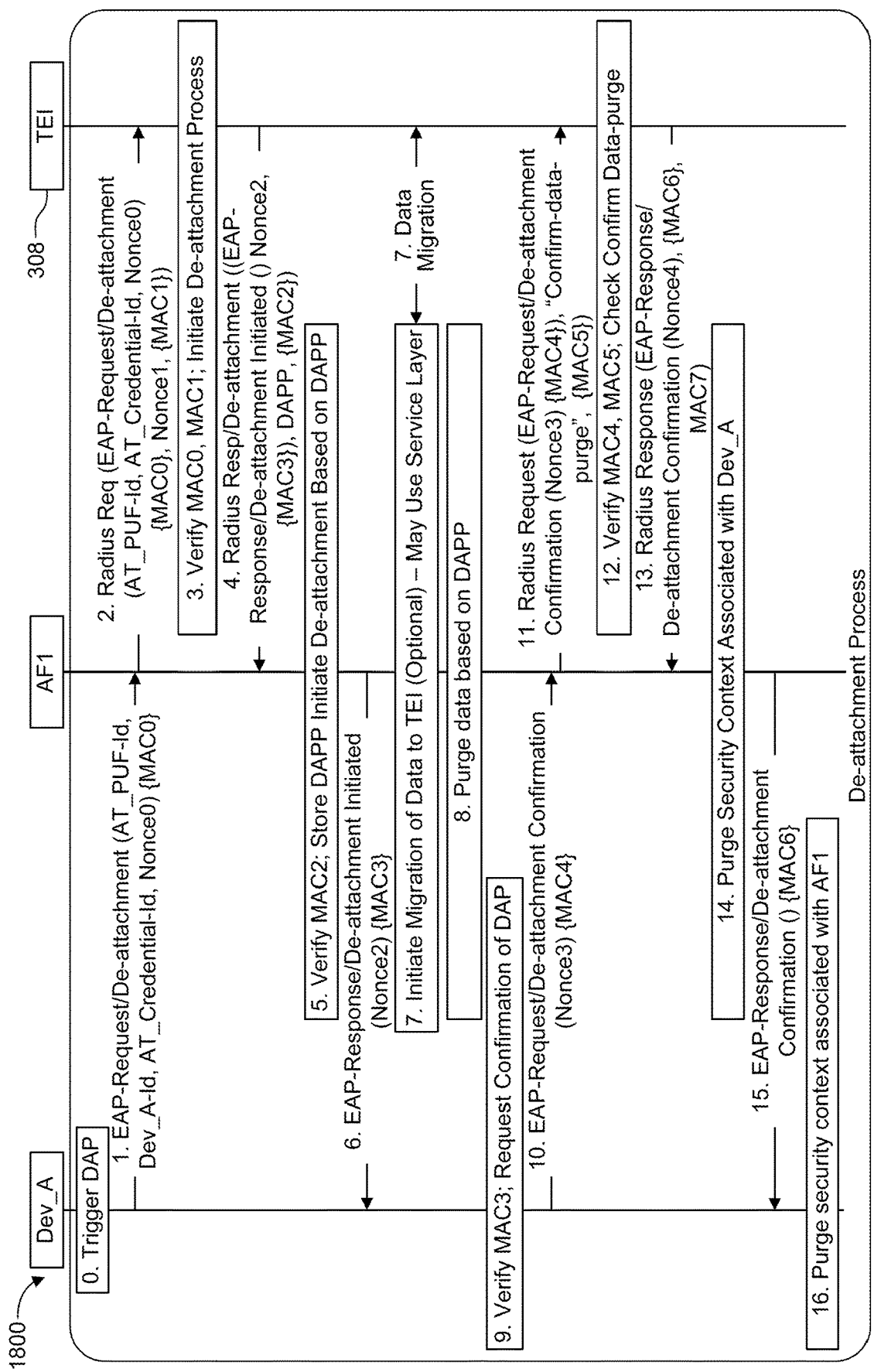
FIG. 18 is a call flow for a de-attachment in accordance with an example embodiment.

Referring now to FIG. 18, an example De-Attachment Process (DAP) is shown in an example system 1800 that includes an example device (Dev_A), an AF1, and the TEI 308. It will be appreciated that the example system 1800 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 18, and all such embodiments are contemplated as within the scope of the present disclosure.

At 0, triggers (local or network-based triggers) at the Dev_A cause the Dev_A to initiate a DAP. At 1, in accordance with the illustrated example, Dev_A sends an EAP Request message to the TEI 308, containing a request for De-Attachment. The Request message may contain an AT Credential-Id that identifies the master credential associated with the Registration of the Dev_A to the TEI, and the AT Dev_A-Id. In some examples, the Request message may also include an AT PUF-Id and an AT_TEI_Id, for example, if the AT Credential Id and/or the AT Dev_A-Id is omitted. The Dev_A may include a randomly generated Nonce0 and MAC0. At 2, the AF1 encapsulates the EAP Request message within a Radius message and forwards it to the TEI The AF1 may optionally infer that the message is a De-Attachment Request and therefore may request a Radius De-Attachment message. The AF1 includes a generated Nonce1 and an associated MAC1 generated on the complete Radius Request message. The MAC1 that is generated may be based upon the credentials that were generated using a security association, which may have been previously created between the TEI 308 and the AF1 or dynamically created between the TEI 308 and the AF1. In some cases, the generation, use, and inclusion of Nonce1 may be optional and based on whether the inner EAP-Request message has sufficient randomness.

Still referring to FIG. 18, at 3, the TEI 308 verifies the MAC0 and MAC1 and then initiates a DAP on its end. At 4, the TEI 308 sends a Radius De-Attachment Response message containing De-Attachment Process Policies (DAPP). MAC2 is generated on the Radius message that contains the EAP-Response/De-Attachment Initiated message. The EAP-Response message may contain a Nonce2 and an associated MAC3, which may have been generated on the EAP message. The Radius message may contain an additional nonce. In some case there is enough randomness within the inner message, so the generation and usage of a new nonce might not be necessary. At 5, the AF1 verifies the MAC2 and stores the DAPP. Based upon the policies within the DAPP, the AF1 initiates the DAP process on its end.

At 6, in accordance with the illustrated example, the AF1 extracts the EAP-Response/De-Attachment Initiated message containing the Nonce2 and the MAC3, and sends it to the Dev_A. At 7, the AF1 initiates process for migration of data associated with Dev_A to the TEI 308. The migration of data may be performed using service layer protocols (e.g., oneM2M). At 8, the AF1 purges the data that is associated with Dev_A on the AF1 and/or on the network components (e.g., databases, network functions) that are associated within the domain controlled/operated by AF1. At 9, the Dev_A, upon receiving the EAP-Response message, verifies the MAC3 and prepares a request an optional confirmation of the DAP. At 10, the Dev_A sends an EAP-Request/De-Attachment Confirmation message to the TEI 308 that contains a Nonce3 and an associated MAC4 that was generated on the message using the Nonce3. At 11, the AF1 encapsulates the EAP-Request message within a Radius Request message, and forwards the message to the TEI 308. The Radius message may contain a randomly generated Nonce4 and an associated MAC5. The Radius Request message may contain an indication for confirming data purge (e.g., indication: "Confirm-data-purge") of data associated with Dev_A stored at AF1's domain. The use of Nonce4 is optional and may be based on whether the EAP-Request message contains enough randomness.

Still referring to FIG. 18, at 12, in accordance with the illustrated example, the TEI 308 verifies the MAC4 and MAC5. The TEI verifies that data migration has been completed. The determination that the data migration is complete may be performed by using service layer mechanisms and by leveraging data integrity checks. The TEI 308 may also confirm data purge at AF1. At 13, for example upon determining and confirming successful data migration and purging of data, the TEI 308 sends an EAP-Response/De-Attachment Confirmation message containing Nonce4 and associated MAC6 to the Dev_A. The message may be encapsulated within a Radius-Response message containing MAC7. At 14, the AF1, upon receiving the Radius-Response message from the TEI 308, verifies MAC7 and initiates purging of security context associated with Dev_A. The purging of security context may also, or alternatively, be performed at 8 in the illustrated example. At 15, the AF1 forwards the EAP-Response/De-Attachment Confirmation message to the Dev_A. At 16, Dev_A, upon receiving the EAP-Response message, verifies the MAC6 and purges the security context and associated credentials associated with AF1. In some examples, step 6 described above is delayed until the complete of steps 7 and 9. In such an example, step 9 may occur after step 6.

Figure 19:
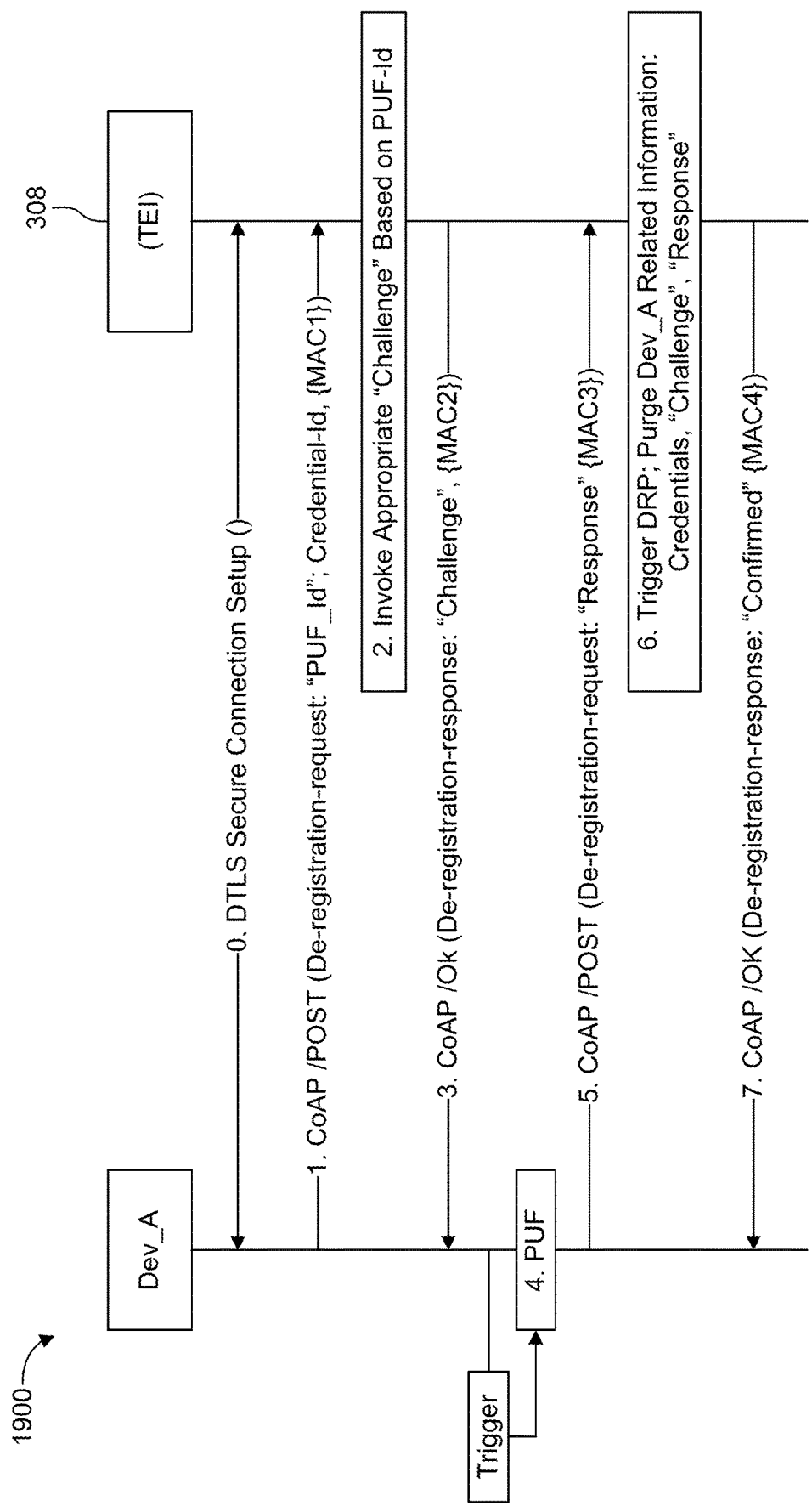
FIG. 19 is a call flow for an example de-registration process (DRP) in accordance with an example embodiment.

Referring now to FIG. 19, an example De-Registration Process (DRP) is performed in an example system 1900 that includes a device (Dev_A) and the TEI 308. It will be appreciated that the example system 1900 is simplified to facilitate description of the disclosed subject matter and is not intended to limit the scope of this disclosure. Other devices, systems, and configurations may be used to implement the embodiments disclosed herein in addition to, or instead of, a system such as the system illustrated in FIG. 19, and all such embodiments are contemplated as within the scope of the present disclosure.

At 0, in accordance with the illustrated example, the Dev_A initiates a secure connection setup using a (D)TLS protocol, with the TEI 308. At 1, using the secure connection, the Dev_A sends a De-Registration Request using CoAP protocol. The request may contains the PUF_Id associated with Dev_A, a Credential-Id, and an associated MAC1. The MAC1 is an optional parameter and may be generated using the AuthK over the De-Registration Request message. At 2, the TEI 308 verifies the MAC1 and then obtains the "Challenge" object from a secure datastore that was used during the CRP. The TEI 308 may also obtain the other seeding material that was stored. At 3, the TEI generates a De-Registration Response message that includes the "Challenge" object along with optional seeding material and a MAC2 that was generated using AuthK, and sends the message to the Dev_A. At 4, upon receiving the De-Registration Response message from the TEI 308, and on verifying the MAC2, the application on Dev_A invokes the PUF. The invocation of the PUF may be performed using a secure function that may be operated within a trusted execution environment. The "Challenge" is used as an input into the PUF, which then generates the "Response". In some cases, seeding material that is included may be used as input into the PUF.

At 5, in accordance with the illustrated example, the Dev_A obtains the "Response" from the PUF using secure mechanisms and transports the "Response" to the TEI 308 using the secure channel. The Dev_A may include an optional MAC3 that was generated using the previously generated and stored AuthK. At 6, upon receiving the De-Registration Request along with the "Response", the TEI 308 verifies the "Response" based upon the stored "Response" value, and may also verify the MAC3 using the AuthK. In some examples, the TEI may generate AuthK using the "Response" that was sent by the Dev_A and using the mechanisms that were used during the CRP as described herein to verify MAC3. Upon verification, the TEI triggers the purging of Dev_A related information, such as credentials (e.g., SK, AuthK, ConfK etc.), the "Challenge", the "Response" (in case "Response" was stored), lifecycleParams[ ], deviceProfile, securityProfile and applicationProfild[ ] information from the various datastores associated with the TEI 308. At 7, after total De-Registration has occurred, the TEI 308 sends a De-Registration-Response message containing a "confirmed" indication along with optional MAC4. The AuthK may be retained in memory until the MAC4 is generated, and purged once the De-Registration-Response message has been sent. It will be understood that the messaging described with reference to FIG. 9 may be performed using EAP messaging as well. When using EAP, the AT PURPOSE value may be set to '5'.

During an example total de-commissioning process (TDP), a PUF_1 may be invoked by secure functions residing within a Secure Environment. The secure functions residing in the secure environment consist, for example and without limitation, a Total De-commissioning Trigger Detection Function (TDTDF), a De-Commission Process Function (DCPF), a Secure Data-backup Function (SDF), a Local PUF Trigger Function (LPTF), and a Secure User Interface Function (SUIF). The SUIF may be used to provide user input in a secure manner. Based upon the triggers that are detected by the TDTDF, the services of the DCPF are invoked. The DCPF may then determine if it requires an explicit or implicit authorization from a user/administration. The DCPF may also determine whether back-up of Dev_A's data has to be carried out. If back-up is carried out, the DCPF may determine whether the data is backed up at a location on the network, or locally on an external device. In case of an explicit authorization, the user/administrator associated with an organization may be required to provide authorization (e.g., a password, simple message, signature etc.), which is then matched to the authorization obtained during CP. If the authorizations match, in an example, then the DCPF may initiate a data backup process if required, and may also invoke the services of PUF_1. A "Challenge" parameter that was set during the CP may be provided to the PUF_1. The PUF_1 may produce a "Response". The "Response" may be provided to a function within another Secure Environment (e.g., TEE). If the "Response" matches the stored "Response", then the Data Erasure Function (DEF) may be invoked. The DEF may purge Dev_A-specific data and may invoke other functions to purge system and platform data associated with the Dev_A. In an alternative mechanism, the "Response" value may be used to decrypt the DEF. The DEF may then be launched in the memory and used for purging Dev_A-specific data, functions, security context, etc. Other functions may also be invoked that purge critical firmware functions. In some cases, a newly generated random value is used to encrypt core system level functions and data, and then the randomly generated value is discarded. After purging and erasing key system-level functions, data, security contexts and credentials, the function may invoke a power down operation, so that functions and data in the erasable ROM/RAM are also purged. In some examples, the functions used to trigger the PUFs, along with the firmware used for controlling the PUFs, are also made inactive.

Figure 20:
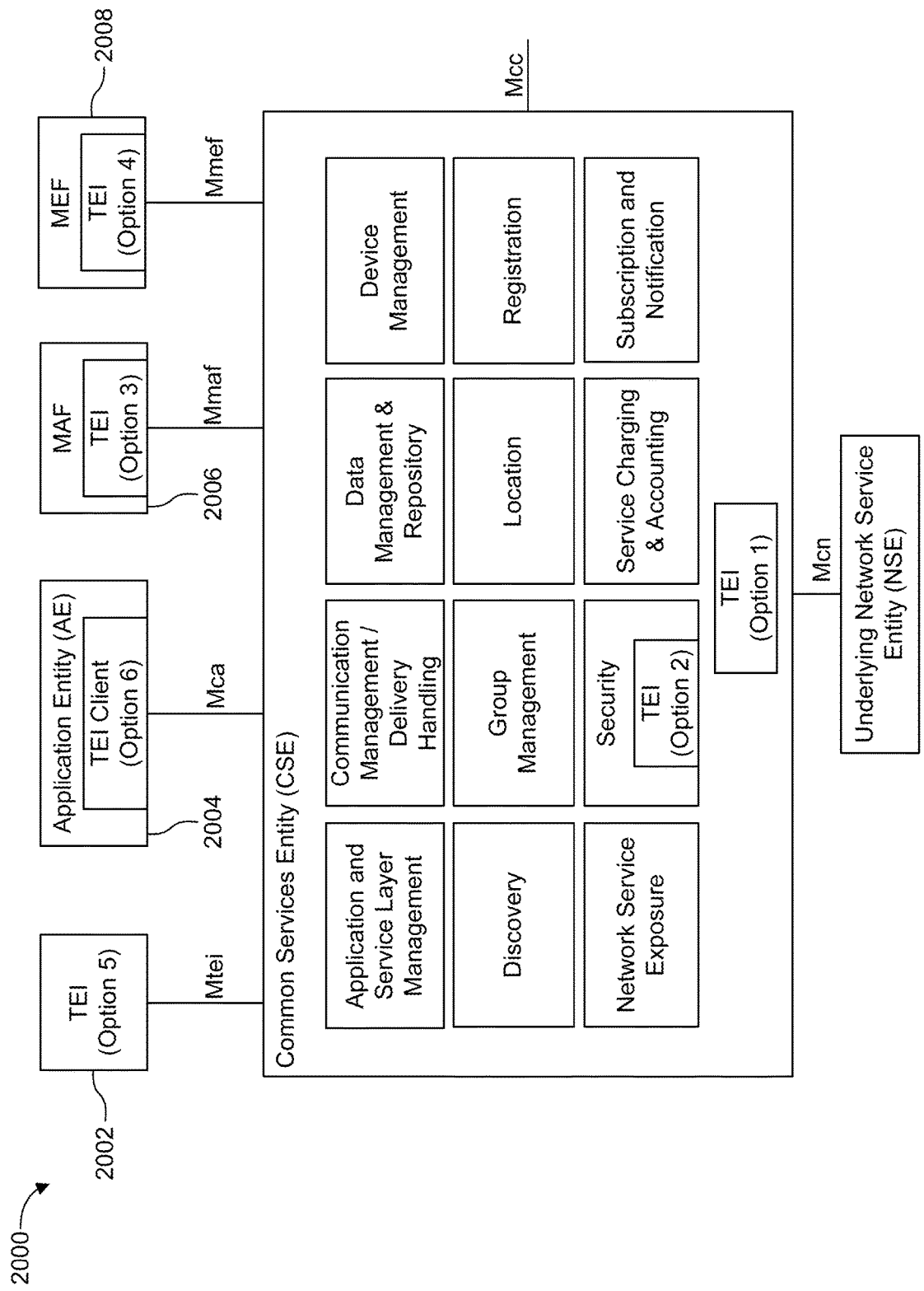
FIG. 20 is a block diagram of an example architecture that includes a trusted execution environment (TEI) in oneM2M.

To support the security lifecycle management processes described herein within the oneM2M Architecture, the TEI concepts and corresponding functions described herein can be realized as one or more of the examples illustrated within the example oneM2M system 2000 shown in FIG. 20. In one example (Option 1), the TEI is implemented as a new Common Service Function (CSF) of a Common Services Entity (CSE). In another example (Option 2), the TEI is implemented as capability of an existing oneM2M CSF (e.g., Security CSF). In another example (Option 3), the TEI is implemented as a capability of a M2M Authentication Function (MAF) 2006. In another example (Option 4), the TEI is implemented as a capability of a M2M Enrollment Function (MEF) 2008. In yet another example (Option 5), the TEI is implemented as a new function 2002 in the oneM2M System 2000. In still another example (Option 6), the TEI is implemented as a function (client) of an oneM2M AE 2004.

Turning now to an example W3C Web of Things (WoT) embodiment, the W3C WoT architecture consists of a WoT servient and WoT client. A WoT servient hosts some resources and can act as a resource provider, while a WoT client, as a resource consumer, is used to access the resource provided by the WoT servient. The context information about the WoT servient, its resources, and how to access those resources, are described in a Thing Description (TD). Each WoT servient has a TD that can be stored remotely in a TD repository or locally at the WoT servient. In some cases, the WoT client needs to first discover and retrieve the TD before it can properly access the resources on the WoT servient.

To support the security lifecycle management processes described herein for an IoT device (which may be equivalent to a WoT servient) in the WoT architecture, various mechanisms are now described in accordance with various embodiments. In an example, the TEI may provide the various TD-related information to the IoT device during RPP, such as, for example and without limitation:

The address of TD repository, based on which IoT device will post its TD to the appropriate TD repository.

The security and networking protocols to be used in AP, AMP, and DP. Later, the IoT device may contain this information in its TD.

The WoT TD for the IoT device can contain various information, which can be discovered and retrieved by other entities involved in security lifecycle management (e.g., TEI, SRF, and AF). The information may be protected for integrity and authenticity and optionally for confidentiality and privacy using cryptographic mechanisms. Also robust identification authentication and authorization mechanisms may be used for access control to the WoT TD. The information may include, for example and without limitation:

The list of LCMF that the device supports. For example, the device may only support RPP and DP (e.g., no support for AP and AMP). In another example, the device supports RPP, AP, and DP, but not the AMP.

The networking protocol and security protocol to be used in RPP, AP, AMP, and DP.

The address (e.g., a Uniform Resource Identifier (URI)) for accessing triggers for LCMF (uriForLCMFTriggers).

The address (e.g., a URI) for accessing the policies for RPP (uriForRPPPolicies).

The address (e.g., a URI) for accessing the policies for AP (uriForAPPolicies).

The address (e.g., a URI) for accessing the policies for AMP (uriForAMPPolicies).

The address (e.g., a URI) for accessing the policies for DP (uriForDPPolicies).

The address (e.g., a URI) to trigger DP (uriForDP).

The device's TD may also describe which types of RPP/AP/AMP/DP policies the device has. In some cases, the TD indicates the types of policies without divulging the context of each policy.

The above information can be included in the TD of a given device, so as to enable various processes. For example, the TEI may discover the device's TD and use uriForLCMFTriggers that are contained in the TD to configure any necessary triggers to the device. The TEI may discover the device's TD so as to determine the appropriate protocols for supporting RPP, AP, AMP, and DP. When the device performs a RPP, the device can report its TD to the TEI The TEI may store the TD and/or forward the TD to a third-party TD repository. When the device conducts DP, the TEI may remove the device's TD that if stored previously after the DP is complete. In an example, the TEI discovers the device's TD and uses uriForDP to actively trigger DP to de-commission the device. In another example, the TEI discovers the device's TD and uses uriForAMPPolicies to access attachment migration policies, based on which the TEI may actively contact both the current AF and the new AF to trigger a migration.

Figure 21:
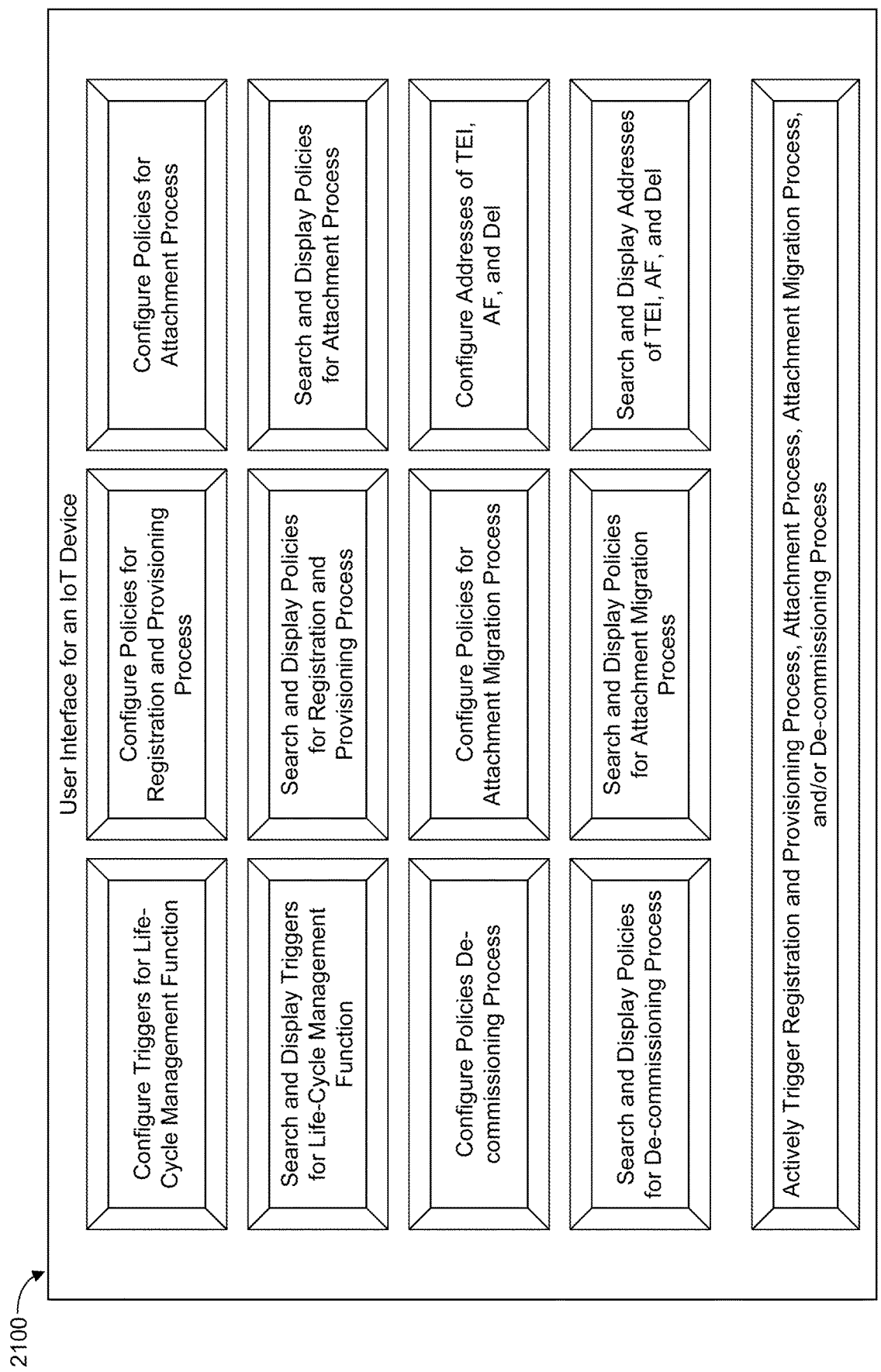
FIG. 21 illustrates an example user interface of an IoT device, wherein the user interface may enable various aspects of security lifecycle management disclosed herein.

Referring now to FIG. 21 an example user interface 2100 for security lifecycle management of one or more IoT devices is shown. It will be understood that the user interface 2100 is not limited to the illustrated functionality. In accordance with the illustrated example, the user interface 2100 can be used to configure triggers for security lifecycle management functions. For example, a new trigger can be added, an existing trigger can be updated, or an existing trigger can be deleted. The user interface 2100 can be used to search and display triggers for security lifecycle management functions. The user interface can be used to configure policies for registration and provisioning. For example, a new policy can be added, an existing policy can be updated, or an existing policy can be deleted. The user interface 2100 can be used to search and display policies for registration and provisioning. The user interface 2100 can be used to search and display policies related to the attachment process, or to configure policies for the attachment process, for example, so as to add a new policy, update an existing policy, and/or delete an existing policy. The user interface 2100 can be used to search and display policies related to the attachment migration process, or to configure policies for the attachment migration process, for example, so as to add a new policy, update an existing policy, and/or delete an existing policy. The user interface 2100 can be used to search and display policies related to the de-commissioning process, or to configure policies for the de-commissioning process, for example, so as to add a new policy, update an existing policy, and/or delete an existing policy. The user interface 2100 can be used to configure addresses of TEI, AF, and delegatee (Del) in the delegated architecture, or to search and display addresses of the TEI, AF, and Del. Further, the user interface 2100 can be used to actively trigger a registration and provisioning process, an attachment process, an attachment migration process, and/or a de-commissioning process.

Figure 22A:
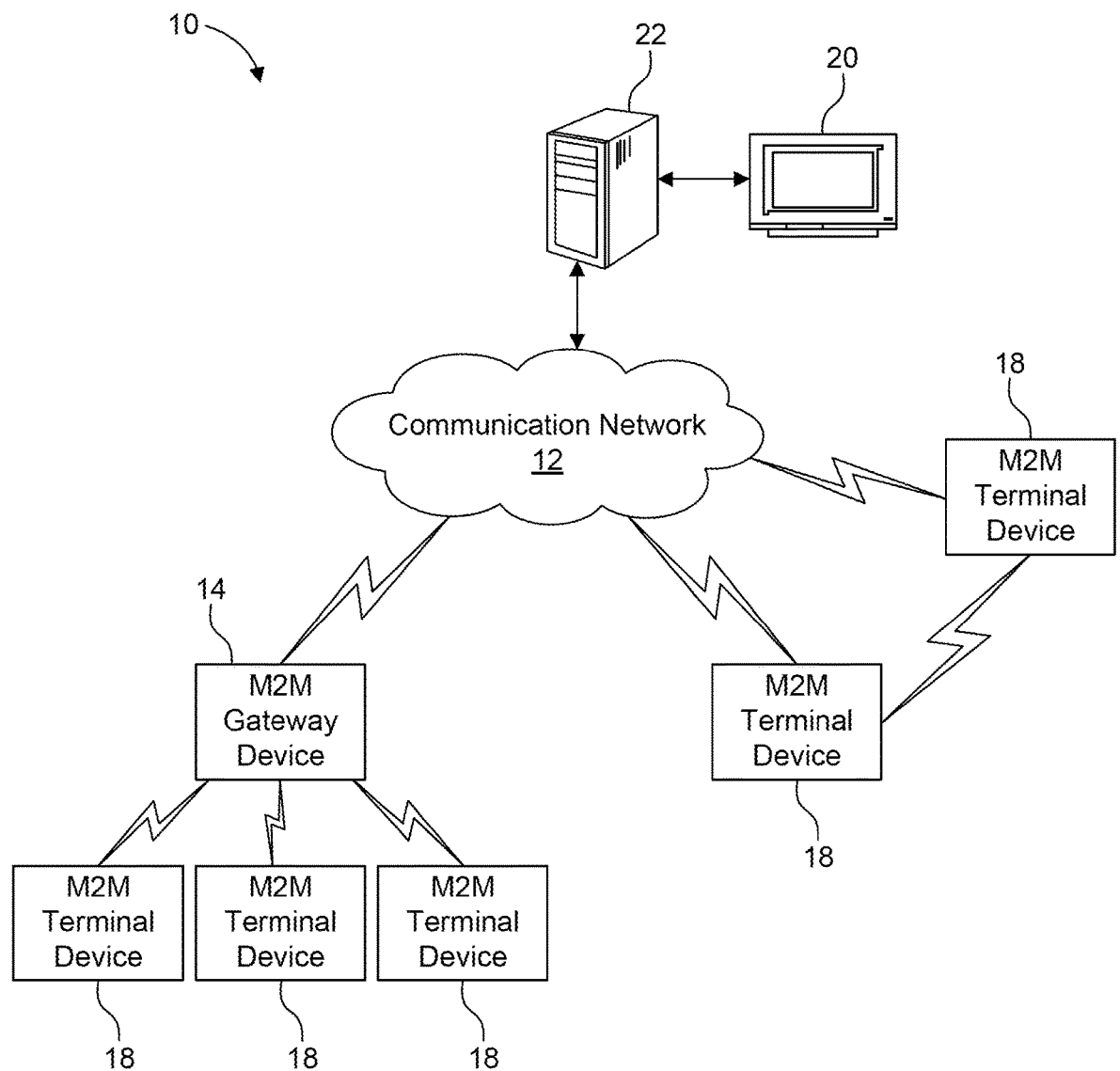
FIG. 22A is a system diagram of an example machine-to-machine (M2M), Internet of Things (IoT), or Web of Things (WoT) communication system in which one or more disclosed embodiments may be implemented.

FIG. 22A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 3-19 may comprise a node of a communication system, such as the ones illustrated in FIGS. 2, 3, 20, 22A, and 22B.

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 22A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 22A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 22B:
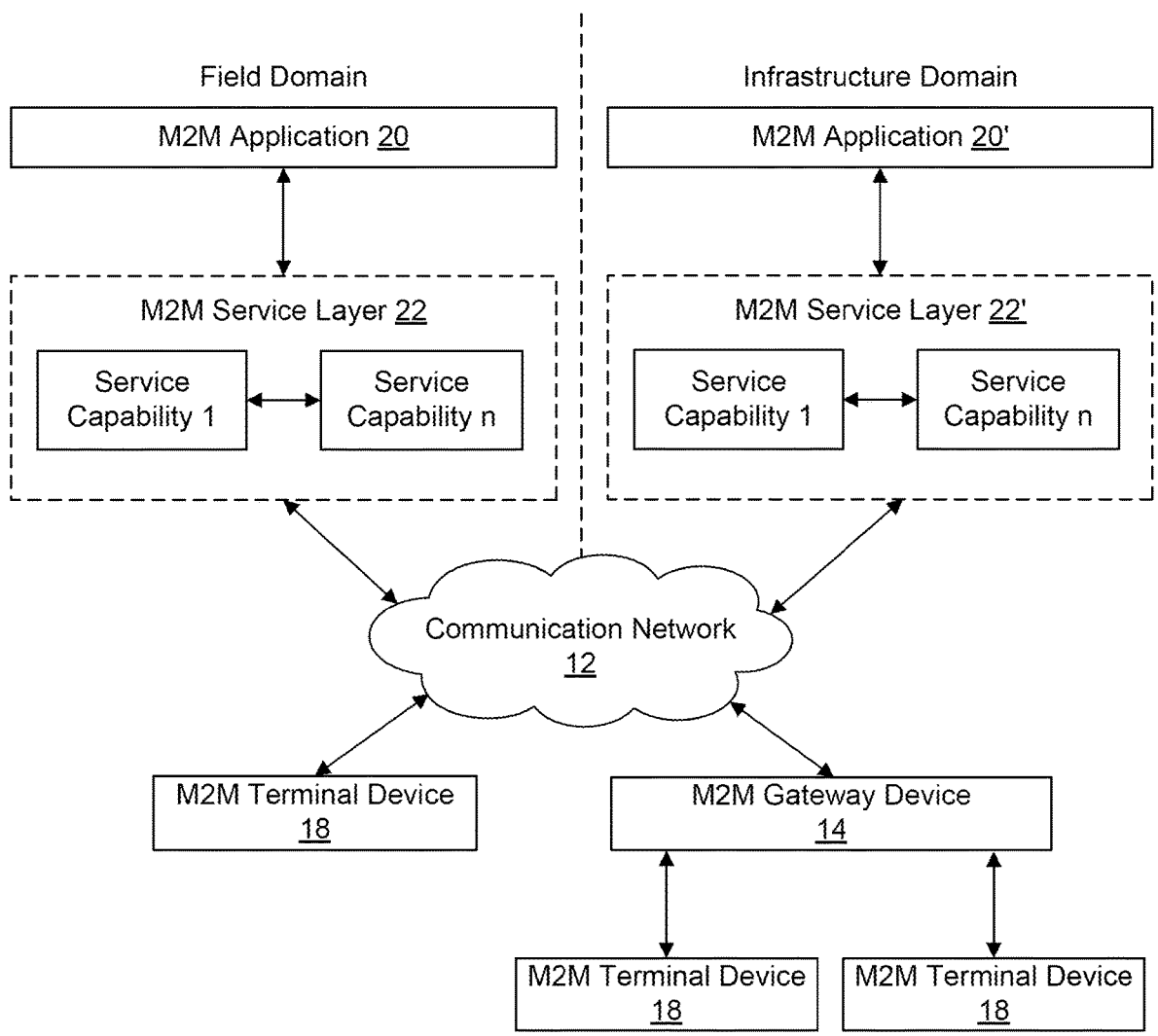
FIG. 22B is a system diagram of an example architecture that may be used within the M2M/IoT/WoT communications system illustrated in FIG. 22A.

Referring to FIG. 22B, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 22B, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Figure 1:
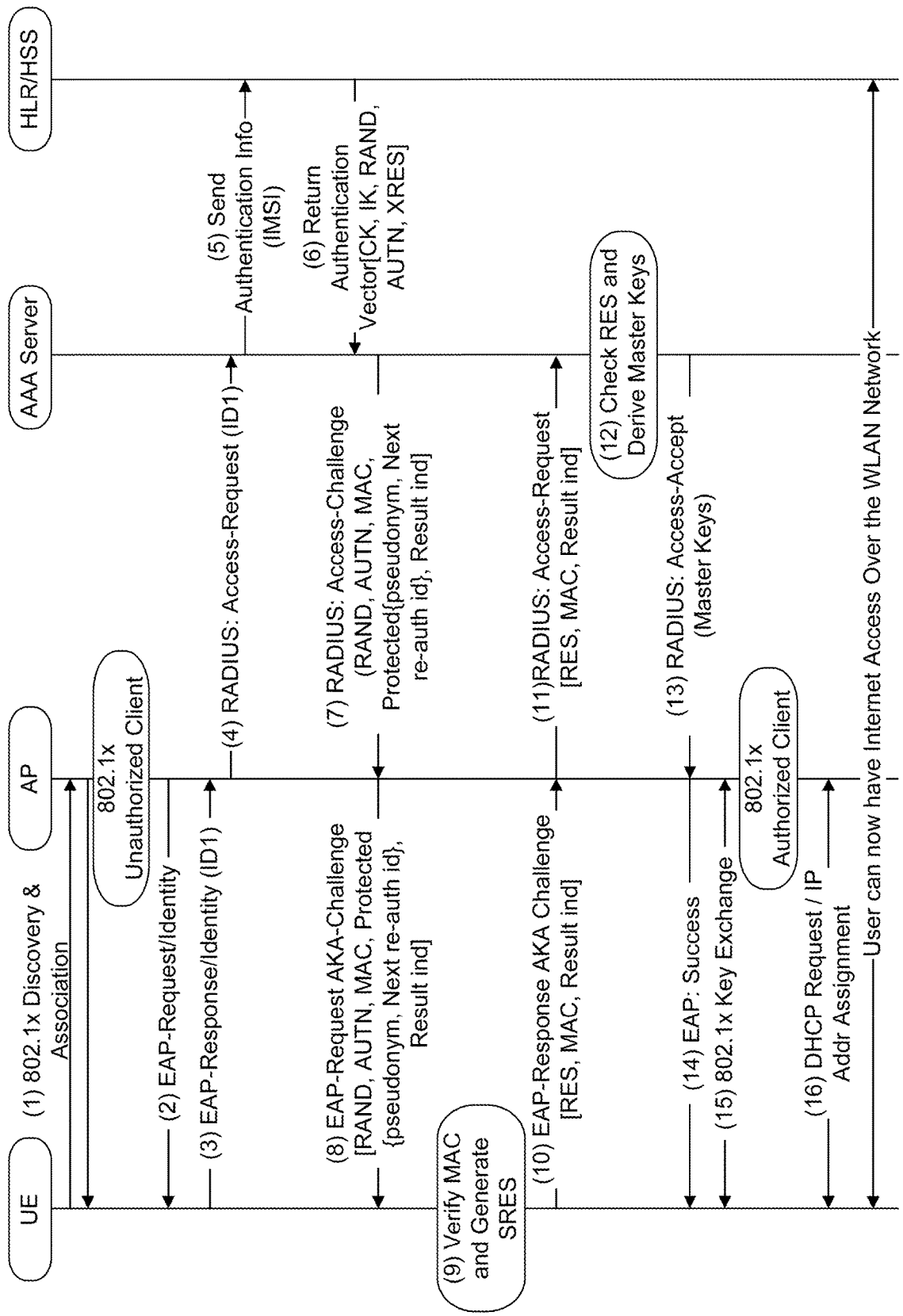
FIG. 1 is a call flow for performing full authentication using the extensible authentication protocol with authentication and key agreement (EAP-AKA).
Figure 2:
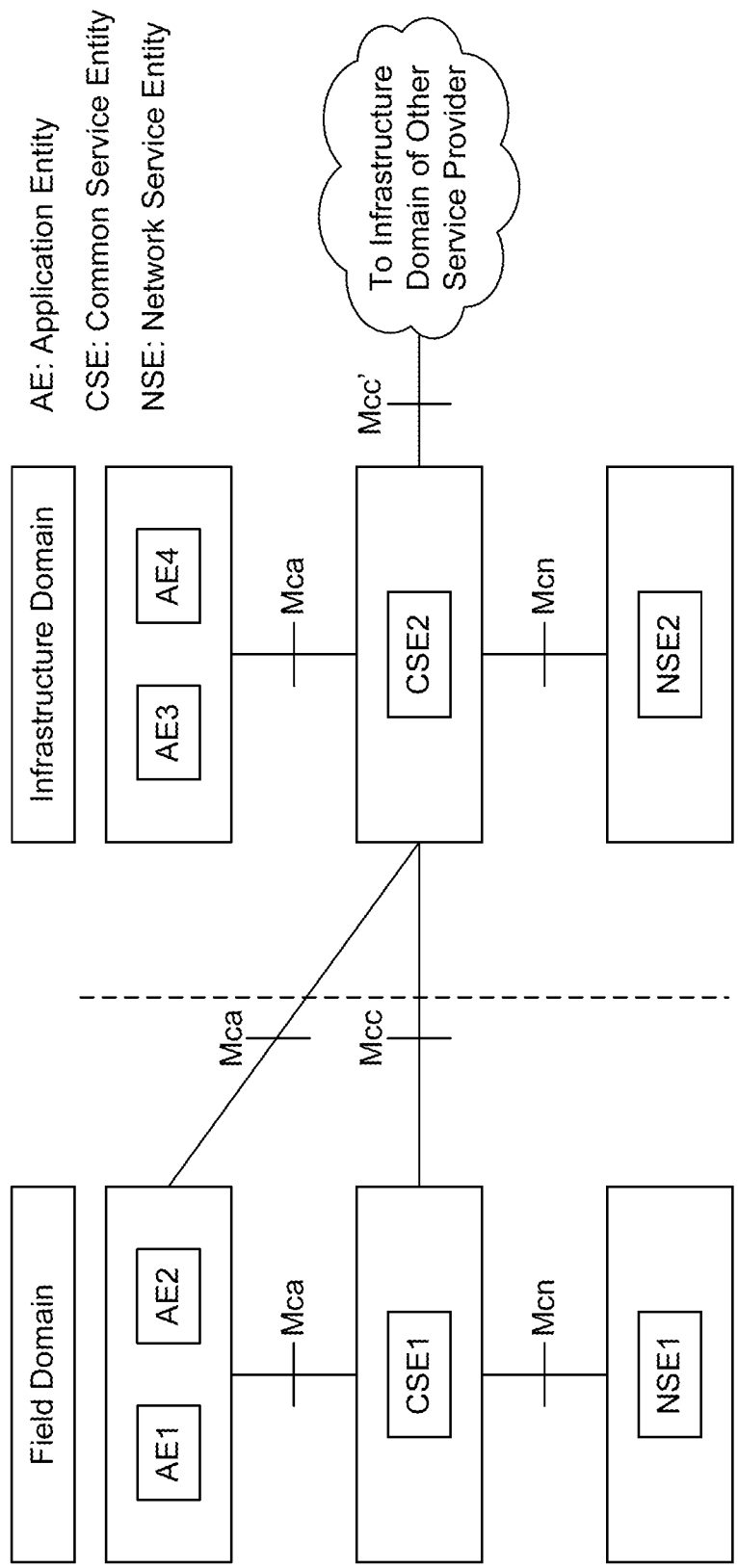
FIG. 2 is an example block diagram of the oneM2M architecture.

Generally, a Service Layer, such as the Service Layers 22 and 22' illustrated in FIG. 2, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 3 or FIG. 4 described below.

Further, the methods and functionalities described herein may be implemented as part of an M2M network that uses a Service Oriented Architecture (SOA) and/or a Resource-Oriented Architecture (ROA) to access services.

Figure 22C:
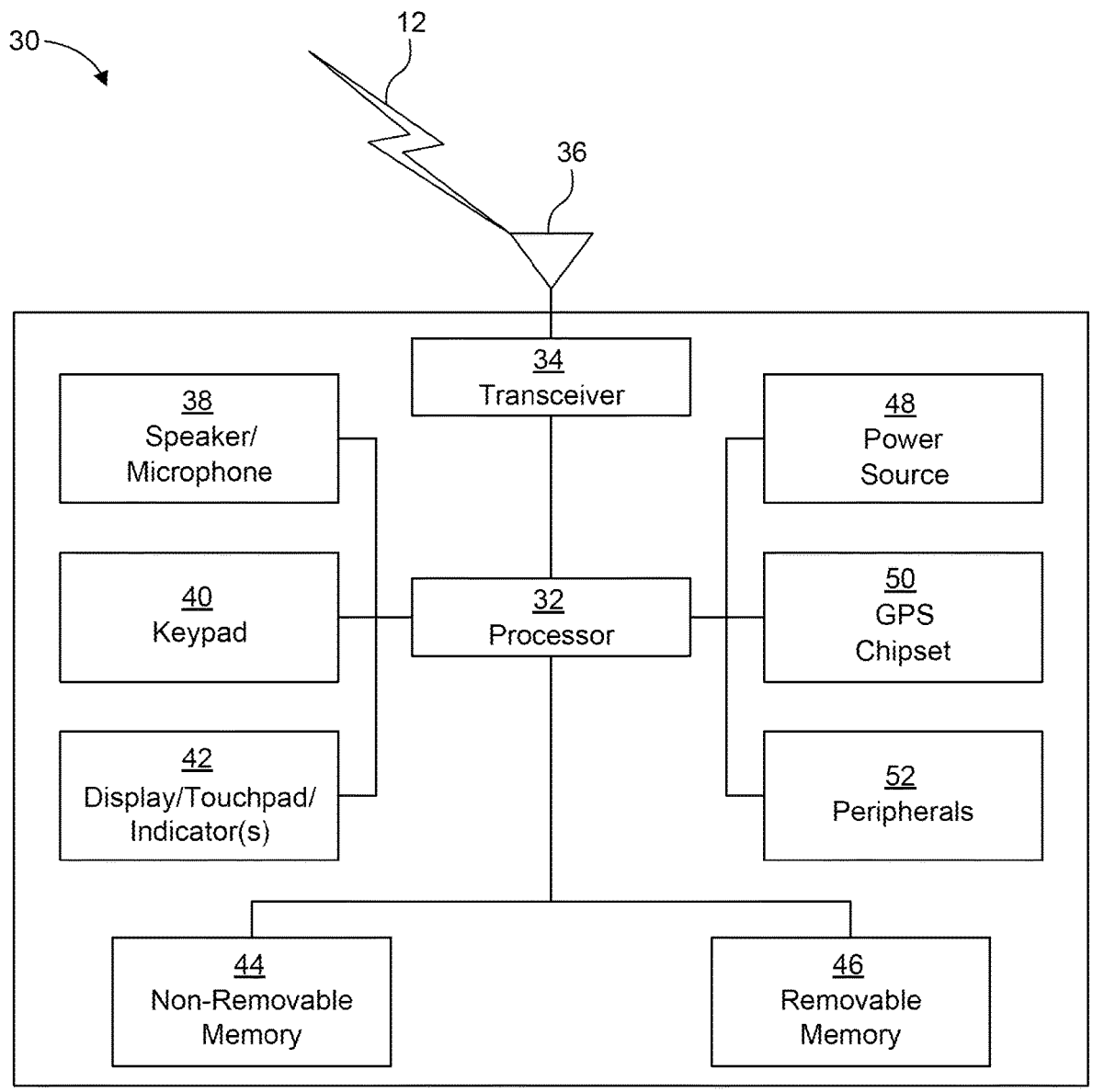
FIG. 22C is a system diagram of an example communication network node, such as an M2M/IoT/WoT device, gateway, or server that may be used within the communications system illustrated in FIGS. 22A and 22B.

FIG. 22C is a block diagram of an example hardware/software architecture of a node of a network, such as one of the clients, servers, or proxies illustrated in FIGS. 2-19, which may operate as an M2M server, gateway, device, or other node in an M2M network such as that illustrated in FIGS. 2, 3, 20, 22A, and 22B. As shown in FIG. 22C, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements security lifecycle management, e.g., in relation to the methods described in reference to FIGS. 4-19, Tables 1-5, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 22C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform security lifecycle management described herein, e.g., in relation to FIGS. 4-19, or in a claim. While FIG. 22C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 22C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 22D:
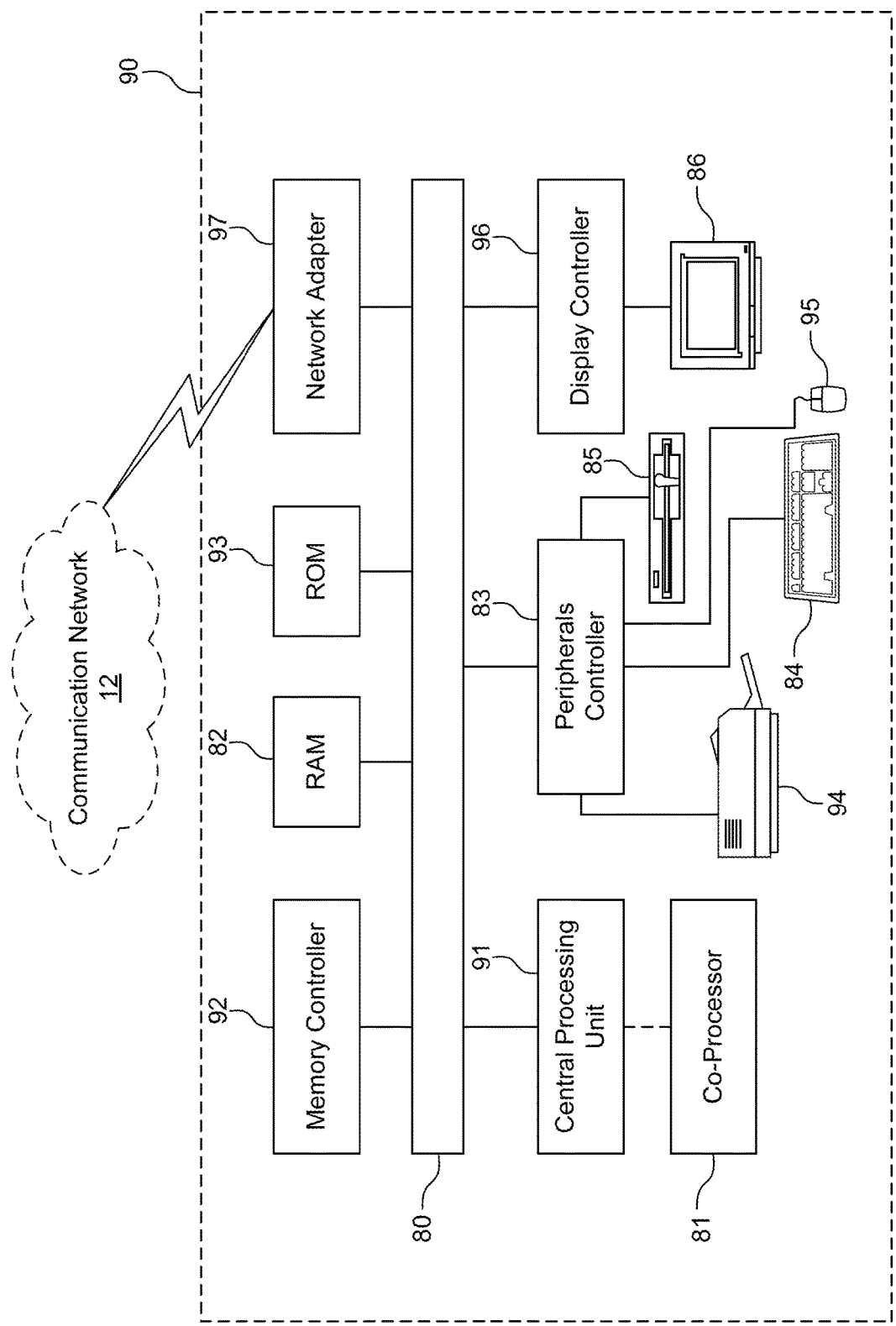
FIG. 22D is a block diagram of an example computing system in which a node of the communication system of FIGS. 22A and 22B may be embodied.

FIG. 22D is a block diagram of an exemplary computing system 90 which may also be used to implement one or more nodes of a network, such as the clients, servers, or proxies illustrated in FIGS. 3-19, which may operate as an M2M server, gateway, device, or other node in an M2M network such as that illustrated in FIGS. 2, 3, 20, 22A, and 22B.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 22A-22D, to enable the computing system 90 to communicate with other nodes of the network.

It is understood that any or all of the systems, methods and processes described herein may be embodied in the form of computer executable instructions (i.e., program code) stored on a computer-readable storage medium which instructions, when executed by a machine, such as an apparatus of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

The following is a list of acronyms relating to service layer technologies that may appear in the above description. Unless otherwise specified, the acronyms used herein refer to the corresponding term listed below.

AKA Authentication and Key Agreement
AF Attachment Function
AMP Attachment Migration Process
AT Authorization Token
Cert Certificate (Digital)
CoAP Constrained Application Protocol
CSE Common Service Entity
CSF Common Service Function
DCAF Delegated CoAP A
DP Discovery Process
(D)TLS (Datagram) Transport Layer Security EAP Extensible Authentication Protocol
GBA Generic Bootstrapping Architecture
HSF Hardware-based Security Function
JSON JavaScript Object Notation
JWS JSON Web Signature
JWT JSON Web Token
IETF Internet Engineering Task Force
IoT Internet of Things
IP Internet Protocol
IPSec Internet Protocol Security
M2M Machine-to-Machine
MAC Message Authentication Code
MP Migration Process
OAuth Open Authorization
OCF Open Connectivity Foundation
OpenID Open Identity
PANA Protocol for Network Authentication
PUF Physically Unclonable Function
RPP Registration and Provisioning Process
SAML Security Assertion Markup Language
SE Secure Element
SIM Subscriber Identity Module
SSF Software-based Security Function
TCP Transmission Control Protocol
TD Thing Description
TEE Trusted Execution Environment
TEI Trust Enabling Infrastructure
TLS Transport Layer Security
TPM Trusted Platform Module
TSM Trusted Service Manager
TTP Trusted Third-Party
UDP User Datagram Protocol
URI User Resource Identifier
W3C World-Wide Web Consortium
WoT Web of Things This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A method for a service providing service capabilities through a set of application programming interfaces (APIs) to a plurality of applications, the service being provided as a middleware, the method comprising:
   authenticating, by a trust enabling infrastructure (TEI) in the service, a device by performing an attestation check;
   receiving, by the TEI and from the device, a credential registration message;
   determining, by the TEI and based on the credential registration message, one or more security policies comprising one or more rules for assigning devices to a network function in the service; and
   sending, by the TEI and to the device, a response comprising an identifier of the network function and one or more parameters comprising a parameter associated with a security credential, wherein the identifier and the parameter associated with the security credential facilitate the device attaching to the network function.

2. The method as recited in claim 1, wherein the credential registration message comprises an indication of one or more capabilities or security functionality of the device.

3. The method as recited in claim 1, further comprising sending, by the TEI, on behalf of the device and to a third party, a message comprising an indication of a trustworthiness associated with the device.

4. The method as recited in claim 1, wherein the determined network function comprises a first network function, and wherein the method further comprises migrating, by the TEI, the device from the first network function to a second network function in the service providing the device access to an application or service provider, wherein the migrating is based on the one or more rules of the one or more security policies.

5. The method as recited in claim 1, wherein at least one of the one or more rules of the one or more security policies has a dependency based on a location of the device.

6. The method as recited in claim 4, further comprising de-commissioning, by the TEI, the device from the application or service provider, whereby the device is prevented from using the application or service provider.

7. The method as recited in claim 1, further comprising sending, by the TEI to the network function, a message comprising an identifier and a credential associated with the device.

8. The apparatus as recited in claim 1, wherein the instructions, when executed by the one or more processors, further cause sending, by the TEI to the network function, a message comprising an identifier and a credential associated with the device.

9. A device comprising one or more processors and one or more memories storing instructions that, when executed by the one or more processors, cause the device to perform operations comprising:
   establishing, based on an authentication of the device, a secure connection with a trust enabling infrastructure (TEI) in a service providing service capabilities through a set of application programming interfaces (APIs) to a plurality of applications, the service being provided as a middleware;
   sending, to the TEI, a credential registration message;
   receiving, from the TEI, a response to the credential registration message, wherein the response comprises an identifier of a network function in the service to which the device is to attach and one or more parameters comprising a parameter associated with a security credential, and wherein the identified network function is determined based on the credential registration message and one or more security policies comprising one or more rules for assigning devices to the network function in the service; and
   attaching, based on the identifier of the network function and the parameter associated with the security credential, to the network function.

10. The device as recited in claim 9, wherein the credential registration message comprises an indication of one or more capabilities or security functionality of the device.

11. The device as recited in claim 9, wherein the determined network function comprises a first network function, and wherein the instructions, when executed, further cause the device to migrate, under control of the TEI, from the first network function to a second network function in the service providing an application or service provider, wherein the migrating is based on the one or more rules of the one or more security policies.

12. The device as recited in claim 9, wherein at least one of the one or more rules of the one or more security policies has a dependency based on a location of the device.

13. The device as recited in claim 11, wherein the instructions, when executed, further cause the device to be prevented from accessing the application or service provider based on a de-commissioning by the TEI.

14. An apparatus comprising one or more processors and memory storing instructions that, when executed by the one or more processors, cause the apparatus to implement a trust enabling infrastructure (TEI) in a service providing service capabilities through a set of application programming interfaces (APIs) to a plurality of applications, the service being provided as a middleware, the instructions further causing the apparatus to perform operations comprising:
- authenticating, by the TEI in the service, a device by performing an attestation check;
- receiving, by the TEI and from the device, a credential registration message;
- determining, by the TEI and based on the credential registration message, one or more security policies comprising one or more rules for assigning devices to a network function in the service; and
- sending, by the TEI and to the device, a response comprising an identifier of the network function and one or more parameters comprising a parameter associated with a security credential, wherein the identifier and the parameter associated with the security credential facilitate the device attaching to the network function.

15. The apparatus as recited in claim 14, wherein the credential registration message comprises an indication of one or more capabilities or security functionality of the device.

16. The apparatus as recited in claim 14, wherein the instructions, when executed by the one or more processors, further cause sending, by the TEI, on behalf of the device and to a third party, a message comprising an indication of a trustworthiness associated with the device.

17. The apparatus as recited in claim 14, wherein the determined network function comprises a first network function, and wherein the instructions, when executed by the one or more processors, further cause migrating, by the TEI, the device from the first network function to a second network function in the service providing the device access to an application or service provider, wherein the migrating is based on the one or more rules of the one or more security policies.

18. The apparatus as recited in claim 14, wherein at least one of the one or more rules of the one or more security policies has a dependency based on a location of the device.

19. The apparatus as recited in claim 17, wherein the instructions, when executed by the one or processors, further cause de-commissioning, by the TEI, the device from the application or service provider, whereby the device is prevented from using the application or service provider.

* * * * *